(12) United States Patent
Heymans et al.

(10) Patent No.: US 12,721,361 B2
(45) Date of Patent: Sep. 1, 2026

(54) RAPIDLY COOLING FOOD AND DRINKS

(71) Applicant: ColdSnap, Corp., Billerica, MA (US)

(72) Inventors: John Heymans, Hampstead, NH (US); Dong Hua, Newton, MA (US)

(73) Assignee: ColdSnap, Corp., Billerica, MA (US)

( * ) Notice: Subject to any disclaimer, the term of this patent is extended or adjusted under 35 U.S.C. 154(b) by 133 days.

(21) Appl. No.: 18/786,410

(22) Filed: Jul. 26, 2024

(65) Prior Publication Data

US 2025/0031715 A1 Jan. 30, 2025

Related U.S. Application Data

(60) Provisional application No. 63/516,407, filed on Jul. 28, 2023.

(51) Int. Cl.

*A23G 9/12* (2006.01)
*A23G 9/04* (2006.01)
*A23G 9/22* (2006.01)
*A23G 9/28* (2006.01)
*A23G 9/30* (2006.01)

(52) U.S. Cl.

CPC ............... *A23G 9/12* (2013.01); *A23G 9/045* (2013.01); *A23G 9/224* (2013.01); *A23G 9/28* (2013.01); *A23G 9/30* (2013.01)

(58) Field of Classification Search

CPC .......... A23G 9/12; A23G 9/045; A23G 9/224; A23G 9/28; A23G 9/30; A23G 9/22

See application file for complete search history.

(56) References Cited

U.S. PATENT DOCUMENTS 4,674,641 A * 6/1987 Rusinyak ............. B65D 55/026 215/230
5,141,133 A * 8/1992 Ninomiya ................. B67B 7/26 222/541.2
8,448,565 B2 * 5/2013 Rahn .................. A47J 31/4467 73/426
10,543,978 B1 * 1/2020 Fonte ..................... A23G 9/224
2018/0029774 A1 * 2/2018 Stever .................... B65D 75/70
2025/0031715 A1 * 1/2025 Heymans ............... A23G 9/224
2026/0007146 A1 * 1/2026 Fonte ....................... A23G 9/12

FOREIGN PATENT DOCUMENTS

DE 102006016113 B3 * 8/2007 ............ B65D 5/748
EP 699622 A1 * 3/1996

* cited by examiner

*Primary Examiner* — Bob Zadeh
(74) *Attorney, Agent, or Firm* — Fish & Richardson P.C.

(57) ABSTRACT

Some pods include a body having a sidewall that extends from a first end of the body to a second end of the body to define an interior of the pod. The pod contains ingredients disposed within the interior of the pod for producing a single serving of a cooled food or drink. The pod includes a base attached to the first end of the pod. The base includes a rim with at least one radially-inward facing detent. At least a portion of the base is removable for dispensing the produced cooled food or drink from the pod. The pod includes a cap including a shearing drive including a track or circumscribed feature sized to engage the at least one radially-inward facing detent to snap the shearing drive to the base of the pod.

22 Claims, 44 Drawing Sheets

352
350
354
222

950
958
222
SKIRT
200

950
964
962
954
956
SKIRT
952

RAPIDLY COOLING FOOD AND DRINKS

CLAIM OF PRIORITY

This application claims priority under 35 USC § 119(e) to U.S. Patent Application Ser. No. 63/516,407, filed on Jul. 28, 2023, the entire contents of which are hereby incorporated by reference.

TECHNICAL FIELD

This disclosure relates to systems and methods for rapidly cooling food and drinks.

BACKGROUND

Home use ice cream makers can be used to make larger batches (e.g., 1.5 quarts or more) of ice cream for personal consumption. These ice cream maker appliances typically prepare the mixture by employing a hand-crank method or by employing an electric motor that is used, in turn, to assist in churning the ingredients within the appliance. The resulting preparation is often chilled using a pre-cooled vessel that is inserted into the machine. Some electric ice cream machines take 20 to 60 minutes to make a batch of ice cream and require time consuming clean up.

SUMMARY

This specification describes systems and methods for rapidly cooling food and drinks. Some of these systems and methods can cool food and drinks in a container inserted into a counter-top or installed machine from room temperature to freezing in less than two minutes. For example, the approach described in this specification has successfully demonstrated the ability to make soft-serve ice cream from room-temperature pods in approximately 90 seconds. This approach has also been used to chill cocktails and other drinks including to produce frozen drinks. These systems and methods are based on a refrigeration cycle with low startup times and a pod-machine interface that is easy to use and provides extremely efficient heat transfer.

Some pods include an aluminum container having a sidewall at least partially defining an interior of the pod for ingredients to produce a cooled food or drink and a base attached to a first end of the sidewall of the aluminum container. The base includes (i) a first protrusion configured to be removed from the base to form an opening for dispensing food or drink from the pod and (ii) one or more second protrusions located radially outward of the first protrusion. The pod includes a cap that includes a cap body including a drive configured to engage the first protrusion of the base for removing at least a portion of the first protrusion from the base to form the opening for dispensing the food or drink from the pod, and a recess or track formed on an outer periphery of the cap body and extending completely around a circumference of the cap body. The recess or track is configured to engage the one or more second protrusions of the base to axially retain the cap onto the base while allowing relative rotation between the cap and the base, and the drive is configured to remove at least the portion of the first protrusion during a relative rotation between the cap and the base when the cap is axially retained on the cap.

Any of the pods of this application can include one or more of the following features alone and in combination.

In some cases, the cap includes a drip tray configured to attach to an inner portion of the cap body, the inner portion surrounding the drive of the cap body.

In some cases, the drip tray includes one or more resilient arms for engaging one or more second recesses of the inner portion of the cap body for attaching the cap to the cap body.

In some cases, the drip tray is formed of plastic and the cap body is formed of aluminum.

In some cases, the drip tray at least partially defines a reservoir for storing melted food or drink and at least the portion of the first protrusion after the first protrusion has been removed from the base by the drive.

In some cases, the pod includes the ingredients disposed in the interior of the pod.

In some cases, the pod includes a paddle disposed in the interior of the pod for mixing the ingredients.

In some cases, the one or more second protrusions are formed on a wall of the base located radially inward of a location at which the base is attached to the aluminum container, the location being radially outward of the first protrusion of the base.

In some cases, the one or more second protrusions are a single annular protrusion extending around a circumference of the wall of the base.

In some cases, the one or more second protrusions include a plurality of protrusions spaced relative to each other around a circumference of the wall of the base.

In some cases, the one or more second protrusions have a circular shape or a spherical shape that extends in a radially inward direction.

In some cases, the one or more second protrusions have a square shape, a triangular shape, or a rectangular shape.

In some cases, the pod is configured to allow relative rotation by allowing the one or more second protrusions to slide within the recess in a first rotational direction.

In some cases, the pod is configured to allow relative rotation by allowing the one or more second protrusions to slide within the recess in a second rotational direction opposite to the first direction.

In some cases, the cap body includes a coating surrounding one or more surfaces of the recess for reducing friction between the one or more protrusions of the base and the recess of the cap body compared to cap bodies that do not use the coating.

Some pods include an aluminum container having a sidewall at least partially defining an interior of the pod for ingredients to produce a cooled food or drink and a base attached to a first end of the sidewall of the aluminum container, the base including (i) a first protrusion configured to be removed from the base to form an opening for dispensing food or drink from the pod and (ii) one or more second protrusions. The cap includes: a first part includes (i) a drive configured to engage the first protrusion of the base for removing at least a portion of the first protrusion from the base to form the opening for dispensing the food or drink from the pod, (ii) a dispense port for dispensing the food or drink from the pod, and (iii) a recess or track formed on an outer periphery of the first part and extending around a circumference of the first part; and a second part configured to be attached to the first part, the second part defining (i) a reservoir for storing melted food or drink after the food or drink has been dispensed from the pod, and (ii) an opening for dispensing the food or drink from the pod, the reservoir being aligned with the drive and the opening being aligned with the dispense port when the first part and the second part are attached to one another. The recess or track is configured to engage the one or more second protrusions of the base to axially retain the cap onto the base while allowing relative rotation between the cap and the base such that, while the cap is axially retained on the base, (i) the drive is configured to remove at least the portion of the first protrusion during a first relative rotation between the cap and the base and (ii) the dispense port is configured to be aligned with the opening formed in the base during a second relative rotation between the cap and the base.

Any of the pods of this application can include one or more of the following features alone and in combination.

In some cases, the first and second relative rotations are in the same rotational direction.

In some cases, the pod is configured to allow relative rotation by allowing rotating in two opposite rotational directions.

In some cases, the first part includes a first helical thread and the second part includes a second helical thread for attaching the second part to the first part.

In some cases, one of the first part or the second part comprises a plurality of pins and the other of the first part or the second part comprises a plurality of second recesses sized to receive the plurality of pins for attaching the second part to the first part.

In some cases, the first part includes a coating surrounding one or more surfaces of the recess or track for reducing friction between the one or more protrusions of the base and the recess or track of the first part compared to caps that do not use the coating.

Some pods include a body having a sidewall that extends from a first end of the body to a second end of the body to define an interior of the pod. The pod contains ingredients disposed within the interior of the pod for producing a single serving of a cooled food or drink. The pod includes a base attached to the first end of the pod. The base includes a protrusion formed by a washer that is pressed into a post formed on the base. The post is deformable such that the post fills in and conforms to a recessed channel of the washer. At least a portion of the base is removable for dispensing the produced cooled food or drink from the pod.

Any of the pods of this application can include one or more of the following features alone and in combination.

In some cases, the protrusion is a removable protrusion with a weakened score line. Some removable protrusions are integrally formed with the base. Other protrusions are inserted into the base after the base is formed instead of being integrally formed with the base. Some removable protrusions are formed using a washer that is pressed into a post formed on the base or lid.

In some cases, removable protrusions formed with a washer is easier to manufacture and is more economical than integrally forming the final shape of the removable protrusion with the base.

Some pods include a body having a sidewall that extends from a first end of the body to a second end of the body to define an interior of the pod. The pod contains ingredients disposed within the interior of the pod for producing a single serving of a cooled food or drink. The pod includes a base attached to the first end of the pod. The base includes a rim with at least one radially-inward facing detent. At least a portion of the base is removable for dispensing the produced cooled food or drink from the pod. The pod includes a cap including a shearing drive including a track, recess, or circumscribed feature sized to engage the at least one radially-inward facing detent to snap the shearing drive to the base of the pod to axially retain the shearing drive to the base of the pod while allowing relative rotation between the cap and the base of the pod.

Any of the pods of this application can include one or more of the following features alone and in combination.

In some cases, the cap has a skirt that fits over and is attached to the base using the radially-inward facing detent that is implemented as a radially extending inward lip that circumscribes an inner surface of the cap. In some cases, the cap does not have a skirt (i.e., a skirt-less design) and instead attaches to the base with a circumscribed feature on the bottom of the cap that is positioned radially inward of the base wall and secures to the base via detents or a detent ring present on the base. Some caps with a skirt-less design integrate the body and the insert into a single integrated structure. Some caps with a skirt-less design also utilize a single layer of material, such as a foil, instead of a cover.

In some cases, the cap includes a foil or drip tray received in a portion of the cap for capturing residual food and drink that melts and drips after the produced food and drink is dispensed from the pod. In some cases, the at least one radially-inward facing detent is a semi-continuous or continuous detent ring that circumferentially spans a circumference of the rim of the base.

In some cases, the cap is made of aluminum or an aluminum alloy. In some examples, the cap body is made of ADC1 cast aluminum.

In some cases, a skirt-less cap is easier to manufacture in aluminum compared to other materials such as plastic. Additionally, fabricating the cap in aluminum allows the shearing drive to be integrated with the cap body into a single structure, and aluminum is more consistently recycled than plastic. Some skirt-less caps provide a more secure attachment to base compared to cap designs with a skirt. Skirt-less caps have less of a chance of coming off during transport/storage and when a user removes the pod from the machine since it sits inside the base wall. Some skirt-less caps include foil and foil is less expensive than plastic, simplifies assembly, and reduces plastic usage.

Some skirt-less caps are designed to be inserted onto the base of the pod with a first amount of force while requiring a higher amount of force to be separated (e.g., by using a triangular or asymmetric protrusion on the base that engages the recess or track of the cap body). Such designs can reduce the chances of the cap falling off the pod during handling and use. Some pods use a two-piece skirt-less cap design to increase the strength of the connection between the drip tray and the rest of the cap and reduce the chances of the drip tray being inadvertently separated from the cap during use.

Some pods include a locking nut, which is adhered to the pod. In some cases, the locking nut includes one or more vent holes to allow nitrogen to escape from the pod. Some locking nuts are made of aluminum or an aluminum alloy. Some locking nuts are made of plastic. Some plastic locking nuts have a detent or snap feature that allows a snap-in fit to the pod, avoiding the use of epoxy or other adhesives. In these cases, a cut-out or recess is provided in the pod to accept and secure the nut to the pod. The cut-out may have supplemental features that permit the sides of the cut-out to flex as the nut is inserted, allowing the bottom of the nut to penetrate through the cut-out and the sides of the cut-out to snap into place within the nut's snap feature. Some nuts have an inserted or overmolded plastic rotary seal in the interior of the nut that allows the sealing portion of the shaft of the mixing paddle to ride on as the shaft rotates, which is preferentially made of a softer or more compliant material than the nut material. Some nuts also have a skirt feature that directs the nitrogen (and any product that escapes) parallel to the top surface of the pod, rather than upward, as pressure is released from the pod.

For example, some pods have a sidewall that extends from a first end of the body to a second end of the body to define an interior of the pod. The first end has a centrally-located cut-out. The pod contains ingredients disposed within the interior of the pod for producing a single serving of a cooled food or drink. The pod includes gas-filled headspace. The pod includes a paddle rotatably disposed within the pod. The pod includes a nut received in the cut-out and attached to the first end of the pod. The nut includes one or more snap features sized to engage with one or more edges of the cut-out for receiving the nut in the cut-out. The nut includes an inserted or overmolded plastic rotary seal disposed in an interior of the nut that allows a sealing portion of a shaft of the paddle to ride on the plastic rotary seal as a machine rotates the paddle within the pod to produce the cooled food or drink. The nut includes one or more vent holes extending through a sidewall of the nut. The one or more vent holes define a path for allowing the gas to escape from the pod.

In some cases, the nut includes a skirt feature for directing the gas and/or residual food or drink in a direction parallel to a surface of the first end of the pod rather than upward, as pressure is released from the pod while producing the cooled food or drink. In some cases, the cut-out has supplemental features or relief features that permit one or more edges or sides of the cut-out to flex as the nut is inserted. In some cases, the cut-out has a hexagonal shape.

Some machines for producing a single serving of a cooled food or drink include a refrigeration system. The refrigeration system includes an evaporator defining a receptacle shaped and sized to receive and cool ingredients to produce the single serving of the cooled food or drink. The refrigeration system includes a condenser and a working fluid loop from the evaporator, to the condenser, and back to the evaporator. The working fluid loop includes a primary path between the condenser and the evaporator, a first capillary tube located along the primary path, a secondary path between the condenser and the evaporator and running in parallel to the primary path, and a second capillary tube located along the secondary path. The second capillary tube has a length that is less than a length of first capillary tube.

Any of the machines of this application can include one or more of the following features alone and in combination.

In some cases, the working fluid loop includes a control valve located along the secondary path and configured to selectively open the secondary path reducing the pressure drop between the condenser and the evaporator. In some cases, the length of the second capillary tube is approximately half of the length of the first capillary tube. In some cases, the length of the second capillary tube is a linear distance from a first end of the second capillary tube to a second end of the second capillary tube and the length of the first capillary tube is a linear distance from a first end of the first capillary tube to a second end of the first capillary tube. In some cases, the length of the second capillary tube is defined by a fluid path length between a first end of the second capillary tube and a second end of the second capillary tube and the length of the first capillary tube is defined by a fluid path length between a first end of the first capillary tube and a second end of the first capillary tube.

Some machines for producing a single serving of a cooled food or drink include a refrigeration system including a high stage including a high stage working fluid loop that spans from a first compressor to a condenser to a first heat exchanger to an interstage cooler and back to the first compressor. The refrigeration system includes a low stage including a low stage working fluid loop that spans from a second compressor to the interstage cooler to a second heat exchanger to an evaporator and back to the first compressor. The evaporator defines a receptacle shaped and sized to receive and cool ingredients to produce the single serving of the cooled food or drink.

Any of the machines of this application can include one or more of the following features alone and in combination.

In some cases, the high stage working fluid loop includes a primary path between the condenser and the interstage cooler, a first expansion device located along the primary path of the high stage working fluid loop, a secondary path between the condenser and the interstage cooler and running in parallel to the primary path of the high stage working fluid loop, and a second expansion device located along the secondary path of the high stage working fluid loop.

In some cases, the low stage working fluid loop includes a primary path between the interstage cooler and the evaporator, a third expansion device located along the primary path of the low stage working fluid loop, a secondary path between the interstage cooler and the evaporator and running in parallel to the primary path of the low stage working fluid loop, and a fourth expansion device located along the secondary path of the low stage working fluid loop.

In some cases, the first, second, third, and fourth expansion devices are capillary tubes. In some cases, the first capillary tube has a different length compared to the second capillary tube and the third capillary tube has a different length compared to the fourth capillary tube. In some cases, the interstage cooler is a braze plate heat exchanger. In some cases, a refrigerant of the high stage is the same as a refrigerant of the low stage. In some cases, a refrigerant of the high stage is different from a refrigerant of the low stage. In some cases, the machine is configured to start the compressor of the low stage after starting the compressor of the high stage. In some cases, the machine is configured to start the compressor of the low stage based on a temperature of a refrigerant of the high stage.

In some cases, using a refrigeration system with a high and low stage allows the machine to produce the single serving of the cooled food or drink much more quickly since cooler temperatures are reached compared to refrigeration systems with a single stage. Additionally, in some examples, using the low stage and the high stage refrigerant system results in smaller ice crystal size and quicker freezing time compared to refrigeration systems with a single stage.

Some machines for producing a single serving of a cooled food or drink include a refrigeration system including a working fluid loop that spans from a compressor to a condenser to a heat exchanger to an evaporator and back to the compressor. The evaporator defines a receptacle shaped and sized to receive and cool ingredients to produce the single serving of the cooled food or drink. The evaporator has at least two inlets for receiving refrigerant and at least two outlets for discharging refrigerant. The flow path is branched into at least two paths external to the evaporator for the respective at least two inlets, and the respective flow paths of the at least two outlets is merged into a single flow for being received by the compressor.

Any of the machines of this application can include one or more of the following features alone and in combination.

In some cases, the at least two flow paths are separate flow paths within the evaporator. In some cases, the evaporator is movable between a closed position and an open position about an axis that is biased towards the at least two inlets or the at least two outlets. In some cases, a location in which the flow path is branched is a distance of at least one pod diameter away from a longitudinal axis of the evaporator. In some cases, the evaporator is sized to receive a pod having a diameter of the pod diameter. In some cases, a U-feature is located along the flow path downstream of a location in which the at least two outlets are merged into the single flow.

In some cases, an evaporator with at least two flow paths is advantageous because it allows larger compressors to be used with the refrigeration system. In particular, compared to using only a single refrigerant inlet and outlet, evaporators with multiple refrigerant inlets and outlets reduce the pressure drop across the evaporator when larger compressors are used to improve the thermal capacity of the refrigeration system.

For ease of description, terms such as “upward”, “downward” “left” and “right” are relative to the orientation of system components in the figures rather than implying an absolute direction. For example, movement of a driveshaft described as vertically upwards or downwards relative to the orientation of the illustrated system. However, the translational motion of such a driveshaft depends on the orientation of the system and is not necessarily vertical.

The details of one or more embodiments of these systems and methods are set forth in the accompanying drawings and the description below. Other features, objects, and advantages of these systems and methods will be apparent from the description and drawings, and from the claims.

DESCRIPTION OF FIGURES

Like reference symbols in the various drawings indicate like elements.

DETAILED DESCRIPTION

This specification describes systems and methods for rapidly cooling food and drinks. Some of these systems and methods use a counter-top or installed machine to cool food and drinks in a container from room temperature to freezing in less than three minutes. For example, the approach described in this specification has successfully demonstrated the ability make soft-serve ice cream, frozen coffees, frozen smoothies, and frozen cocktails, from room temperature pods in approximately 90 seconds. This approach can also be used to chill cocktails, create frozen smoothies, frozen protein and other functional beverage shakes (e.g., collagen-based, energy, plant-based, non-dairy, and CBD shakes), frozen coffee drinks and chilled coffee drinks with and without nitrogen in them, create hard ice cream, create milk shakes, create frozen yogurt and chilled probiotic drinks. These systems and methods are based on a refrigeration cycle with low startup times and a pod-machine interface that is easy to use and provides extremely efficient heat transfer. Some of the pods described can be sterilized (e.g., using retort sterilization or aseptic filling) and used to store ingredients including, for example, dairy products at room temperature for up to 18 months.

These machines, pods, and refrigeration systems are described in detail in U.S. patent application Ser. No. 15/625,690 filed Jun. 16, 2017, U.S. patent application Ser. No. 16/104,758 filed Aug. 17, 2018, U.S. patent application Ser. No. 16/459,388 filed Jul. 1, 2019, U.S. patent application Ser. No. 16/459,176 filed Jul. 1, 2019, U.S. patent application Ser. No. 16/459,322 filed Jul. 1, 2019, U.S. patent application Ser. No. 16/824,616 filed Mar. 19, 2020, U.S. patent application Ser. No. 16/844,781 filed Apr. 9, 2020, and U.S. patent application Ser. No. 17/335,891 filed Jun. 1, 2021, and U.S. patent application Ser. No. 17/987,432 filed Nov. 15, 2022, all of which are incorporated herein by reference in their entirety.

A significant challenge in the design of ice cream machines is the ability to cool a pod from room temperature to the draw temperature as quickly as possible, preferably within two minutes. Some machines reduce the residence time the ice cream remains in the ice cream machine by reaching the draw temperature as quickly as possible. This can be achieved by mixing and cooling as quickly as possible.

The machines and processes described in this specification create ice cream with the majority of the ice crystals below 50 μm and often the majority is below 30 μm in a single serve pod. In order to still be able to dispense the ice cream out of the pod into a bowl or dish without the ice cream contacting the machine, a draw temperature or dispensing temperature of the ice cream should be between −3° to −8° C. (26.6° F. to 17.6° F.) and preferably between −3° to −6° C. (26.6° F. to 21.2° F.).

Figure 1A:
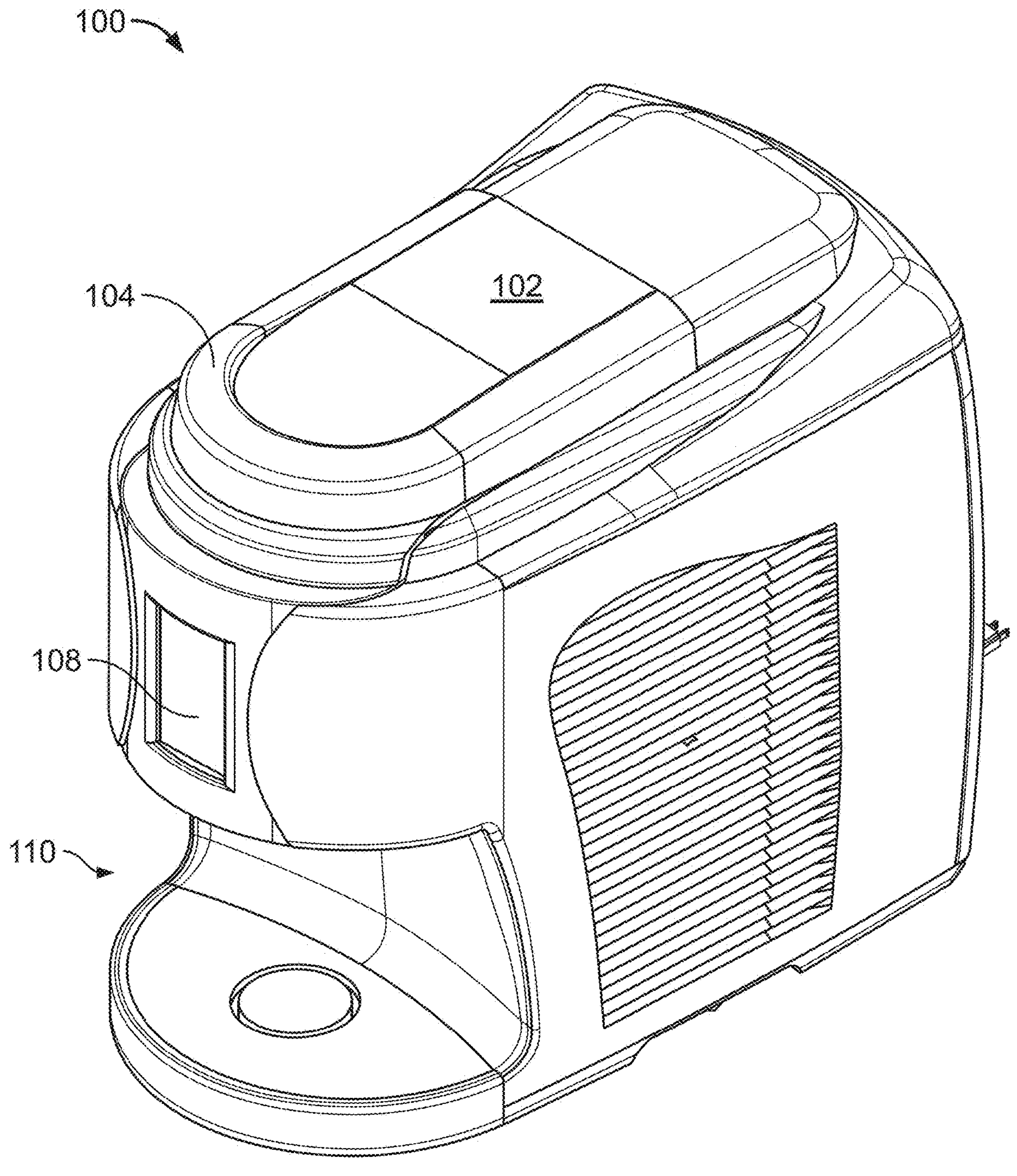
FIGS. 1A and 1B are views of a machine for rapidly producing a chilled or frozen food or drink.
Figure 1B:
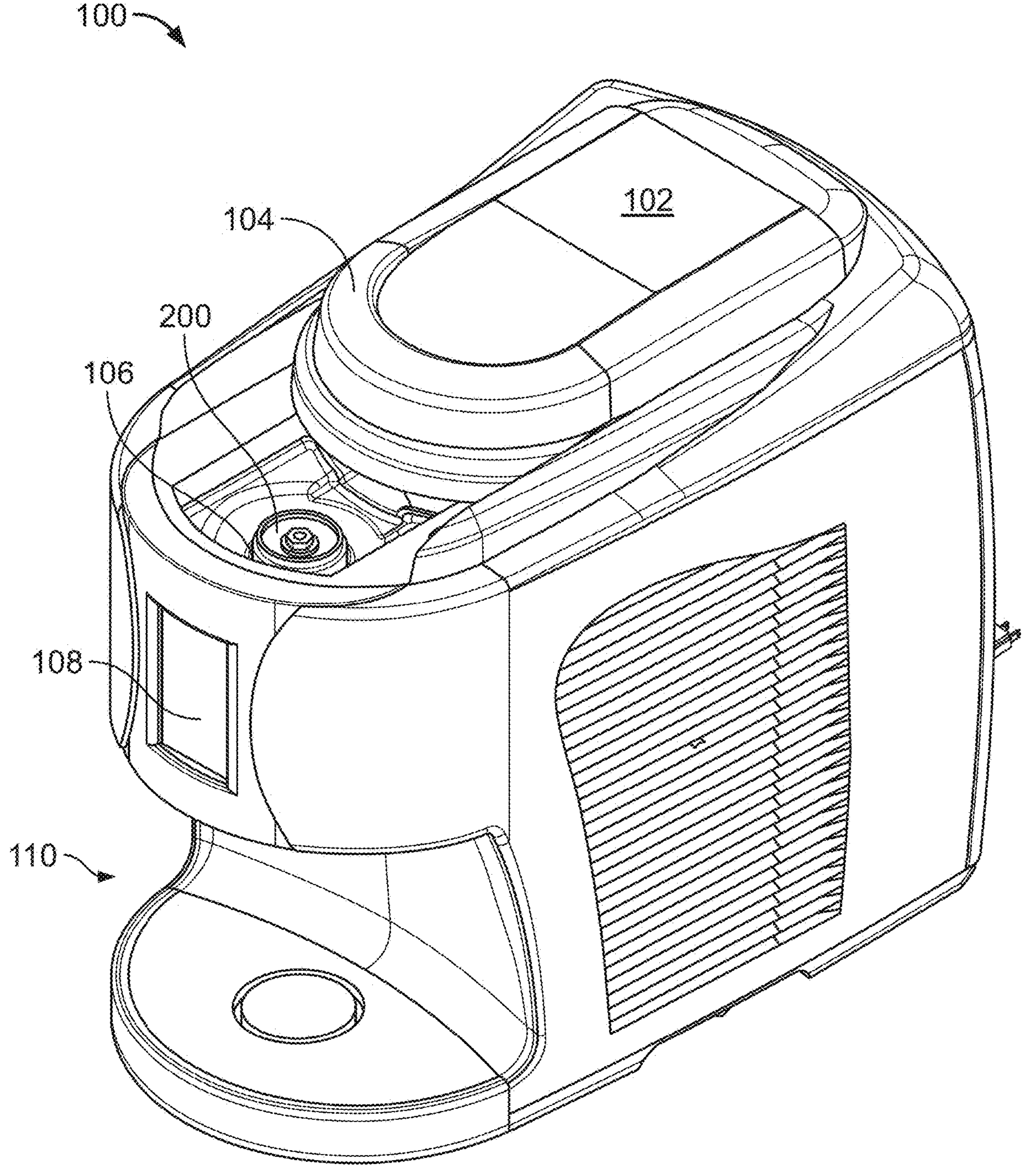

FIGS. 1A and 1B show a machine 100 for producing a chilled or frozen food or drink. FIG. 1A shows the machine 100 in a closed configuration and FIG. 1B shows the machine 100 in an open configuration. A user pushes and pulls a sliding lid 102 (e.g., by grasping a handle 104) to move the machine 100 between the closed and open configurations. Some machines have an automated system (e.g., one or more motors or actuators) to open and close the sliding lid 102 without user assistance.

The sliding lid assembly 102 reduces the overall height of the machine 100 compared to machines with lid assemblies that open upward (e.g., pivoting designs). In some examples, machine 100 is compact and able to fit on kitchen countertops underneath cupboards. Machine 100 has a height (top to bottom) of about 17.5 inches, a depth (front to back) of about 20 inches, and a width (side to side) of about 12 inches. Some machines have other dimensions. Some machines have a height of less than 20 inches (e.g., between 16 and 20 inches), a depth of less than 24 inches (e.g., between 18 and 24 inches), and a width of less than 16 inches (e.g., between 10 and 16 inches). Some machines are larger to accommodate larger more powerful compressors.

In the open configuration shown in FIG. 1B, a user (e.g., a consumer) inserts a pod 200 into a receptacle 106 of the machine 100. The receptacle 106 is defined by one or more surfaces of an evaporator of the machine 100. An example pod 200 is shown inserted into the receptacle 106 and described with reference to FIG. 2. The machine 100 reduces the temperature of ingredients in the pod 200 to produce a single serving of a cooled food or drink.

Figures 2, 3:
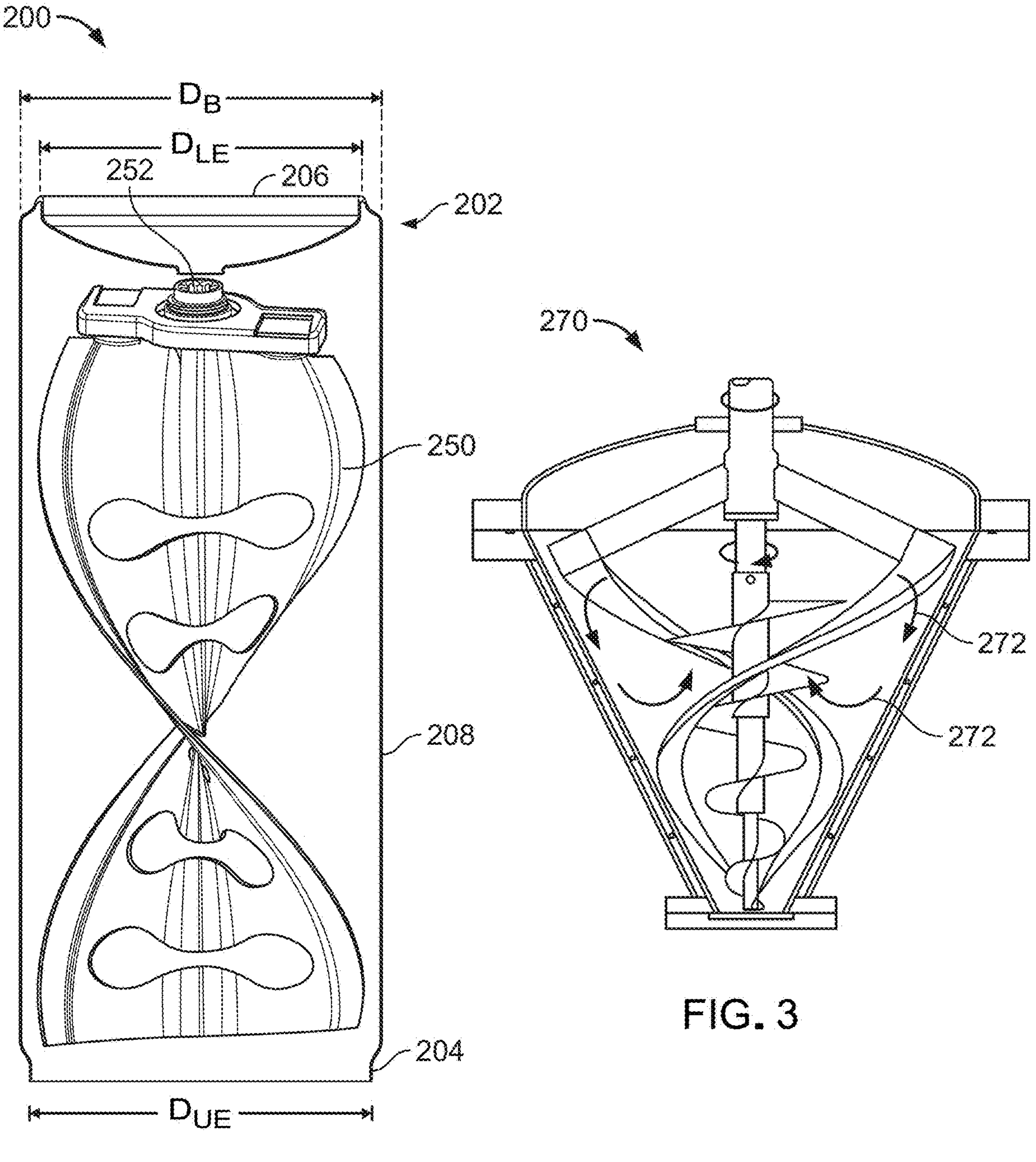
FIG. 2 is a cross section view of a pod for use in the machine.
FIG. 3 is a schematic showing the flow of ingredients within the pod during a mixing cycle.

FIG. 2 is a schematic side view of an example pod 200 for use in machine 100. The pod 200 includes a body 202 that extends from a first end 204 at an open end or base of the pod 200 to a second end 206 at a closed end of the pod 200. The pod 200 is cylindrical and has a circular cross-section. A sidewall 208 connects the first end 204 to the second end 206. The first end 204 has a diameter $D_{UE}$ that is slightly larger than the diameter $D_{LE}$ of the second end 206. The sidewall 208 has a circular cross-section with a diameter $D_B$. The diameter $D_B$ is larger than both the diameter $D_{UE}$ of the first end 204 and the diameter $D_{LE}$ of the second end 206. This configuration of the pod 200 provides a balance between reducing material usage (e.g., aluminum) while increasing the columnar strength of the pod and facilitates stacking multiple pods 200 on top of one another with the first end 204 of one pod receiving the second end 206 of another pod.

The pod 200 includes a mixing paddle 250 disposed within the body 202 of the pod 200. In some examples, the mixing paddle is referred to as an impeller or a blade. The mixing paddle 250 is rotatable within the pod 200 and is concentrically disposed within the pod 200. The mixing paddle 250 includes a drive head 252 with a receptacle for engaging a drive shaft of the machine 100 for driving the mixing paddle 250 within the pod 200 to produce the serving of the cooled food and drink. Additional mixing paddles are described in U.S. patent application Ser. No. 16/824,616 filed Mar. 19, 2020, and U.S. patent application Ser. No. 17/987,432 filed Nov. 15, 2022, both of which are incorporated herein by reference in their entirety.

Some pods are sized to provide a single serving of the food or drink being produced. Some pods have a volume between 6 and 18 fluid ounces. Pod 200 has a volume of approximately 8.5 fluid ounces. Some pods are filled with all of the ingredients needed to produce the cooled food or drink (except that ambient air is sucked into the pod from the atmosphere while producing the cooled food or drink). Some pods are filled approximately half-way (e.g., between 40% and 60% fill by volume) with the ingredients and the remaining headspace being pressurized with an inert gas (e.g., nitrogen) before the pod is sealed. Some pods are filled ⅓ of the way (e.g., 33% by volume), some pods are filled ⅔ of the way (e.g., 66% by volume), some pods are filled ¾ of the way (e.g., 75% by volume), and some pods are filled ⅘ of the way (e.g., 80%). The remaining head space in the pod allows the ingredients to slosh around during a retort sterilization process which improves heat transfer. Some retort processes are performed with the pods oriented horizontally, such that the pods are oscillated in the direction of their long central axis while other retort processes are performed with the pods oriented vertically, such that the pods are oscillated in a radial or diametrical direction. The headspace also provides room in the pod for the ingredients to expand (e.g., foam or create overrun) in the pod 200 while the cooled food or drink is produced (e.g., when the mixing paddle 250 whips the ingredients at various RPMs (e.g., over 10 RPM, over 50 RPM, over 100RPM, over 200 RPM, etc.) while drawing air into the pod 200 to produce overrun). In some cases, the amount of overrun is a minimum of 30%. Some pods do not need to introduce air and can rely on the inert gas (e.g., nitrogen) in the pod. In these cases, the pod can remain sealed during at least part of the mixing process. In some cases, air can be introduced during the mixing process by rotating the mixing paddle to draw air into the pod and ingredients.

The thickness and material of the sidewall 208 of the pod 200 enables the pod 200 to provide fast and efficient heat transfer between the evaporator of the machine 100 and the ingredients within the pod 200. Some pods have a sidewall 208 that is formed of aluminum or an aluminum alloy and is between 5 and 50 microns thick (approximately 0.0002 inches to 0.002 inches).

Some mixing paddles 250 are formed of the same material as the sidewall 208 of the pod 200 to provide even better heat transfer between the evaporator of the machine 100 and the ingredients within the pod 200. For example, some pods have a sidewall 208 formed of an aluminum alloy, and the mixing paddle 250 is also formed of an aluminum alloy (e.g., the aluminum alloy need not be the exact same). Some evaporators include an aluminum inner surface that defines the receptacle 106 so the material is the same between the evaporator, the pod 200, and the mixing paddle 250. Since the materials are the same, or substantially the same, the thermal expansion and thermal conductivity are also the same, or substantially the same. This means that during cooling, the evaporator, the sidewall 208, and the mixing paddle 250 all conduct heat at the same rate and expand or shrink at the same rate. This allows the engagement and contact pressure between these three components to be the same. This further improves heat transfer and reduces the time required to produce the cooled food or drink.

The bodies of some pods and mixing paddles are made of other materials, for example, tin, stainless steel, and various polymers such as polyethylene terephthalate (PET). Some pods are made of different materials to assist with the manufacturability and performance of the pod. For example, the pod walls and the second end 206 may be made of 3000-series Aluminum (e.g., 3104) while the base may be made of 5000-series Aluminum (e.g., 5182). Some pods include different series of Aluminum (e.g., 2000-series, 6000-series, etc.).

In some pods, the internal surfaces of the pod, including the body, ends, and protrusions, are coated with a lacquer to prevent corrosion of the pod as it comes into contact with the ingredients contained within pod. This lacquer also reduces the likelihood of "off notes" of the metal in the food and beverage ingredients contained within pod. The lacquer coating may consist of any number or combinations of materials such as epoxies, acrylics, polyesters, or laminates. For example, a pod made of aluminum may be internally coated with one or a combination of the following coatings: Sherwin Williams/Valspar V70Q11, V70Q11AA, V70Q05, 32SO2AD, 32S02AM, 32S15AA, 31S44AJ, 40Q60AJ, ALC176R (SW9851040), 5042 H-19; PPG Innovel 2012-823, 2012-820C, UT98D, XB4000DM, XB4000DR, AR916; and/or Akzo Nobel Aqualure G1 50. Other coatings made by the same or other coating manufacturers may also be used. Some pods are internally coated with a layer of coating and the mixing paddle is sized to contact the layer of coating as the mixing paddle is rotated within the pod. In some examples, the layer of coating is a layer of a PET laminated coating. In some examples, the layer of coating has a thickness that remains substantially constant as the single serving of the cooled food or drink is produced (e.g., the coating does not rub off). In some examples the coatings may be applied using a powder coating process. In some examples, the exterior surfaces of the pod may also be coated using the same or different coating materials or processes.

Some mixing paddles are made of the same or similar aluminum alloys and coated with similar lacquers/coatings. For example, Whitford/PPG coating 8870 or PPG AR916 may be used as a coating for mixing paddles. The mixing paddle lacquer may have additional non-stick and hardening benefits for the mixing paddle. Some mixing paddles are electrostatically coated. Some mixing paddles are made of AL 5182-H48 or other aluminum alloys. Some mixing paddles exhibit a tensile strength of 250-310 MPa minimum, a yield strength of 180-260 MPa minimum, and an elongation at break of 4%-12%.

Some mixing paddles are reusable by removing them from the pod, washing them, and reusing them in the same or another pod. In some cases, the pod and the mixing paddle are both formed of aluminum and are both recyclable without having to take apart the pod and separate the mixing paddle from the pod (e.g., removal of the mixing paddle from the pod is generally difficult for a consumer to do and not necessary).

FIG. 3 is a schematic 270 of the flow of ingredients during mixing. In this illustration, the pod and the mixing paddle are frustoconical in shape but this flow of ingredients is also present for the cylindrical pods such as pod 200 and mixing paddle 250. As the mixing paddle rotates within the pod, the helical shape of the mixing paddle draws the ingredients from the sidewall of the pod to the center of the pod and upward in an axial direction (e.g., as denoted by arrows 272). The ingredients also pass through one or more openings of the mixing paddle. The ingredients make significant contact with the mixing paddle during the mixing process and having a cooled mixing paddle allows the mixing paddle to aid in the freezing process. This is an advantage in cases where the mixing paddle is metal (e.g., aluminum) or otherwise has a large thermal conductivity.

Edges of the mixing paddle 250 continuously contact and scrape the sidewall 208 of the pod 200 to remove ice and frozen ingredients off of the sidewall 208. The mixing paddle 250 moves the scraped ingredients to the center of the pod 200 so the cooler ingredients at the sidewall are mixed with the ingredients in the warmer center to improve heat transfer and cool faster. The mixing paddle 250 maintains contact against the sidewall 208 for all rotational positions of the mixing paddle 250 (e.g., as the mixing paddle 250 revolves about 360 degrees within the pod 200). Pods with a sidewall that is the same material as the mixing paddle makes this process more efficient since the thermal expansion and thermal conductivity are the same. Some machines oscillate and/or vibrate the mixing paddles to help remove product sticking to the mixing paddle and/or sticking to the sidewall of the pod.

Some pods are formed from commercially available can sizes, for example, "slim" cans with diameters ranging from 2.080 inches-2.090 inches and volumes of 180 milliliters (ml)-300 ml, "sleek" cans with diameters ranging from 2.250 inches-2.400 inches and volumes of 180 ml-400 ml and "standard" size cans with diameters ranging from 2.500 inches-2.600 inches and volumes of 200 ml-500 ml. The machine 100 is configured to use pods with 2.085±0.10 inches outer diameter. Some pods have an inner diameter of 2.065 inches to 2.075 inches to allow mixing paddles with a diameter of 2.045 to 2.055 inches, respectively, to rotate at an RPM of 10 to 1,500 RPM, resulting in 6,00 to 93,000 square inches scraped per minute.

With an inner diameter of about 2.085 inches, the pod can accommodate a mixing paddle with a diameter of about 2.065 inches to 2.085 inches (i.e., some mixing paddles have the same diameter as the pod). The mixing paddle can revolve in the pod at rotational speeds ranging between 10 RPM and 1,500 RPM. During this time the blade edges of the mixing paddle scrape the internal walls of the pod at rates ranging from 310 to 46,500 square inches per minute. The scraped area per minute multiplies with each scraping edge on the mixing paddle (i.e., a mixing paddle with two edges would scrape approximately 620 to 93,000 square inches per minute). This scraping and mixing process helps distribute the ice crystals that form at the wall of the pod to the interior of the pod.

Some pods have a decorative external coating of no more than 10-50 microns thickness (e.g., less than 50 microns, or approximately 0.002 inches). Some pods do not have an internal or external coating on the ends.

In addition to single-use pods, some pods are reusable. Some pods are used, washed, and reused. Some pods are purchased empty and filled before use. Some pods are purchased or acquired full, used, and refilled by a user or by the machine. Some pods are sterilized after use and sterilized after refill to enable room temperature storage (e.g., shelf-stable pods). Some pods include resealed features that allow the pod to be refilled and resealed. Some pods can be purchased empty and used with a home ice cream making kit with clean-label ingredients.

The machine 100 includes a touch-screen user interface 108. A user engages with the user interface 108 to select/confirm one or more settings of the machine 100 (e.g., select the product to be produced, confirm the product, etc.), display an indication of time remaining during the process of producing the cooled food or drink (e.g., a circular display, a bar display, a digital clock, etc.), and display instructions for the user (e.g., ask the user to place their bowl or cone in the dispensing area 110 of the machine 100 to get ready for the product to be dispensed).

Figure 4:
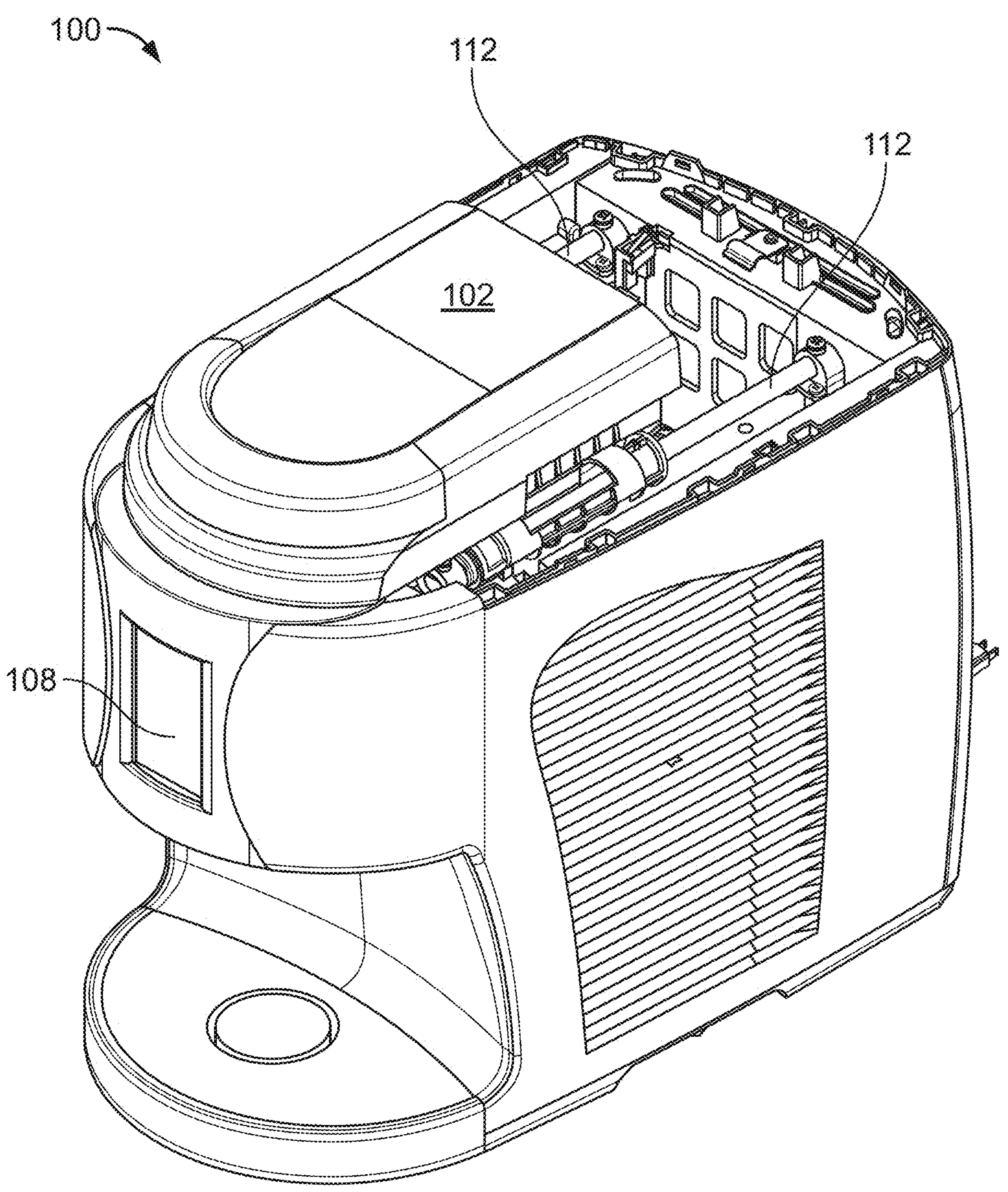
FIG. 4 is a view of the machine with a top cover removed.

FIG. 4 is a perspective view of the machine 100 with the top cover of the machine 100 removed. The sliding lid 102 is mounted on a pair of cylindrical rails 112 and is linearly slidable back and forth to open and close the area where the pod 200 is inserted.

Figures 5A, 5B:
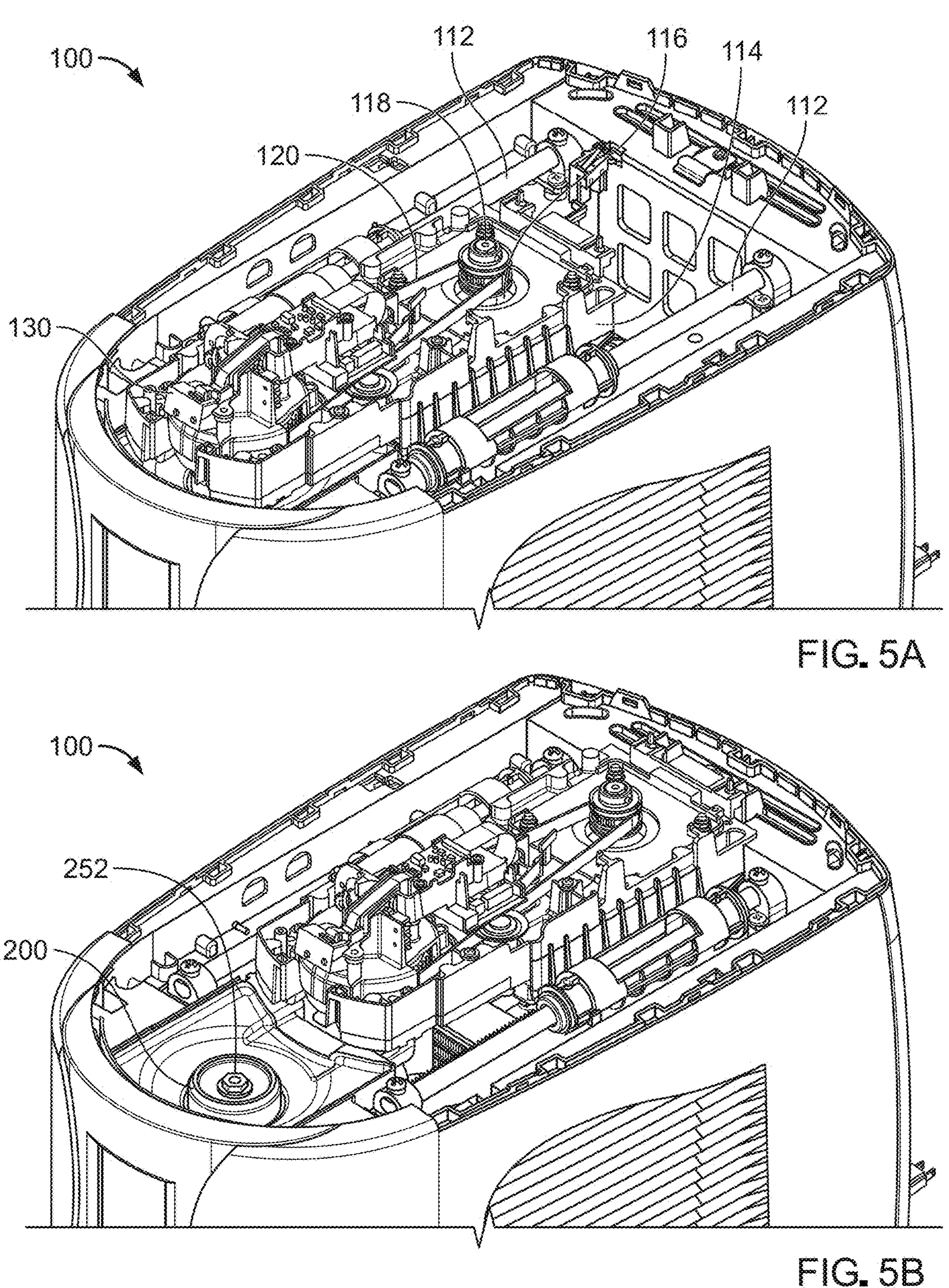
FIGS. 5A and 5B are views of the machine with a top cover of the sliding lid assembly removed.

FIGS. 5A and 5B are perspective views of the machine 100 with the top cover of the machine 100 removed and the top cover of the sliding lid 102 removed. FIG. 5A shows the machine 100 in the closed configuration and FIG. 5B shows the machine in the open configuration. The sliding lid 102 includes a housing 114 that includes a drive motor 116 mounted on an underside of the housing 114. The drive motor 116 includes a motor shaft 118 that is rotationally coupled to the mixing paddle 250. The rotational coupling involves transferring torque from the drive motor 116, through a belt 120, to an axially movable drive shaft 122 (shown in FIGS. 6A and 6B).

The machine 100 raises and lowers the drive shaft 122 via a plunger motor 124 (shown in FIG. 6B) to axially and rotationally engage the drive shaft 122 to the receptacle of the drive head 252 of the mixing paddle 250. The drive motor 116 and the plunger motor 124 are mechanically attached to the sliding lid assembly 102 so they both translate with the sliding lid assembly 102. The belt 120 is under tension both when the lid is in its open position and when the lid is in its closed position. The belt 120 also translates with the sliding lid assembly 102. Some machines include a belt tensioning system to maintain the tension of the belt 120.

Figure 6A:
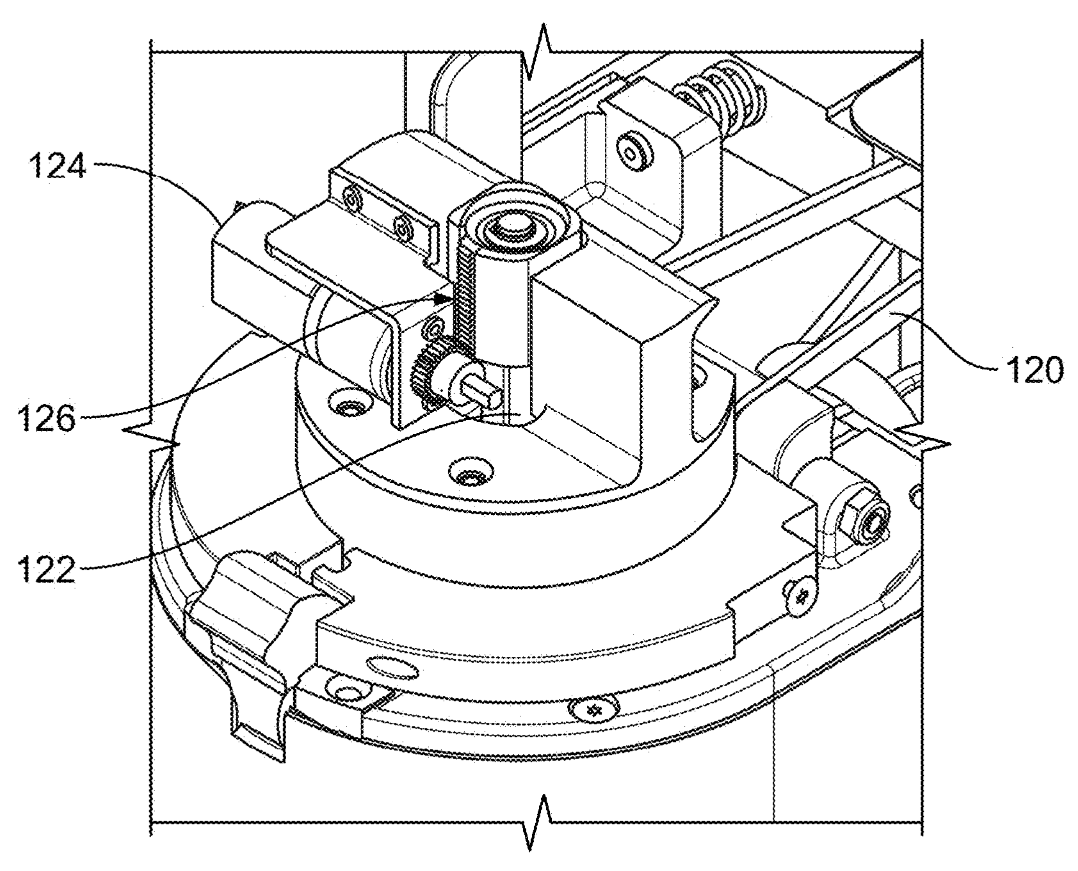
FIGS. 6A and 6B are views of a dagger assembly of the machine with the drive shaft in a retracted position.
Figure 6B:
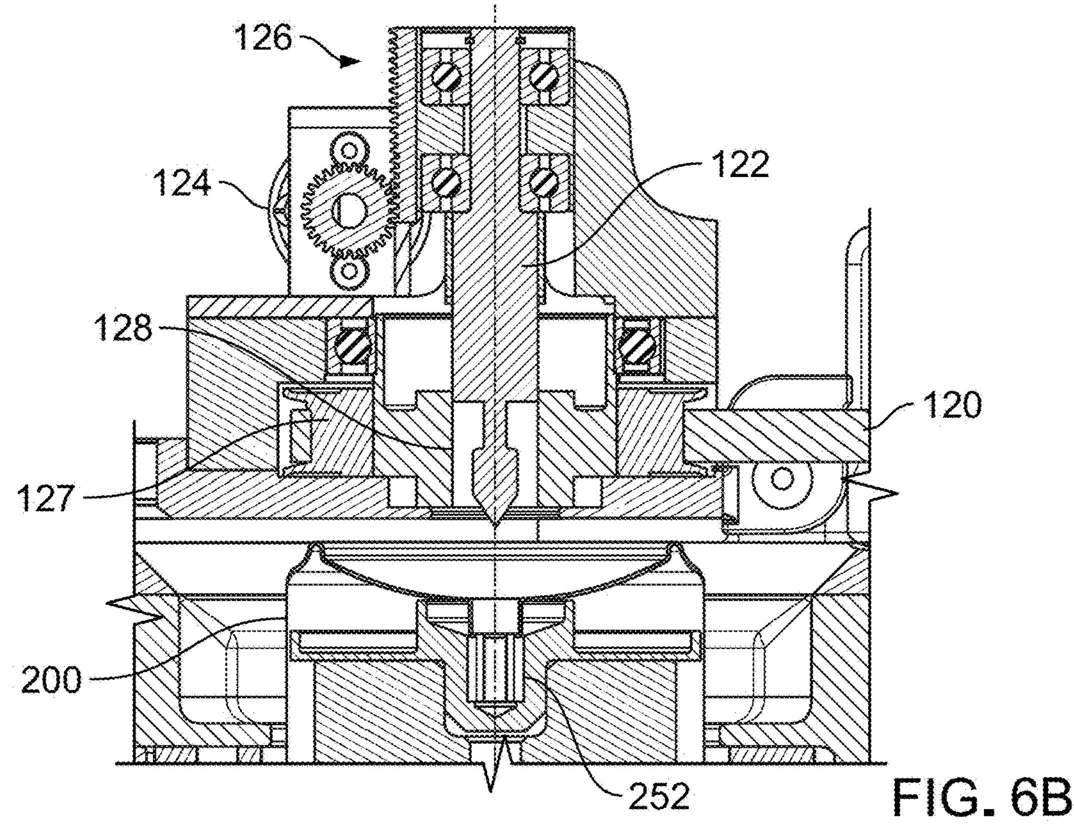
Figure 7A:
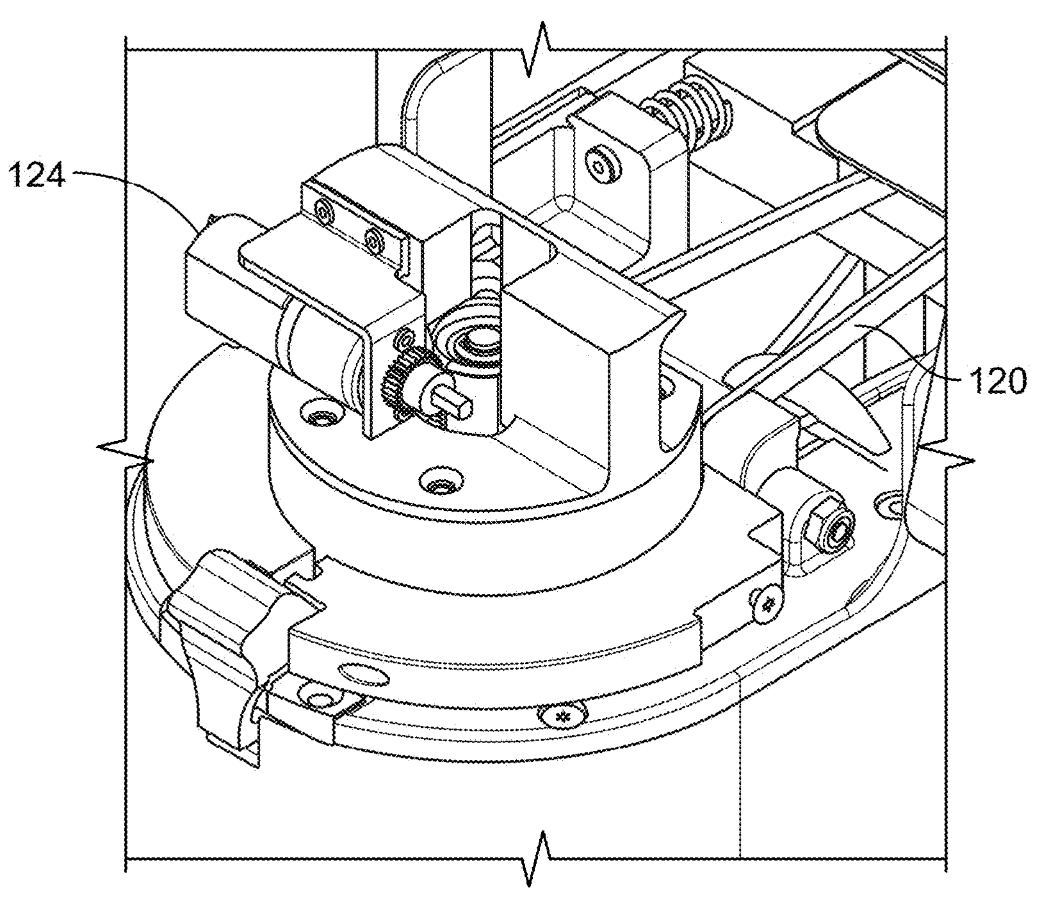
FIGS. 7A and 7B are views of the dagger assembly of the machine with the drive shaft in an engaged position.
Figure 7B:
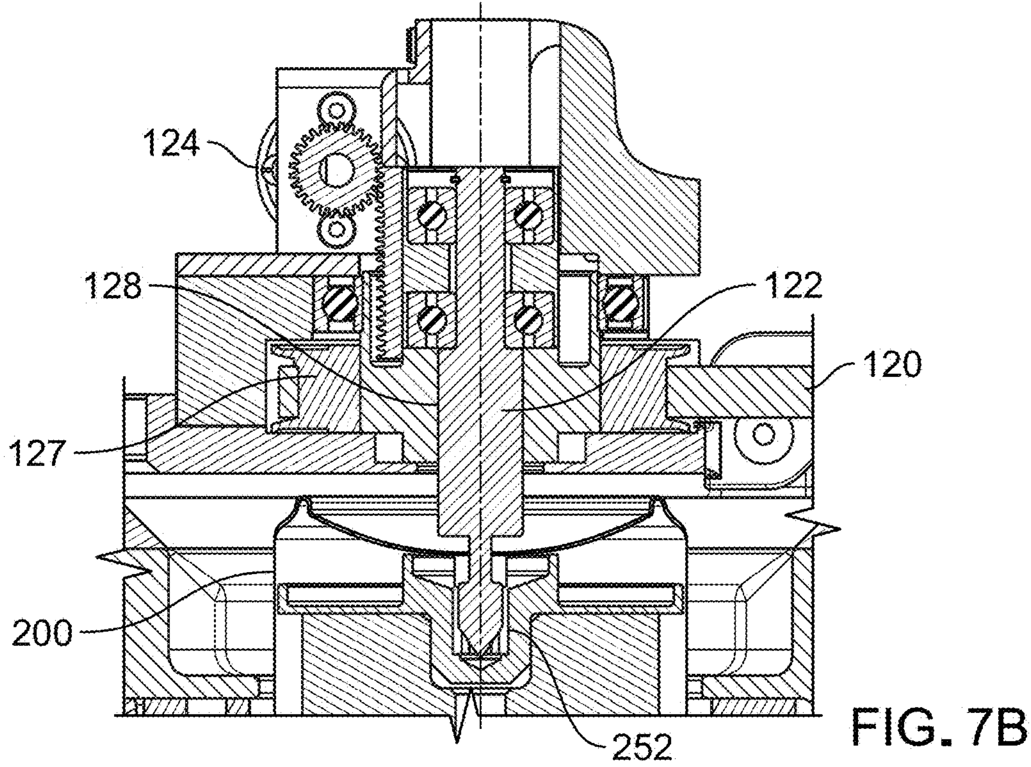

FIGS. 6A and 6B are views of the plunger assembly of the machine 100 in a disengaged configuration with the pod 200. The plunger motor 124 is axially coupled to the drive shaft 122 via a rack and pinion system 126. The plunger motor 124 translates the drive shaft 122 axially between the disengaged configuration (shown in FIGS. 6A and 6B) and an engaged configuration (shown in FIGS. 7A and 7B). A pulley 127 is rotationally coupled to the belt 120. The pulley 127 has a keyed bore 128 (e.g., a hexagonal-shaped bore) that slidably receives the similarly keyed drive shaft 122 and rotationally couples the torque of the drive motor 116 to the drive shaft 122.

Figure 8A:
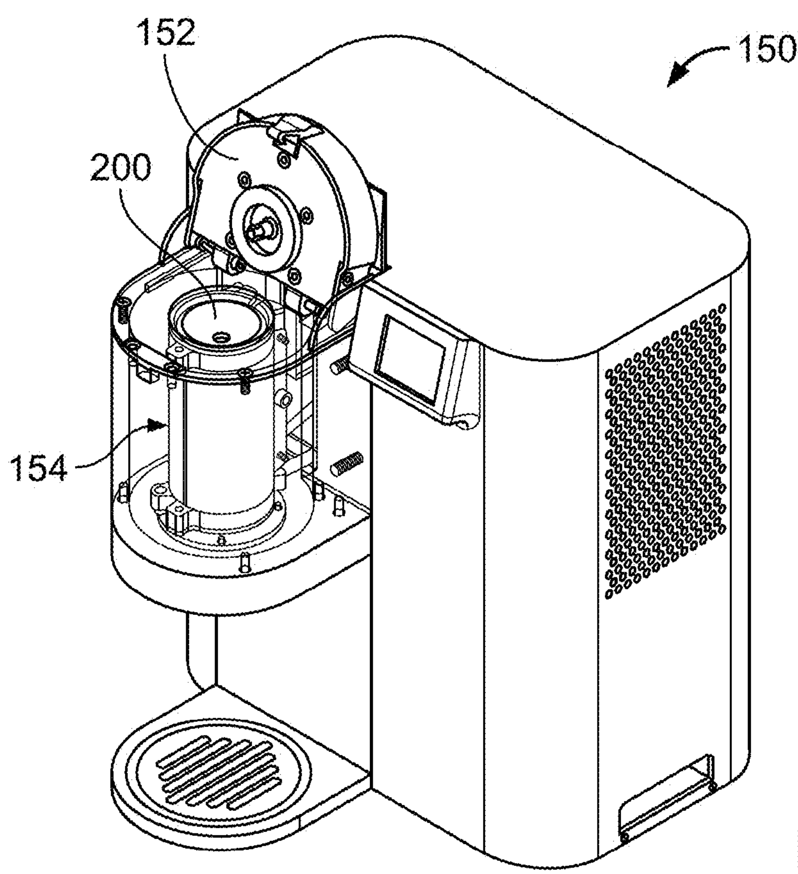
FIGS. 8A and 8B is a perspective view of a machine for rapidly producing a chilled or frozen food or drink showing an evaporator mounted in the machine.
Figure 8B:
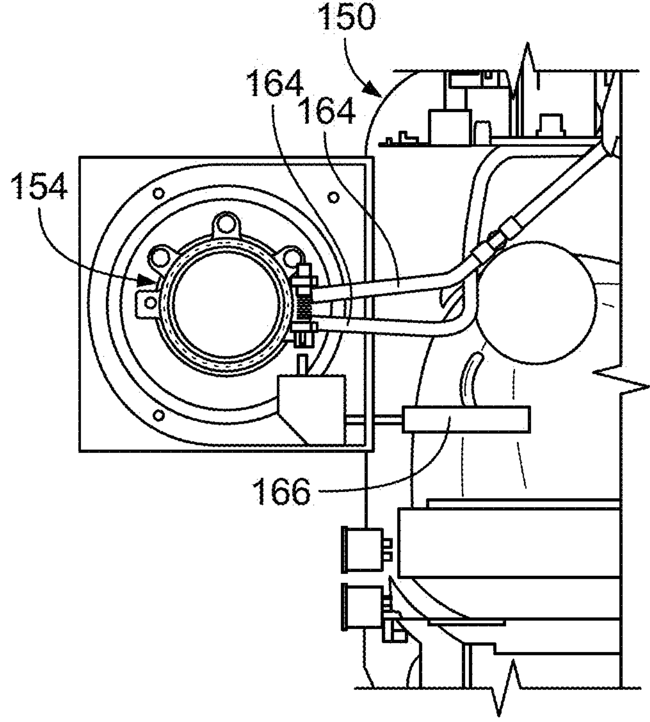

FIGS. 8A and 8B are perspective and cross-section views of a machine 150 for producing a single serving of a cooled food or drink. Machine 150 is similar to machine 100 but includes a pivoting lid 152 instead of the sliding lid 102 of machine 100. Both machine 100 and 150 include an evaporator 154 for cooling the pod 200 when the pod 200 is inserted into the respective machine. Additional evaporators for use with machines 100 and 150 are described in U.S. patent application Ser. No. 16/459,388 filed Jul. 1, 2019, U.S. patent application Ser. No. 16/824,616 filed Mar. 19, 2020, and U.S. patent application Ser. No. 17/987,432 filed Nov. 15, 2022, all of which are incorporated herein by reference in their entirety.

Figure 9:
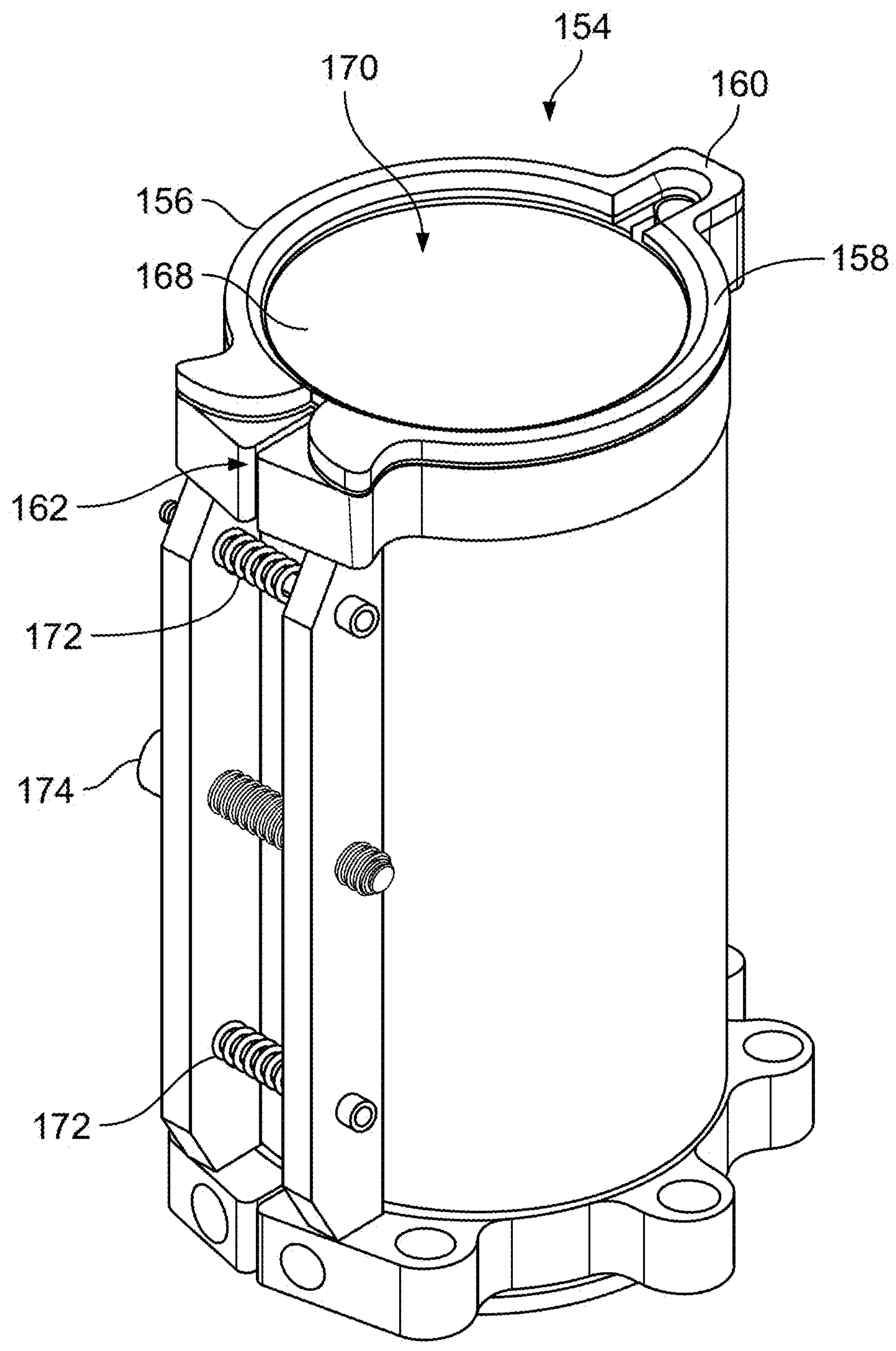
FIG. 9 is a perspective view of an evaporator of the machine.

FIG. 9 is a perspective view of the evaporator 154 for cooling a pod. The evaporator 154 has a clamshell configuration with a first portion 156 attached to a second portion 158 by a living hinge 160 on one side and separated by a gap 162 on the other side. Inner surfaces 168 of the evaporator 154 define a receptacle 170 for receiving a pod (e.g., pod 200). Refrigerant flows to the evaporator 154 from other components of a refrigeration system of the machine 100 (e.g., a condenser) through fluid channels 164 (shown in FIG. 8B). The refrigerant flows through the evaporator 154 in internal channels through the first portion 156, the living hinge 160, and the second portion 158. In some evaporators, the first portion 156 and the second portion 158 are mechanically separate parts that are joined together by a hinge other than a living hinge 160 (e.g., a piano hinge or a deformable hinge. In some evaporators, the first portion and second portion are not hinged at all (e.g., two separate halves are pushed together and pulled apart by one or more motors of the machine). Some evaporators have three or more sections (e.g., between 3-10 sections) that are hinged or forced together by one or more motors of the machine.

The evaporator 154 has an open position and a closed position. In the open position, the gap 162 opens to provide an air gap between the first portion 156 and the second portion 158. The inner diameter ID of the evaporator 154 is larger in the open position than in the closed position. Pods can be inserted into and removed from the evaporator 154 while the evaporator 154 is in its open position. Transitioning the evaporator 154 from its open position to its closed position after a pod is inserted tightens the evaporator 154 around the outer diameter of the pod to clamp the pod in place and limit rotational and axial movement of the pod via friction. For example, the machine 100 is configured to use pods with a 2.085 inches outer diameter. The evaporator 154 has an inner diameter of 2.115 inches in the open position and an inner diameter of 2.085 inches in the closed position. Some machines have evaporators sized and configured to cool other sized and shaped pods (e.g., frustoconical).

The closed position of evaporator 154 improves heat transfer between an inserted pod 200 and the evaporator 154 by increasing the contact area between the pod 200 and the evaporator 154 and reducing or eliminating an air gap between the sidewall 208 of the pod 200 and the inner surface of the evaporator 154. In some pods, the pressure applied to the pod by the evaporator 154 is opposed by the mixing paddle, pressurized gases within the pod, or both to maintain the casing shape of the pod. This ensures mechanical contact between the evaporator, the sidewall of the pod, and the mixing paddle to improve heat transfer while the evaporator 154 cools the pod and while the mixing paddle mixes the ingredients within the pod. In some examples, the portion of the evaporator in contact with the pod, the sidewall of the pod, and the mixing paddle are formed of the same material so that thermal expansion is uniform across the evaporator, mixing paddle, and pod during the cooling and mixing process. In some examples, the evaporator, mixing paddle, and pod are all formed of one or more aluminum alloys for this purpose.

Machine 150 includes an evaporator motor 166 that is mechanically coupled to the evaporator 154 and rotates a bolt 174 to move the evaporator 154 between its open and closed configuration. Some machines include an evaporator motor that is directly attached to the evaporator 154 and bolt 174. The evaporator motor 166 controls the closure of the evaporator 154 against the bias of two springs 172 to provide a closure force against the pod 200 of approximately 10-50 lbf (pound-force) and an approximate torque clamping force of 1,000 to 1,500 ozf-in. In some examples, the evaporator motor 166 uses a feedback control system to know when the evaporator has reached the closed configuration. For example, when the voltage and/or current of the evaporator motor 166 reaches a threshold, the evaporator motor 166 determines that evaporator 154 is in the closed configuration and locks the evaporator 154 at the current position to maintain the clamping pressure on the pod 200. Some machines use a hard-stop system where the evaporator motor 166 stops when the evaporator reaches a particular amount of closure. Instead of an evaporator motor 166, some machines use "wedge system" such that a manual force applied by the user (e.g., when the sliding lid 102 is closed or when the pivoting lid 152 is closed) forces the evaporator 154 into the closed position (and vice versa).

Figure 10A:
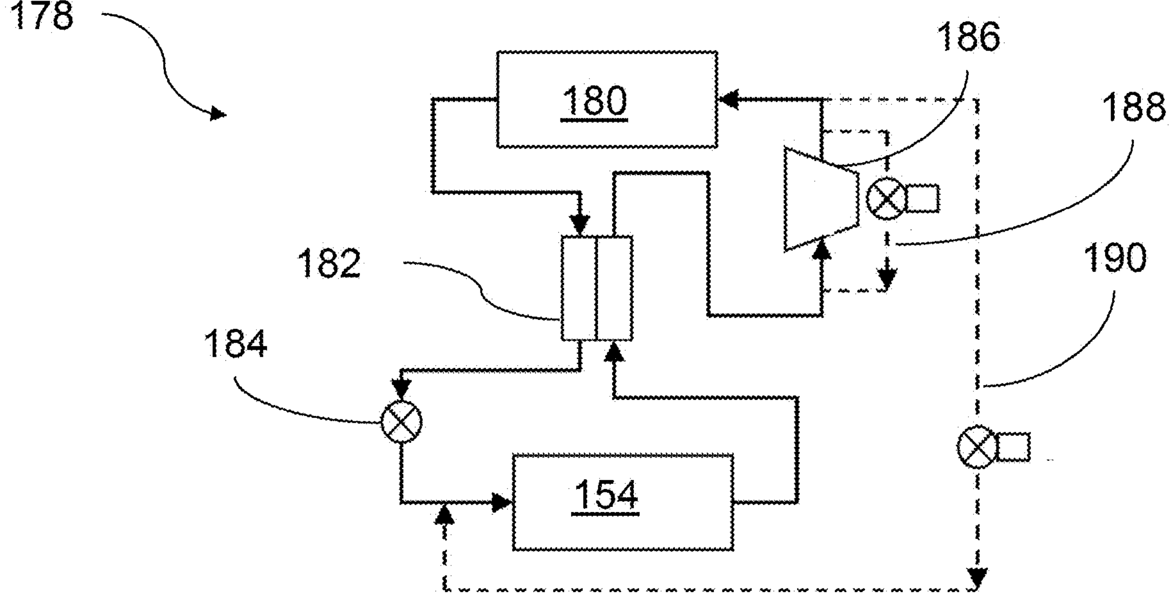
FIG. 10A is a schematic of a refrigeration system of the machine.

FIG. 10A is a schematic of a refrigeration system of machine 100. Additional refrigeration systems for machine 100 are described in more detail in U.S. patent application Ser. No. 16/459,388 filed Jul. 1, 2019, U.S. patent application Ser. No. 16/824,616 filed Mar. 19, 2020, U.S. patent application Ser. No. 17/335,891 filed Jun. 1, 2021, and U.S. patent application Ser. No. 17/987,432 filed Nov. 15, 2022, all of which are incorporated herein by reference in their entirety.

Refrigeration system 178 includes the evaporator 154, a condenser 180, a suction line heat exchanger 182, an expansion device 184, and a compressor 186. The expansion device 184 can include a valve or a capillary tube both of which could be used in the refrigeration system 178. High-pressure, liquid refrigerant flows from the condenser 180 through the suction line heat exchanger 182 and the expansion device 184 to the evaporator 154. The expansion device 184 restricts the flow of the liquid refrigerant fluid and lowers the pressure of the liquid refrigerant as it leaves the expansion device 184. The low-pressure liquid-gas mixture then moves to the evaporator 154 where heat is absorbed from a pod 200 and its contents in the evaporator 154 changes the refrigerant from a liquid-gas mixture to a gas. The gas-phase refrigerant flows from the evaporator 154 to the compressor 186 through the suction line heat exchanger 182. In the suction line heat exchanger 182, the cold vapor leaving the evaporator 154 pre-cools the liquid leaving the condenser 180. The refrigerant enters the compressor 186 as a low-pressure gas and leaves the compressor 186 as a high-pressure gas. The gas then flows to the condenser 180 where heat exchange cools and condenses the refrigerant to a liquid.

The refrigeration system 178 optionally includes a first bypass line 188 or valve and second bypass line 190 or valve. The first bypass line 188 directly connects the discharge of the compressor 186 to the inlet of the compressor 186. Disposed on both the first bypass line and second bypass line are bypass valves that open and close the passage to allow refrigerant bypass flow. Diverting the refrigerant directly from the compressor discharge to the inlet can provide evaporator defrosting and temperature control without injecting hot gas to the evaporator 154. The first bypass line 188 also provides a means for rapid pressure equalization across the compressor 186, which allows for rapid restarting (i.e., freezing one pod after another quickly). The second bypass line 190 enables the application of warm gas to the evaporator 154 to defrost the evaporator 154 or to allow residual product to be released from the pod at the end of a freeze cycle. The bypass valves may be, for example, solenoid valves or throttle valves.

Figure 10B:
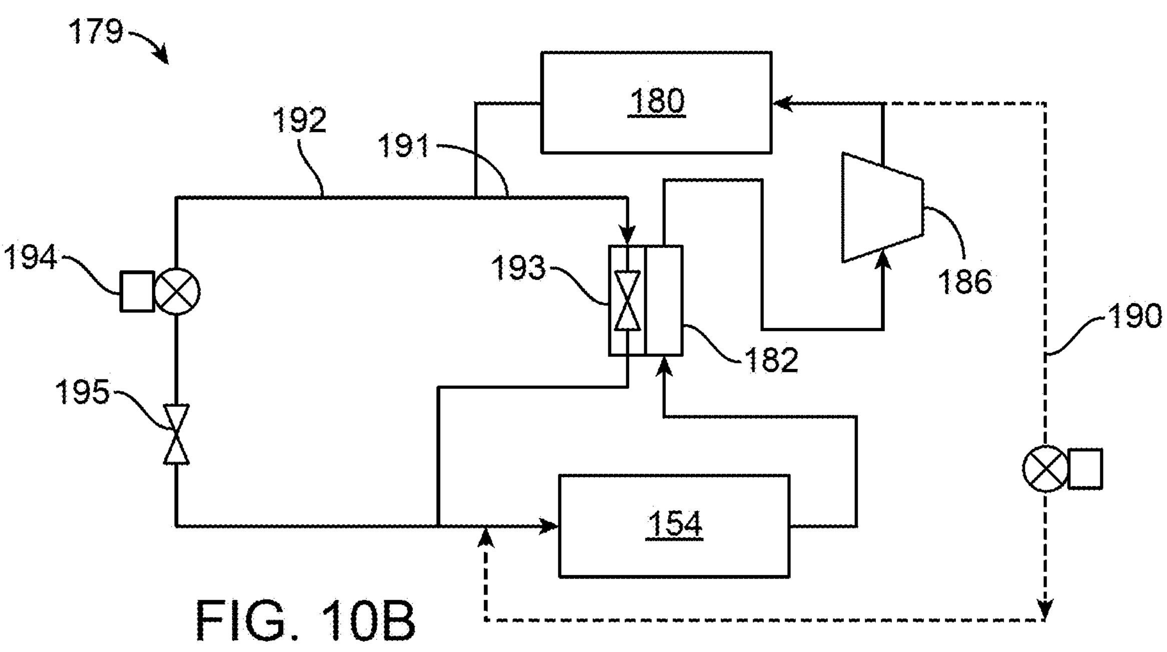
FIG. 10B is a schematic of an alternative refrigeration system of the machine with two expansion valves.
Figure 10C:
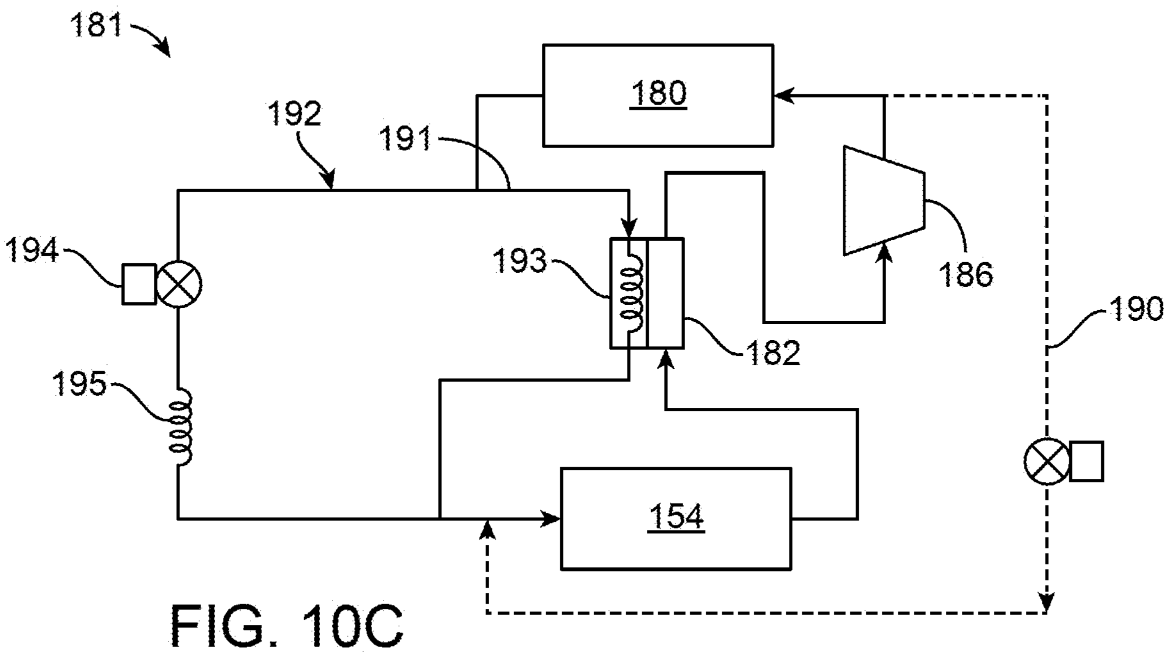
FIG. 10C is a schematic of an alternative refrigeration system of the machine in which the two expansion valves are implemented as capillary tubes.

FIG. 10B is a schematic for an alternative refrigeration system 179 for the machine 100. Refrigeration system 179 is similar to refrigeration system 178 but does not include the first bypass line 188. Refrigeration system 179 includes a suction line heat exchanger 182 that has an expansion device 193, which is located along the primary path 191 carrying liquid refrigerant from the condenser 180 to the evaporator 154. In the implementation shown in FIG. 10B, the expansion device 193 is part of the suction line heat exchanger 182. In other examples, the expansion device 193 is located downstream of the suction line heat exchanger 182 (e.g., between the suction line heat exchanger 182 and the evaporator 154). Refrigeration system 179 includes bypass line 192 that runs in parallel to the primary path 191. A control valve 194 and a second expansion device 195 are disposed on the bypass line 192. In some examples, the control valve 194 is located upstream of the second expansion device 195. In other examples, this order is reversed. In some refrigeration systems 179, either the first expansion device 193 or the second expansion device 195, or both, may be a capillary tube.

FIG. 10B is a schematic of an alternative refrigeration system 181 in which both expansion devices 193, 195 are capillary tubes. In some implementations, the two capillary tubes 193, 195 can be of different sizes. For example, the second capillary tube 195 may be smaller than first capillary tube 193. In some cases, an overall length of the second capillary tube 195 as measured in a straight distance from a first end of the second capillary tube 195 to a second end of the second capillary tube 195 is smaller than an overall length of the first capillary tube 193 as measured in a straight distance from a first end of the first capillary tube 193 to a second end of the first capillary tube 193. In some examples, a length (e.g., an overall length, straight length, or a fluid path length) of the second capillary tube 195 is ¼, ⅓, ½, or any other fractional length less than one of a length of the first capillary tube 193.

In some cases, the number of coils (e.g., number of 360 degree rotations) of the second capillary tube 195 (e.g., around the suction line) is smaller than the number of coils of the first capillary tube 193. In some examples, the number of coils affects the pressure reduction in the refrigeration system. In some cases, the diameter of the tubing that includes the capillary tubes 193, 195 is the same. In some examples, the diameter of the tubing is 1/16 inch. In some examples, the length of the second capillary tube 195 is defined by a fluid path length between a first end of the second capillary tube and a second end of the second capillary tube. In some examples, the length of the first capillary tube 193 is defined by a fluid path length between a first end of the first capillary tube 193 and a second end of the first capillary tube 193.

Control valve 194 controls whether refrigerant flows through bypass line 192. When control valve 194 is open, refrigerant flows through both the primary path 191 and the bypass line 192, and when control valve 194 is closed, refrigerant does not flow through bypass line 192, but flows through primary path 191. When the control valve 194 is closed, refrigerant does not flow through the bypass line 192 and only flows through the primary path 191 as it moves from the condenser 180 to the evaporator 154. Control valve 194 may be used to control the temperature and pressure of the refrigerant entering the evaporator 154. When control valve 194 is closed and refrigerant is flowing through the primary path 191 and not though the bypass line 192, there is a greater pressure drop between the condenser 180 and the evaporator 154, and therefore the refrigerant enters the evaporator 154 at a lower pressure and temperature compared to when the control valve 194 is open. Opening the control valve 194 so that there is less of a pressure and temperature drop of the refrigerant between the condenser 180 and the evaporator 154 compared to when the control valve 194 is closed allows the evaporator 154 to be pre-cooled before the pod 200 and ingredients are received in the receptacle 106 of the machine 100. In some examples, the control valve 194 is a solenoid valve or any other type of flow-regulating valve suitable for use in a refrigeration system. In some examples, the control valve 194 is electrically-controlled by the processor of the machine 100 such that it opens to precool the evaporator and closes to produce the frozen confection.

In some implementations, with bypass line 192 closed, the pressure drop from the condenser 180 to the evaporator 154 is about 178 psi, which equates to a temperature drop of 106° F. for R-1270. With bypass line 192 open, the pressure drop from the condenser 180 to the evaporator 154 is about 130-150 psi, which equates to a temperature drop of 52-72° F. for R-1270. Some refrigeration systems have a 150 psi drop from the condenser 180 to the evaporator 154, which equates to a temperature drop of 72° F. drop for R-1270. This allows the refrigeration system to cool food or drink quickly (e.g., within 2 minutes). In some implementations, the refrigeration system achieves this with a condenser 180 pressure of 206 psi and a condenser 180 outlet temperature of 77° F.

In some implementations, the machine (e.g., the electronic controller of the machine) determines whether to open or close control valve 190 based on the evaporator inlet temperature (e.g., based on a rate of change of the evaporator inlet temperature). For example, if the rate of change of the evaporator inlet temperature is too slow (e.g., less than 1° F./second), the electronic controller of the machine opens control valve 194 to increase the rate of change of the evaporator inlet temperature. When the electronic controller determines that the evaporator outlet reaches a near freezing temperature of the refrigerant, the machine closes control valve 194.

In some implementations, the machine controls the control valve 194 based on the following logic/method. First, the compressor 186 is started and the machine waits for an initial pre-determined time (e.g., 3 seconds) to avoid temperature spikes during start-up. After the initial pre-determined time has passed, the machine determines whether the evaporator inlet temperature is decreasing at a pre-determined rate (e.g., 1° F./second) during a second pre-determined time (e.g., 3 seconds) and controls the control valve 194 based on whether the evaporator inlet temperature is decreasing at the pre-determined rate. For example, if the machine determines that the evaporator inlet temperature is decreasing at 1° F./second during 3 seconds, then the machine controls the control valve 194 to open. This causes the rate of change of the evaporator inlet temperature to increase. Once the control valve 194 is opened, the machine continuously senses the evaporator outlet temperature. Once the machine determines that evaporator outlet temperature reaches a temperature indicative of freezing of the refrigerant, the machine controls the control valve 194 to close. Some implementations use other the pre-determined rates and/or pre-determined times. For example, some machines use rates between 0.5° F./second and 2° F./second and times between 1 and 10 seconds. The specific pre-determined rates and pre-determines times used with the machine can vary based on tuning of the refrigeration system.

In some implementations, the logic of the preceding paragraph means that the machines open control valve 194 when the machine has been shut off for a period of time (e.g., an hour or more) or has been sitting in an idle mode in a warm ambient environment. In some cases, this means that the control valve 194 is not used (e.g., opened) to cool every pod that has been inserted into the machine, but instead only when the above-noted conditions are present (e.g., the machine has been shut off for a period of time and/or has been sitting in an idle mode in a warm ambient environment).

A key advantage of the secondary line 192 is that when the control valve 194 is open, the refrigeration system gets to steady state faster, which is important since the machines are mostly in an off-state prior to being used and thus needs to get ready to cool a pod quickly. The lower pressure drop of secondary line 192 means that higher refrigerant mass flow and reduced compressor load occurs which yields the correct phases of liquid at the right points in the system faster than without the secondary line 192.

Figure 11:
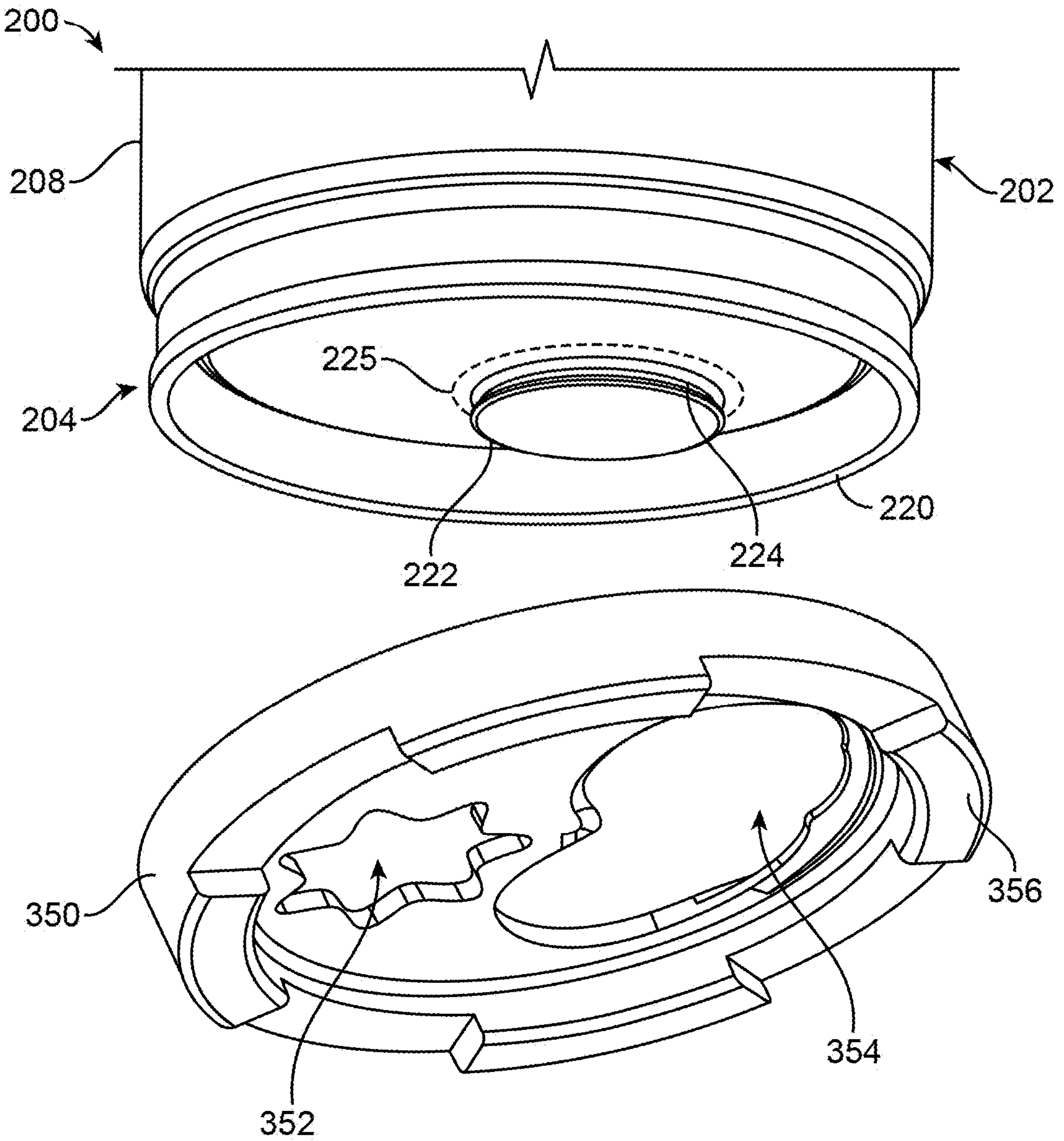
FIG. 11 is a view of a first end of a pod with its cap spaced apart from its base for ease of viewing.

FIG. 11 is a view of a pod with a base or lid 220 attached to the first end 204 of the pod 200. The base 220 is metal (e.g., aluminum) and crimped onto the first end 204 of the pod 200 to form a fluid tight seal with the body 202 of the pod 200. The base 220 includes a removable protrusion 222 with a weakened score line 224. In this example, the removable protrusion 222 is integrally formed with the base 220. The protrusion 222 can be formed, for example, by stamping, deep drawing, or heading a sheet of aluminum being used to form the base 220. The scoring can be a vertical score 225 into the base of the aluminum sheet or a horizontal score 224 into the wall of the protrusion 222. For example, the material can be scored from an initial thickness of 0.008 inches to 0.010 inches (e.g., the initial thickness of base 220 or protrusion 222 can be 0.008 inches) to a post-scoring (residual) thickness of 0.001 inches-0.008 inches (e.g., the score residual thickness can be 0.002 inches when the weakened score line 225 is 0.006 inches deep into 0.008 inches thick aluminum base lid material). Other caps include a removable protrusion that is inserted into the base 220 after the base 220 is formed instead of being integrally formed with the base 220.

Figure 15A:
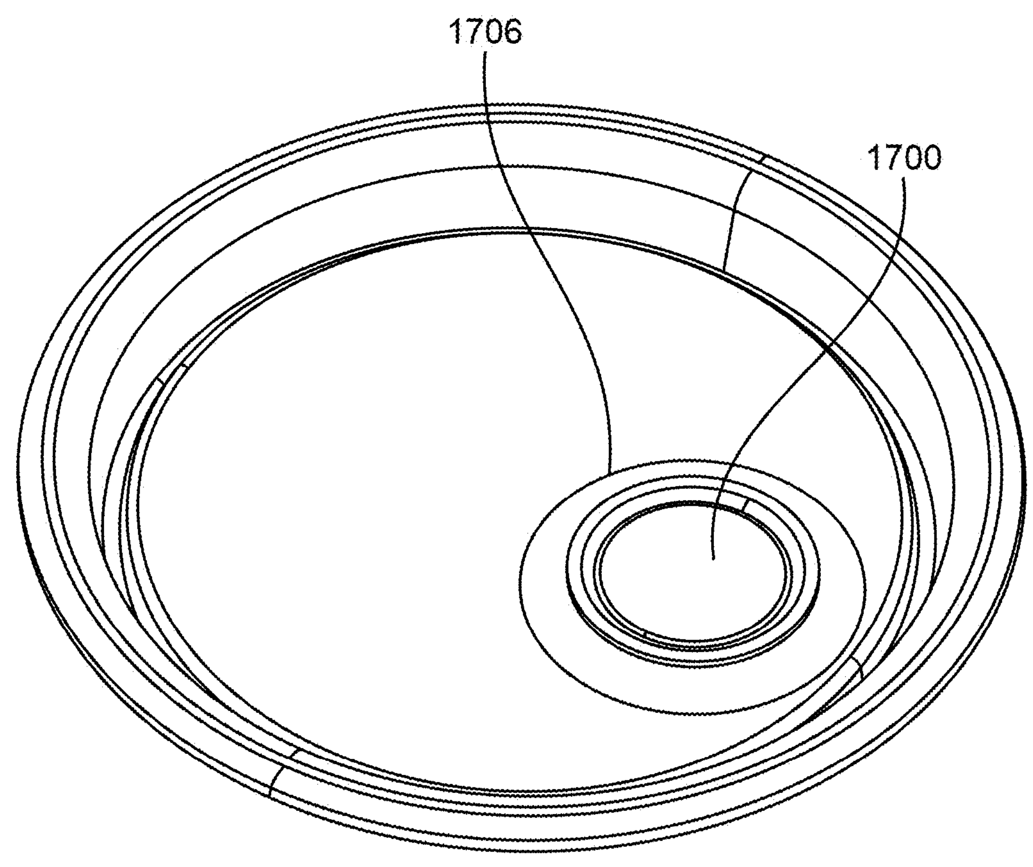
FIGS. 15A-15E are views of an alternative removable protrusion structure.
Figure 15B:
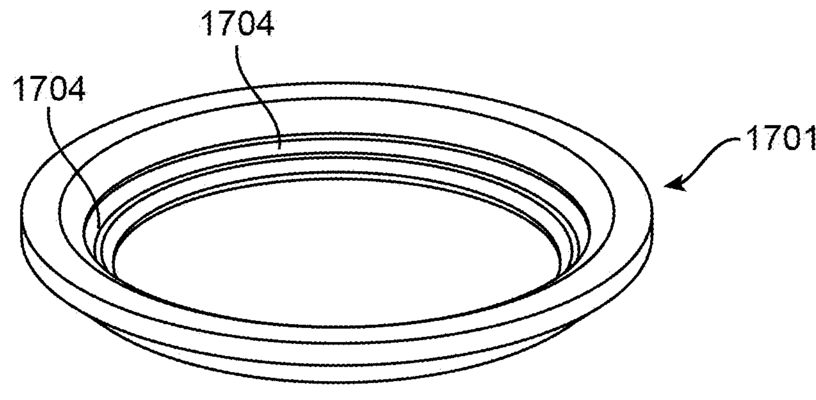
Figure 15C:
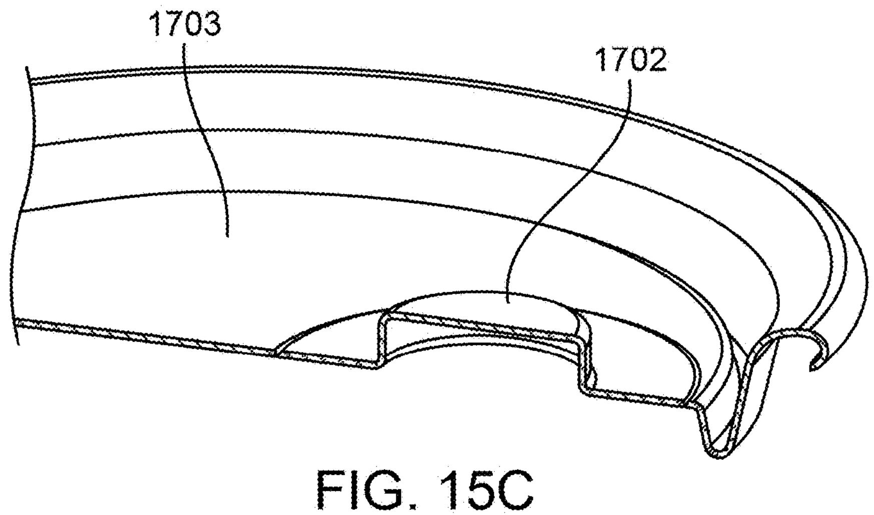
Figure 15D:
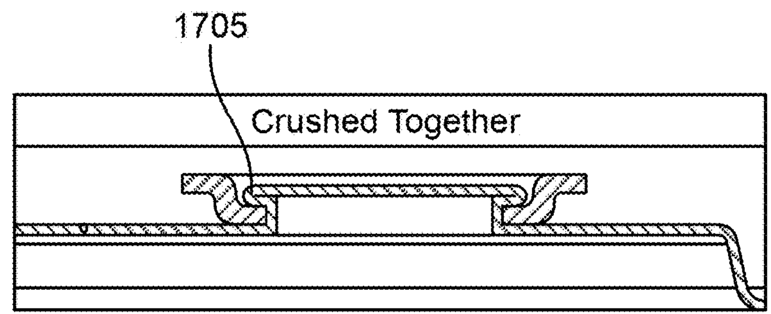
Figure 15E:
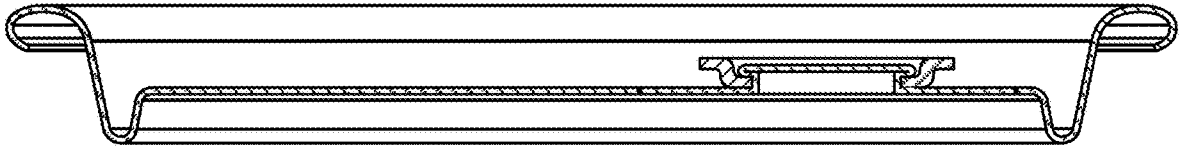

FIGS. 15A-15E are views of an alternative removable protrusion structure 1700. Whereas protrusion 222 is either secured into place with an adhesive or integrally formed with the base, protrusion 1700 (FIG. 15A) is formed using a washer 1701 (FIG. 15B) that is pressed into a post 1702 formed on the base or lid 1703 (FIG. 15C). The post can be formed in the same manner as protrusion 222, e.g., by stamping, deep drawing, or heading a sheet of aluminum being used to form the base. To form the protrusion, the washer 1701 is placed over and around the formed post 1702. A mechanical press is then used to compress and deform the post so that it fills in and conforms to the recessed channel 1704 in the washer, as shown by feature 1705 in FIG. 15D. This process yields a protrusion 1700 that is identical in function to protrusion 222. However, it is significantly easier and less expensive to manufacture.

Base 1703 also includes a weakened score line 1706, which can also be a vertical score into the base of the aluminum sheet 1703 or a horizontal score into the wall of the post 1702.

A cap 350 is removably attached over the base 220 of the pod 200 after the base 220 is attached (for example, by crimping or seaming) to the body 202 of the pod 200. FIG. 11 shows the cap 350 spaced apart from the base 220 for ease of viewing. The machine 100 rotationally engages the cap 350 to rotate the cap 350. The cap 350 includes one or more drive lugs 356 (e.g., castellations, rooks) that axially extend from the body of the cap 350. Cap 350 has four drive lugs. The machine 100 engages with the drive lugs 356 to rotationally couple the machine to the cap 350 to rotate the cap 350 relative to the protrusion 222. The cap 350 engages with the removable protrusion 222 to lift it off of the base 220 at the weakened score line 224 to form an opening or aperture 226 (at least partially shown in FIG. 12E) in the base 220 of the pod 200. The aperture 226 is exposed and extends through the base 220 when the protrusion 222 is removed. The machine 100 dispenses the produced food or drink from the pod 200 through the aperture 226.

FIGS. 12A-12G are perspective views of the cap 350 attached to the base 220 of the pod 200. The cap 350 is attached to the base 220 by being retained by a radially extending inward lip 358 that circumscribes an inner surface of the cap 350. Axial movement of the cap 350 to remove the cap 350 from the pod 200 is resisted by engagement of the inward lip 358 with the pod 200.

FIGS. 12A-12G illustrate rotation of the cap 350 around the first end 204 of the pod 200 to cut and carry away protrusion 222 and expose aperture 226 extending through the base 220. In some cases, the protrusion 222 and corresponding aperture 226 when the protrusion 222 is sheared and carried away has a surface area between 5% to 30% of the overall pod end surface area.

The cap 350 has a first aperture 352 (dispensing aperture) and a second aperture 354 (shearing aperture). The first aperture 352 approximately matches the shape of the aperture 226. The second aperture 224 has a shape corresponding to two overlapping circles. One of the overlapping circles has a shape that corresponds to the shape of the protrusion 222 and the other of the overlapping circles is slightly smaller. A ramp 360 extends between the outer edges of the two overlapping circles. There is an additional 0.010 to 0.100 inches of material thickness at the top of the ramp transition (e.g., 0.070 inches). This extra height helps to lift and rupture the protrusion's head and open the aperture 226 during the rotation of the cap 350.

Figure 12A:
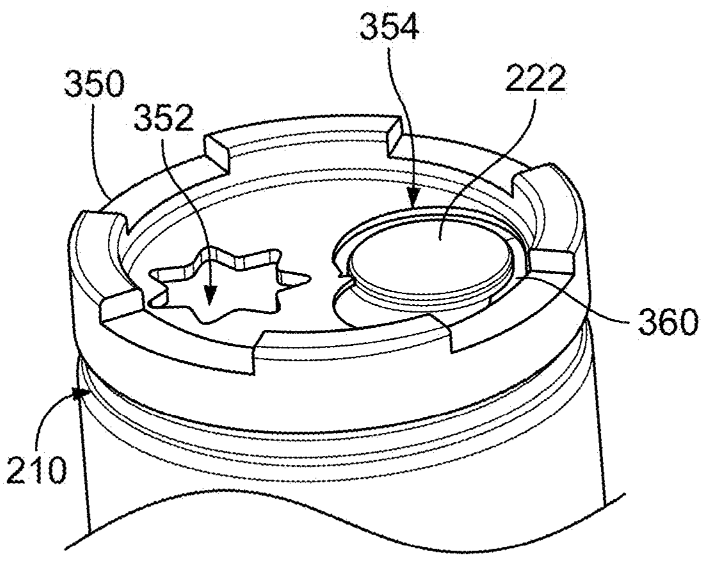
FIGS. 12A-12G illustrate rotation of the cap around the first end of the pod to remove a protrusion to open an aperture extending through the base.
Figure 12B:
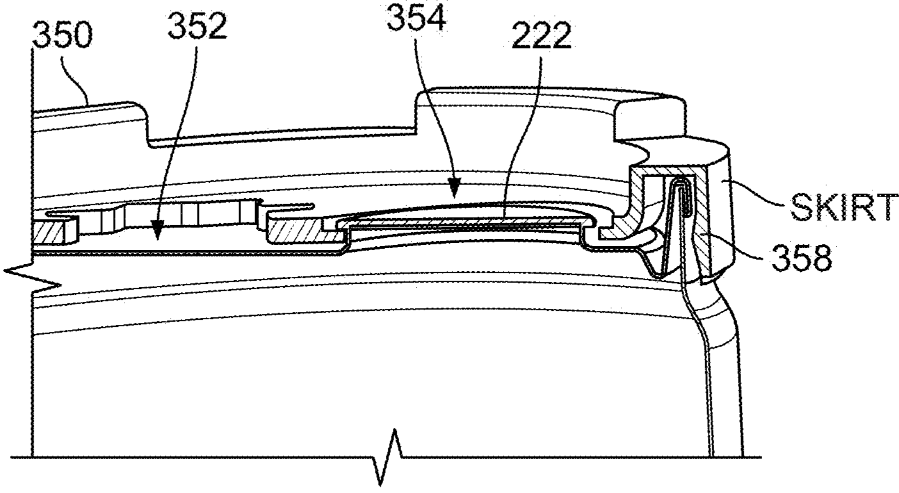
Figures 12C, 12D:
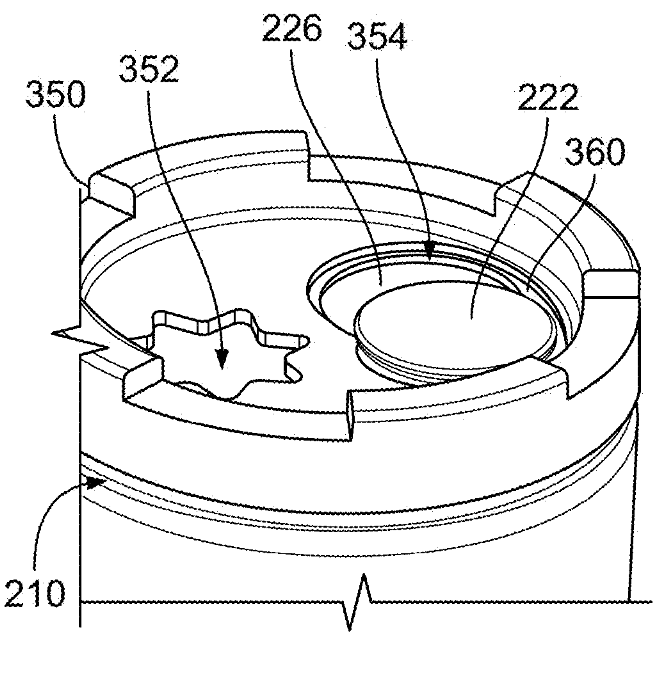
Figures 12E, 12F, 12G:
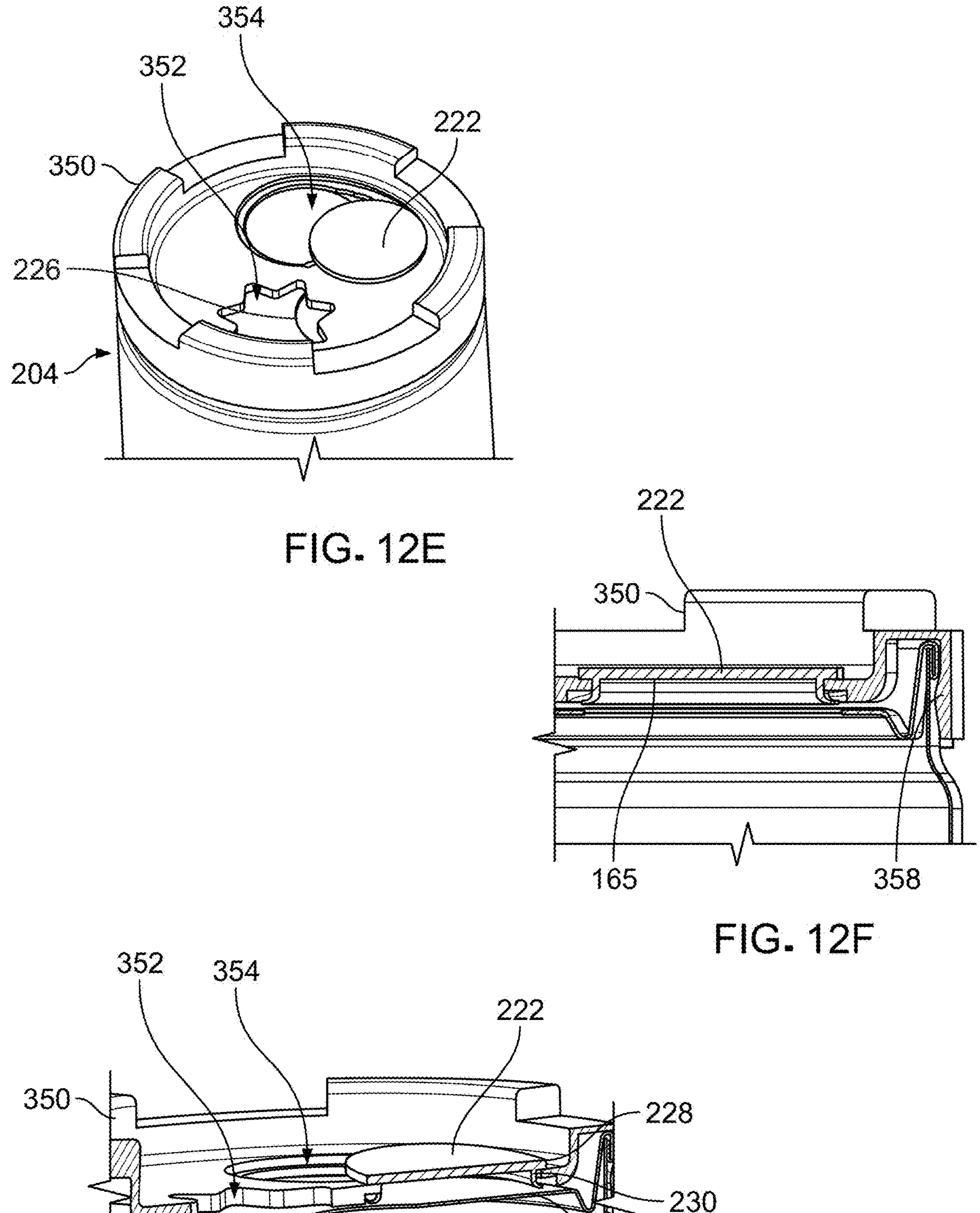

FIGS. 12A and 12B show the cap 350 initially attached to the base 220 with the protrusion 222 aligned with and extending through the larger of the overlapping circles of the second aperture 354. The machine 100 rotates the cap 350 relative to the pod 200 to cause the ramp 360 to slide under a lip of the protrusion 222 as shown in FIGS. 12C and 12D. Continued rotation of the cap 350 relative to the base 220 of the pod 200 applies a lifting force that separates the protrusion 222 from the remainder of the base 220 (see FIGS. 12E-12G) and then aligns the first aperture 352 of the cap 350 with the aperture 226 in the base 220 resulting from removal of the protrusion 222. Some caps have ramped features that provide a total lift height of approximately 0.075". Some caps have ramped features that provide a total lift height in a range between approximately 0.05" and 0.10". In some machines, the process of removing the protrusion also removes product (frozen or not) that may accumulate within a recess of the end of the protrusion.

FIGS. 13A-13E are plan and perspective views of a drive mechanism 860 for the machine 100. The drive mechanism 860 includes an annular member 861 with four drive features 862 (e.g., radially-inward extending protrusions) that engage with drive lugs of a shearing cap. In this example, the pod 200 includes shearing cap 350, but other shearing caps can be used with drive mechanism 860.

Figure 13A:
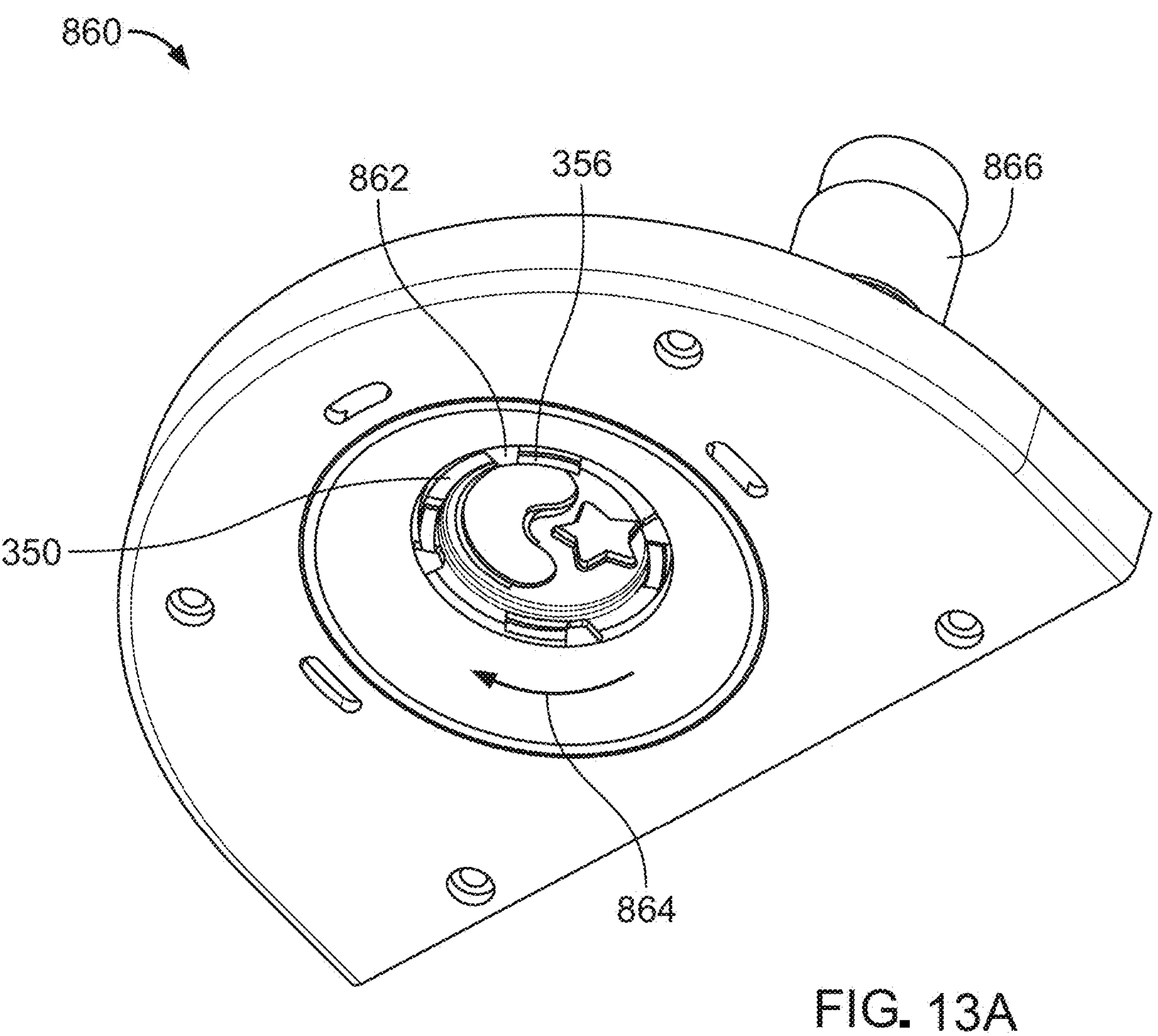
FIGS. 13A-13E are views of a cap shearing system of a machine.
Figure 13B:
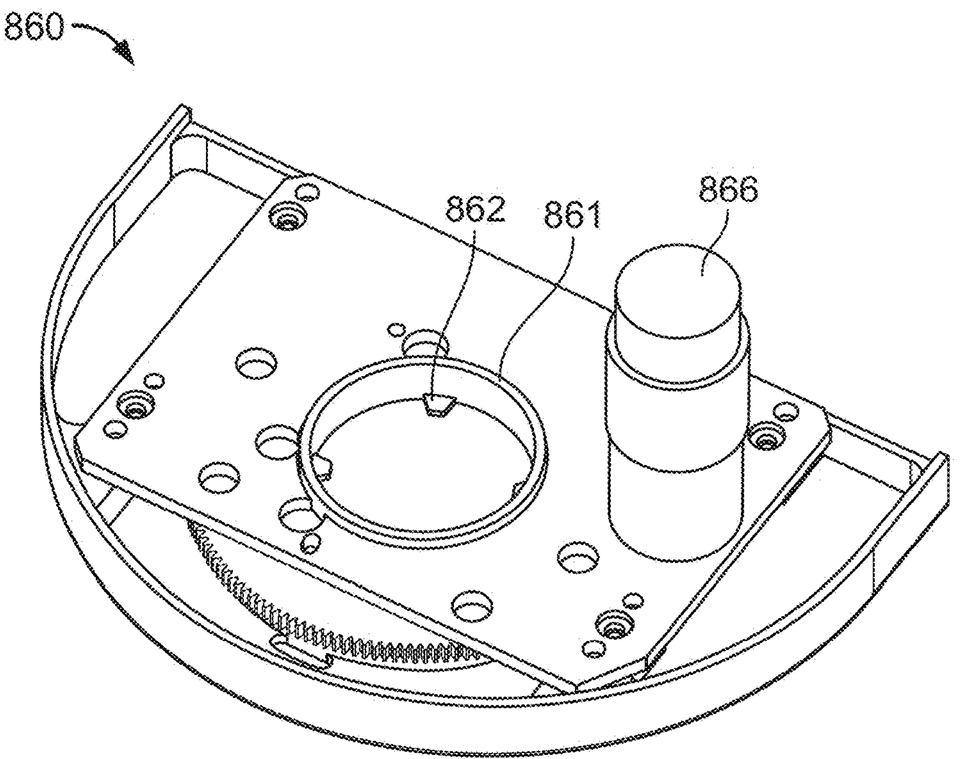
Figure 13C:
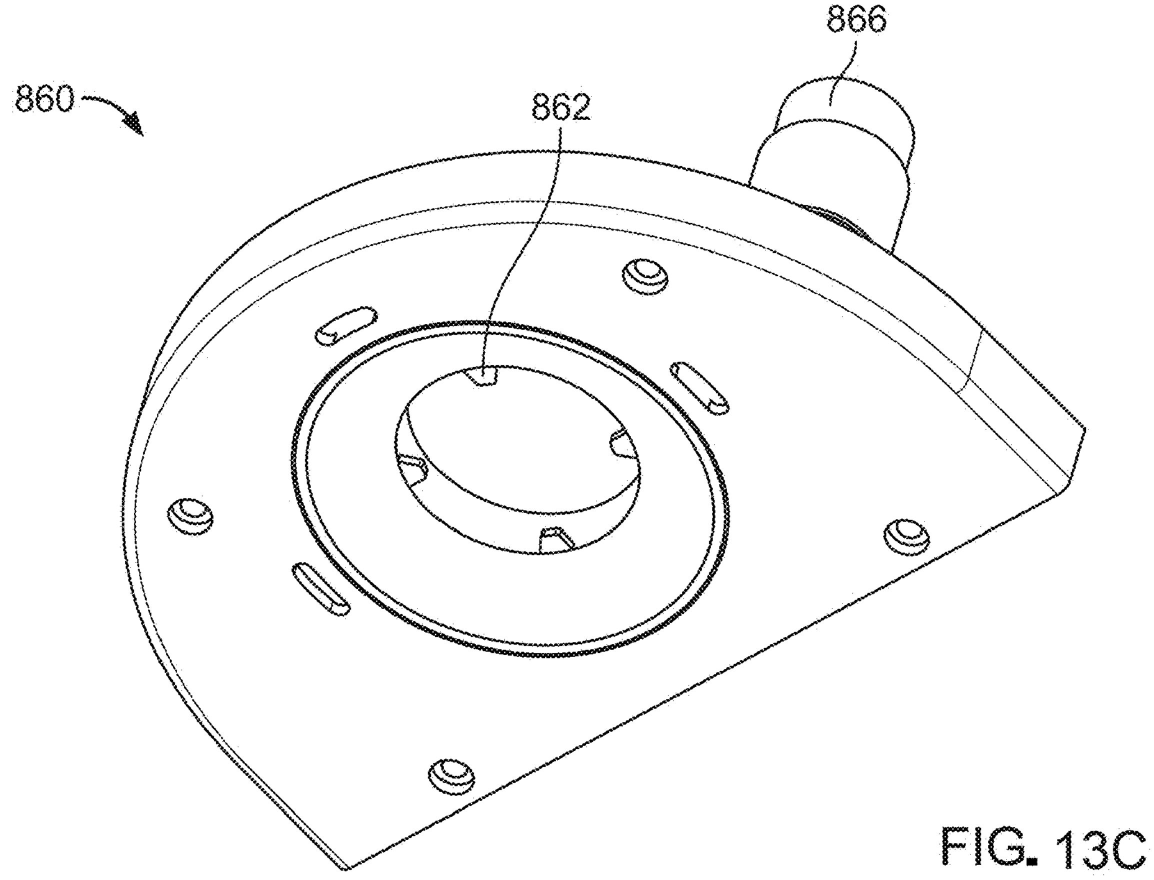
Figure 13E:
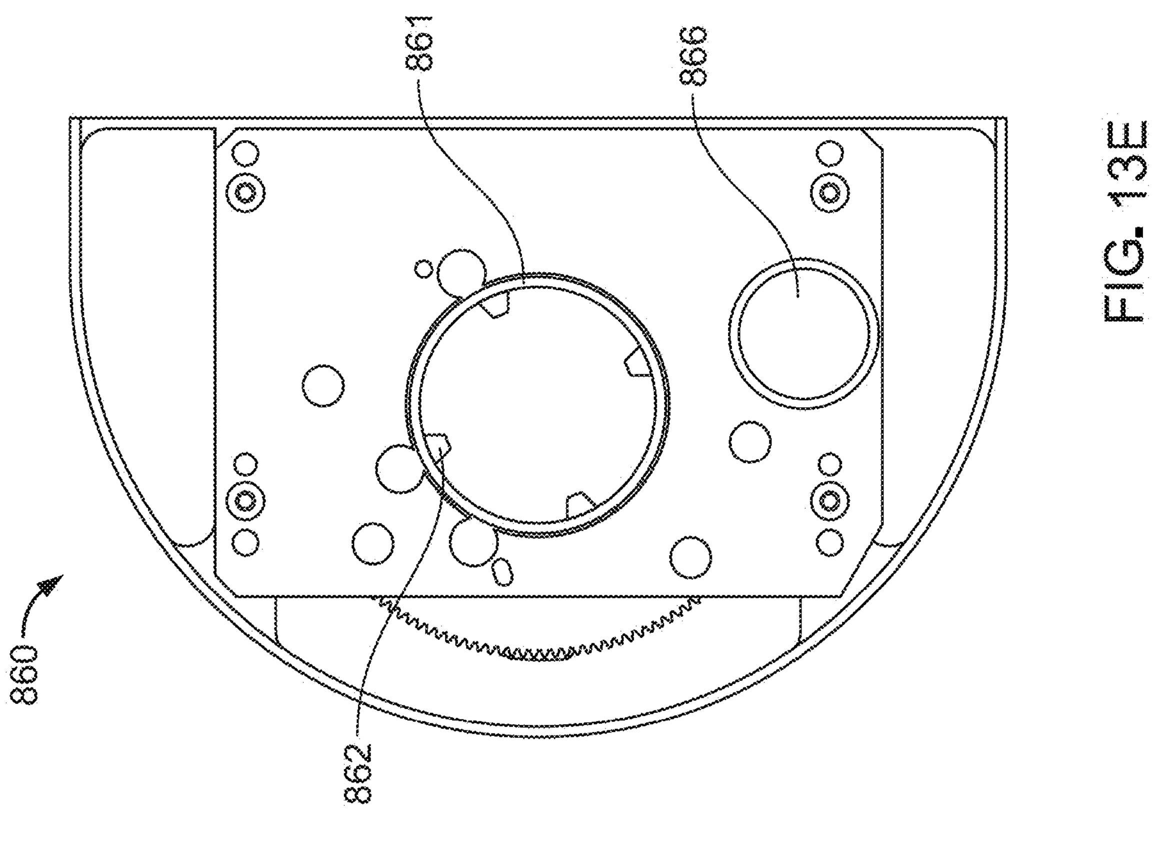
Figure 13D:
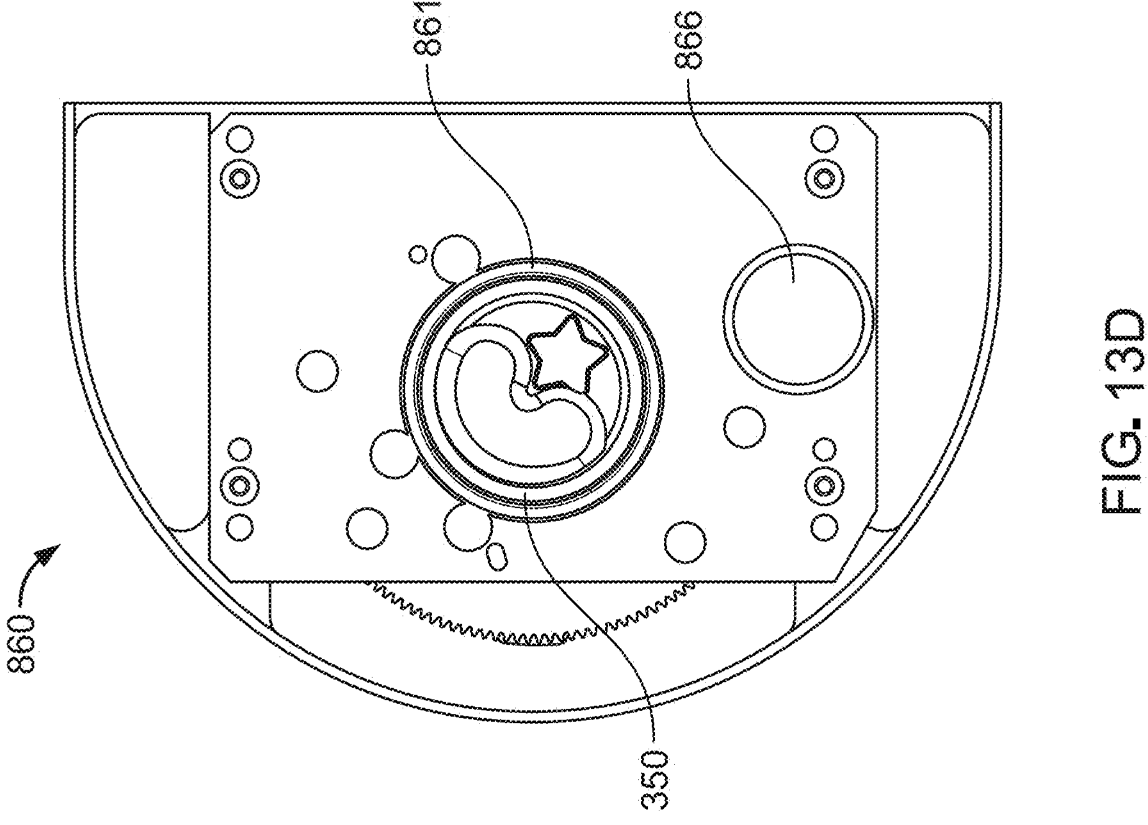

FIG. 13A is an isometric bottom view of the drive mechanism 860 with the shearing cap 350 in position within the drive mechanism 860. FIG. 13B is an isometric top view of the drive mechanism 860. FIG. 13C is an isometric bottom view of the drive mechanism 860. FIG. 13D is a top view of the drive mechanism 860 showing a shearing cap 350 in place. FIG. 13E is the same view as shown in FIG. 13D except a shearing cap is not shown.

The drive mechanism 860 includes drive features 862 located on an inner diameter surface of the annular member 861 that rotationally engage corresponding drive lugs 356 of cap 350. In this example, the drive mechanism 860 includes four equally spaced drive features 862 that engage a respective number of drive lugs 356. Each of the four drive features 862 span a small (e.g., less than 20 degree) portion of the circumference around the annular member 861 to reduce the chances of the drive lugs 356 landing directly on top of the drive features 862. Other drive mechanisms include more than four drive feature (e.g., 5-10) and other drive mechanisms includes less than four drive features (e.g., 1-3).

As a user inserts a pod with a shearing cap into the machine 100, the pod slides through the opening of the evaporator 154 with a first amount of friction between the sidewall of the pod and the sidewall of the evaporator 154. In some examples, this first amount of friction is caused by the close proximity of the sidewall of the pod and the sidewall of the evaporator 154. In some examples, this close proximity is a gap of between 0.01" and 0.035." In some examples, this close proximity is a gap of between 0.005" and 0.05".

Prior to (and/or during) the freezing process, the machine 100 controls the evaporator 154 to clamp down on the pod. This clamping improves thermal conductivity between the pod and the evaporator and increases the amount of friction between the pod and the evaporator from the first amount to a second, increased, amount. While the first amount of friction still allows the machine 100 to rotate the pod within the evaporator, the increased amount of friction is sufficient to prevent a rotation of the pod with respect to the evaporator 154 during the protrusion shearing process to remove the protrusion from the base of the pod to form an aperture to dispense the cooled food or drink.

The machine 100 performs the protrusion shearing process during dispensing. In particular, the machine 100 controls the shearing motor 866 to rotate the drive features 862. This rotation causes the shearing cap 350 to rotate with respect to the body of the pod because the body of the pod is rotationally constrained within the evaporator by the second amount of friction. This rotation of the shearing cap 350 with respect to the pod causes the protrusion of the pod to ride along the ramp shearing features of the shearing cap 350. This action serves to cut off the protrusion from the base of the pod and open an aperture for dispensing the product from the pod.

Figure 14A:
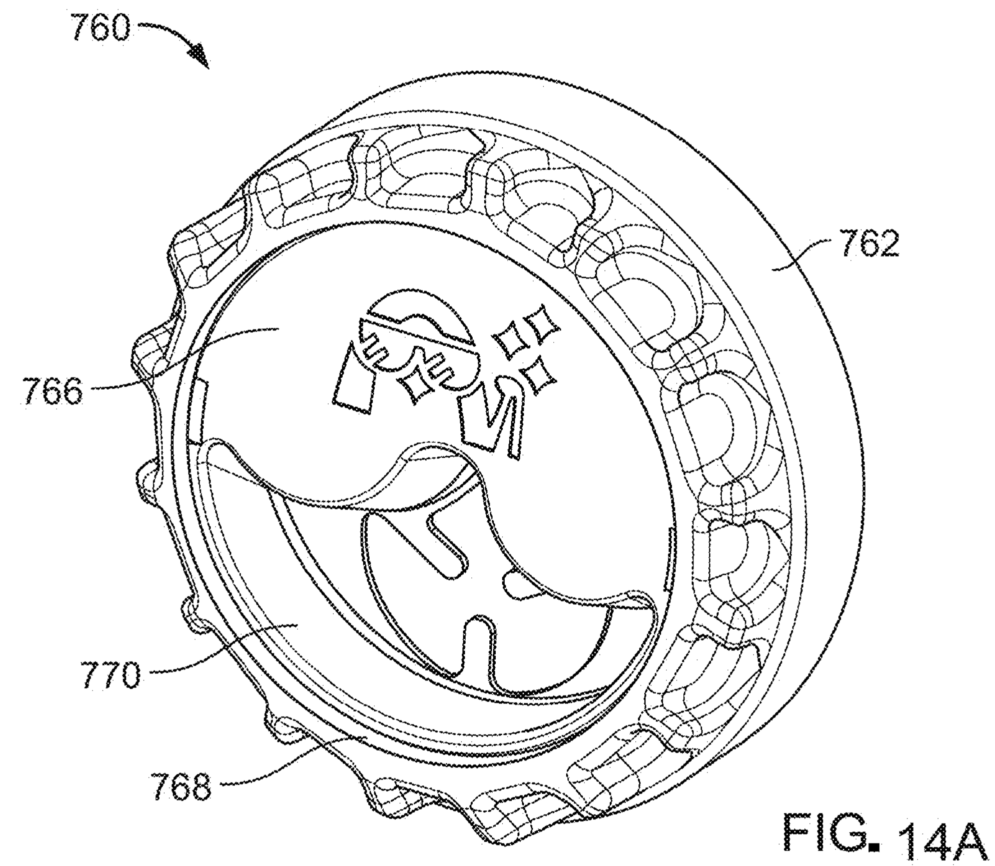
FIGS. 14A and 14B are perspective views of a shearing cap with a drip tray cover for a pod.
Figure 14B:
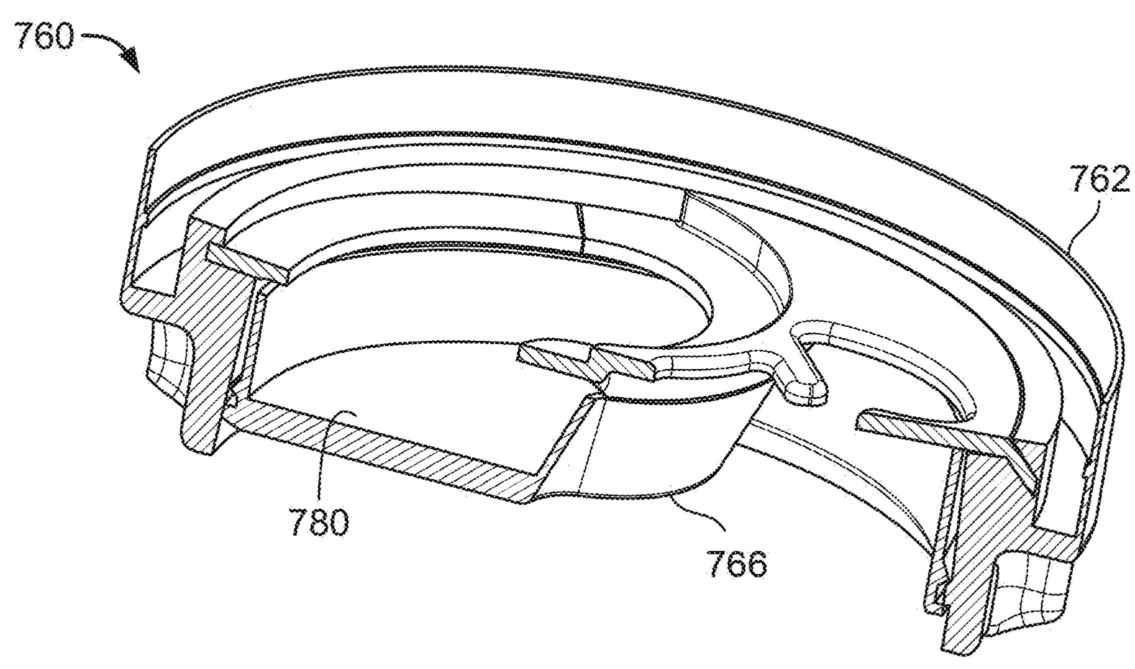

FIGS. 14A and 14B are perspective views of a shearing cap 760 for a pod. Shearing cap 760 includes body 762 with a cover 766 (or drip tray) located within a recess 768 of the body 762. The cover 766 includes a drip reservoir 780 to capture dripping product (e.g., melted food or drink) during and after the food or drink is dispensed from the machine. The cover 766 has a wall 770 that contacts the inner surface of the recess 768 to concentrically position the cover 766 within the cap body 762. In some examples, cap 700 includes a cover such as cover 766 with a drip reservoir (drip tray) to capture dripping product (e.g., melted food or drink) during and after the food or drink is dispensed from the machine.

Figures 16A, 16B:
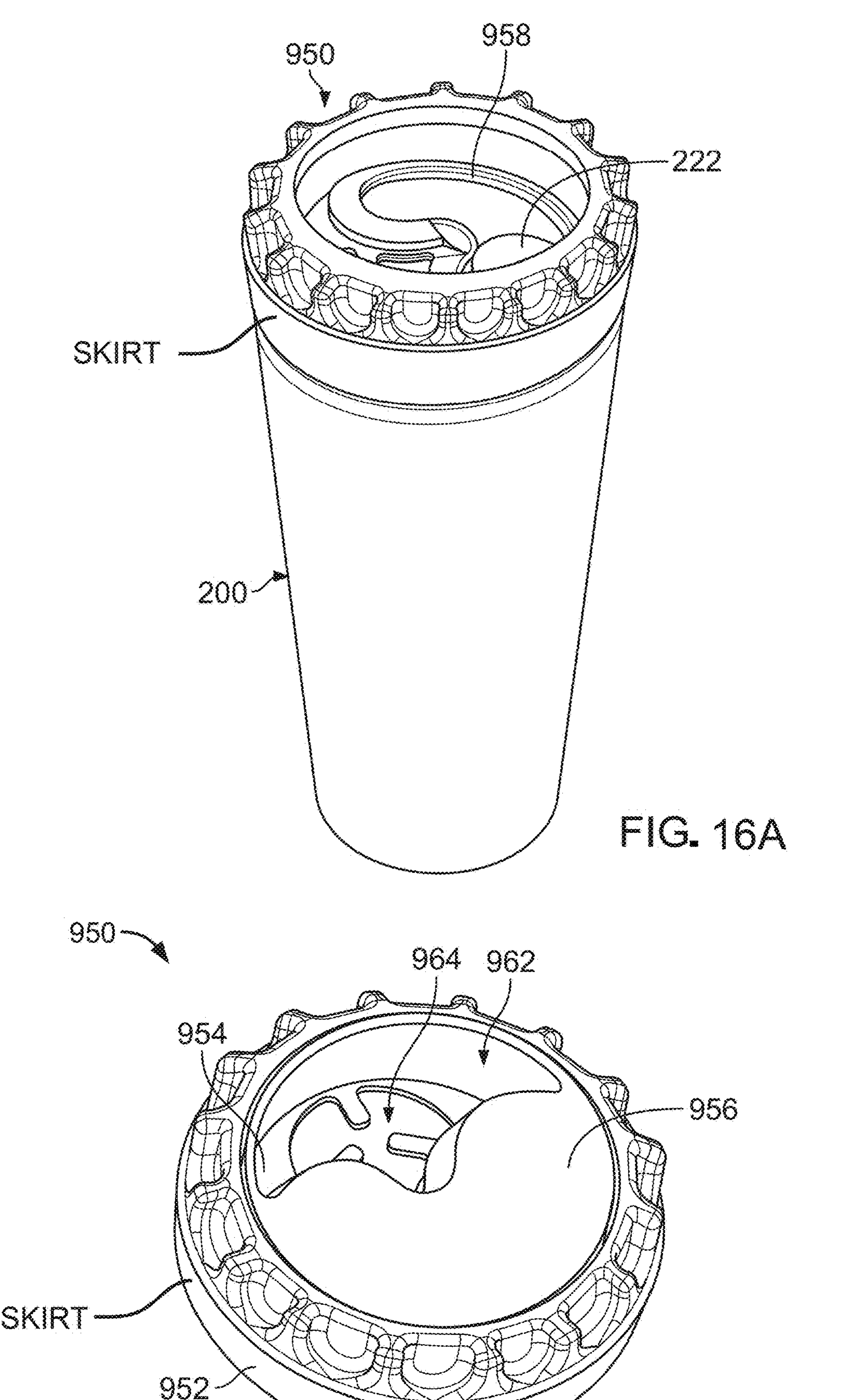
FIGS. 16A and 16B are perspective views of a pod with a prototype cap installed on an end of the pod.

FIGS. 16A and 16B are perspective views of a pod 200 with a prototype cap 950 installed on an end of the pod 200. The cap 950 includes a cap body 952 (shear tray), an insert 954 (shear drive), and a cover 956. FIG. 16A shows the cap 950 with the cover 956 removed to show the protrusion 222 of the pod 200 and the ramp features 958 of the aperture that engages the protrusion 222 to remove the protrusion 222. FIG. 16B shows the cap 950 with the cover 956 installed to show that the protrusion 222 of the pod 200 and aperture with the ramped surfaces 958 are hidden from view. The cover 956 has an aperture 962 that aligns with the dispensing port 964.

Figure 17A:
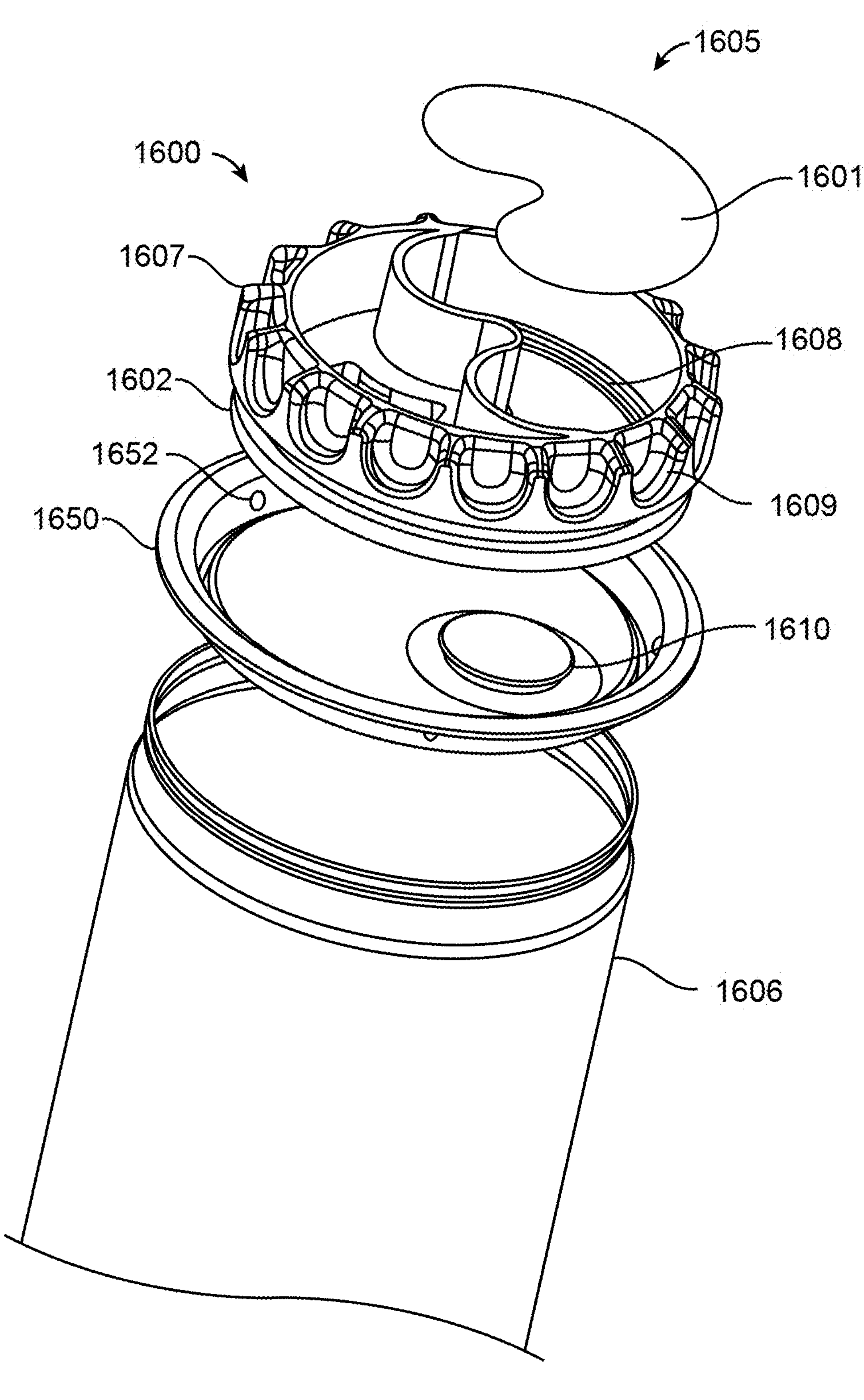
FIGS. 17A-17C are views of a skirt-less cap design.
Figure 17B:
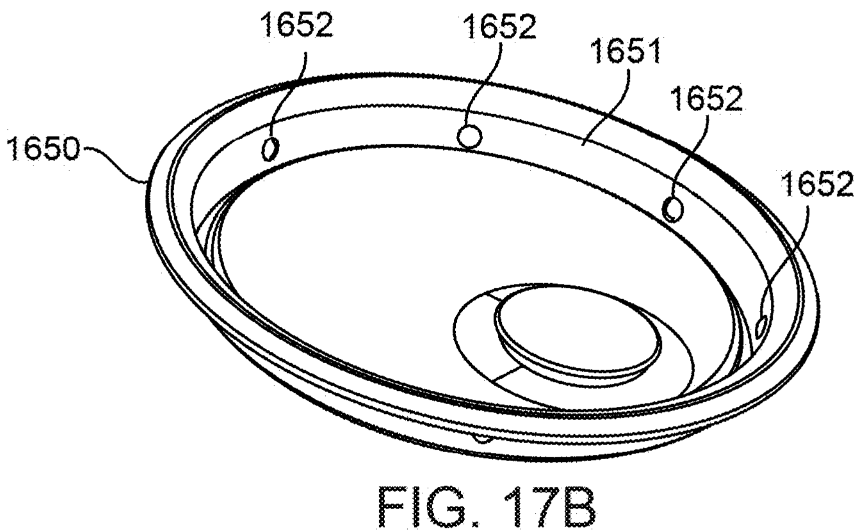
Figure 17C:
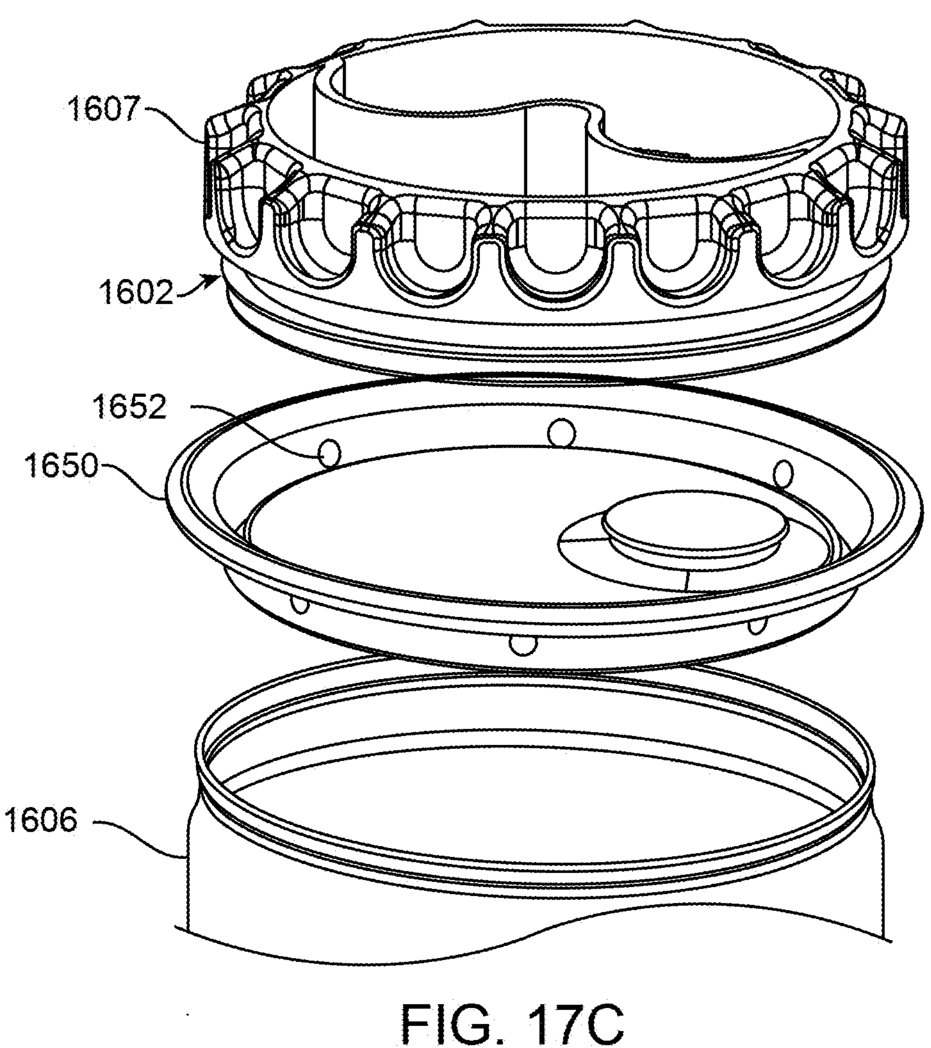

FIGS. 17A-17C are views of a pod 1605 that includes a container 1606 (e.g., an aluminum container, a can, etc.), a base 1650 (e.g., a lid of the can), and a skirt-less cap 1600. The base 1650 is typically attached to the can 1606 (e.g., via crimping) to define an interior volume for ingredients to produce the cooled food or drink. The skirt-less cap 1600 includes a cap body 1607 and a foil 1601. The skirt-less cap 1600 is an integrated design of the cap body 1607 and a shearing drive 1608 for opening a protrusion 1610 of the pod 1605. In some examples, the drive 1608 is configured to engage the protrusion 1610 of the base for removing at least a portion of the protrusion 1610 from the base 1650 to form an opening for dispensing food or drink from the pod 1605.

FIG. 17A is an exploded view of the pod 1605. The cap 1600 is similar to self-seating cap 950, and base 1650 is similar to base 220. However, cap 1600 has a fundamentally different attachment mechanism to base 1650 than cap 950 has to base 220. Additionally, the cap 1600 integrates the cap body 1607 (e.g., with the self-seating features 1609) and shearing drive 1608 into a single unibody structure 1607. Cap 1600 also uses a foil 1601 as opposed to a cover 956. In particular, cap 950 has a skirt that fits over and is attached to the base 220 using a radially extending inward lip similar to lip 358 that circumscribes an inner surface of the cap 350. In contrast, cap 1600 does not have a skirt.

Instead, cap 1600 attaches to the base 1650 with a recess 1602 (e.g., a track) on the bottom of the cap 1600. The recess 1602 defines a track around the circumference of the cap 1600 for one or more detents 1652 of the base 1650. In some examples, the recess or track 1602 is formed on an outer periphery of the cap body 1607 and extends around (e.g., completely around) a circumference of the cap body 1607.

The bottom of the cap 1600 and recess 1602 are positioned radially inward of the base wall 1651 (FIG. 17B), rather than having a skirt that goes over the base. The base 1650 has a series of protrusions 1652 (e.g., detents) that allow the cap 1600 to snap into the base 1650, e.g., when the cap 1600 is snapped into the base 1650 the detents 1652 sit within the recess 1602 and are axially captured by sidewalls defining the recess 1602. The recess or track 1602 is configured to engage the one or more protrusions 1652 of the base 1650 to axially retain the cap 1600 onto the base 1650 while allowing relative rotation between the cap 1600 and the base 1650. The drive 1608 is configured to remove at least the portion of the protrusion 1610 during a relative rotation between the cap 1600 and the base 1650 while the cap 1600 is axially retained on the base 1650.

The detent features 1652 are preferably round or spherical in shape but could be other shapes as well, e.g., square, triangular, or rectangular. In some examples, the detent features 1650 are triangular or ramped such that a force required to snap the cap 1600 onto the base 1652 is lower than a force required to remove the cap 1600 from the base 1652. This can help reduce the chances of the cap 1600 falling off the pod 1605 during shipping or while being handled by a user. There could be as few as one detent feature or there could be more, for instance, between 2-10 (e.g., 2, 3, 4, 5, 6, 5, 7, 8, 9, or 10). In some examples, more than 10 detents are used (e.g., 15, 20, etc.). Also, the detents could be small, each occupying only a few degrees of the total 360-degree circumference of the wall, or they could be larger, each occupying a significant fraction of the wall circumference. In some examples, each detent feature 1652 occupies between 2 and 5 degrees of the circumference of the wall of the base 1650 (e.g., around a longitudinal axis of the can 1606). In some examples, the detent features 1652 are evenly spaced around the circumference of the wall. In some examples, the detent features 1652 are biased around the circumference such that one side of the circumference has more detents than the other side.

Figure 18A:
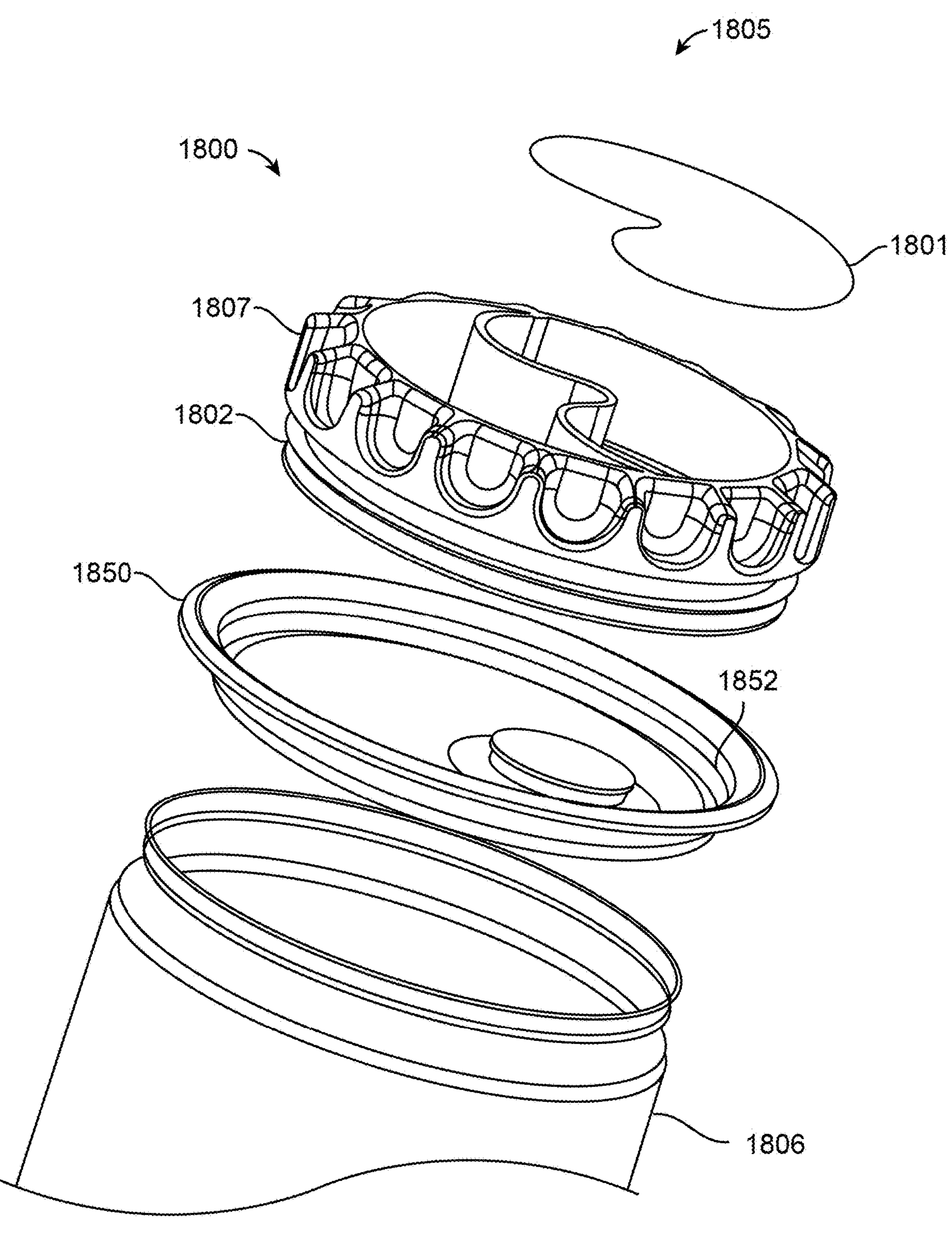
FIGS. 18A-18C are views of an alternative skirt-less cap design.
Figure 18B:
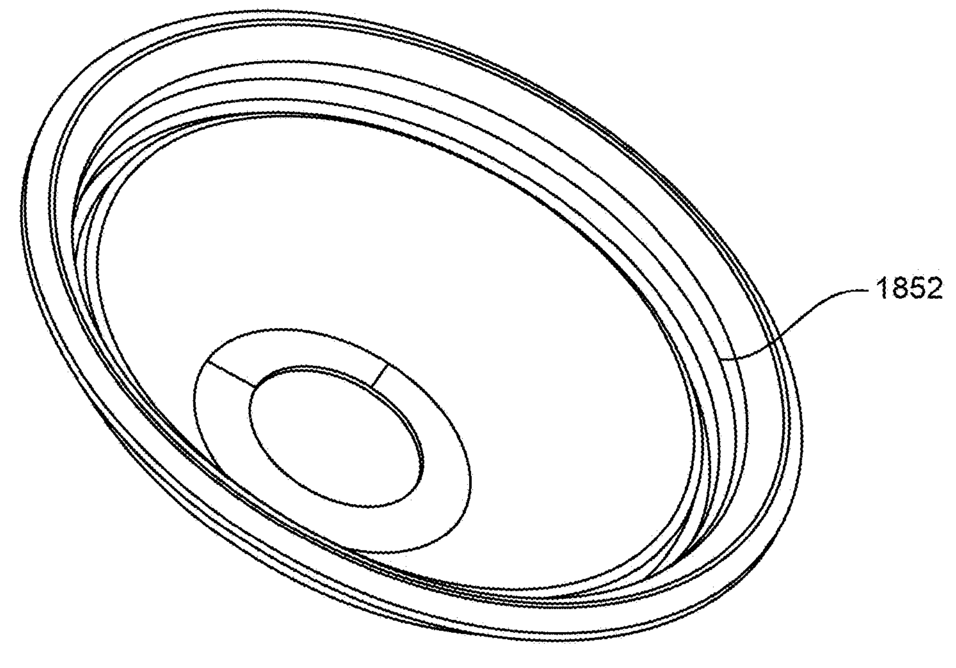
Figure 18C:
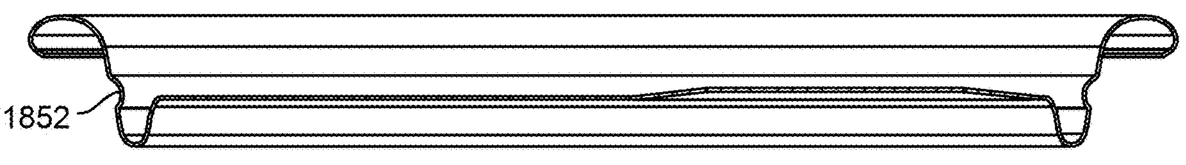

FIGS. 18A-18C are views of a pod 1805 that includes a container 1806 (e.g., an aluminum container, a can, etc.), a base 1850 (e.g., a lid of the can), and a skirt-less cap 1800. In some examples, the pod 1805 is similar to pod 1605 except for the differences in the design of the base 1850. The cap 1800 is an alternative skirt-less cap design compared to cap 1600. As shown in FIGS. 18A-18C, the detent features could be individual features or they could be combined into a semi-continuous, or even a continuous, full detent ring 1852. The cap 1600 and cap 1800 are rotatable 360 degrees relative to the base 1650, in either or both the clockwise or counterclockwise direction. In some examples, a coating on the cap body 1807 within the recess 1802 allows smooth a rotation of the cap 1800 relative to the base 1850 while slidably engaging the detent features 1852 compared to caps without such a coating. In some examples, the coating is a Teflon or acrylic polymer coating. In some examples, the coating is a copolymer or acrylic coating. In some examples, the coating is a thin layer formed onto outer surfaces of the recess 1802 during a manufacturing process.

The cap 1800 can be made of plastic or metal. In some cases, metal is preferred. Metal caps are preferentially made of aluminum or an aluminum alloy such as ADC1, ADC12, or ADC12Z. A metal cap may be manufactured by machining, forging, die casting, or any other suitable process. In some cases, the cap 1800 is made of both metal and plastic. In some examples, the foil 1801 is made of out metal and the cap body 1807 is made out of plastic. In some examples, the foil 1801 is made of out of plastic and the cap body 1807 is also made out of plastic. In some examples, the foil 1801 is made of out of metal and the cap body 1807 is also made out of plastic.

For caps 1600, 1800, foil 1601, 1801 replaces the function of cover 956 used in cap 950. A primary function of the cover 956 is to capture residual product that melts and drips after the consumable product is dispensed. The foil 1601, 1801 provides the same function, but offers advantages in cost, manufacturing, and assembly. The foil 1601, 1801 may be secured to the cap using an adhesive, or it may be heat sealed to the cap. Heat sealing is preferably performed at a temperature above 80° C. and more preferably above 100° C., or 120° C.

Figure 19A:
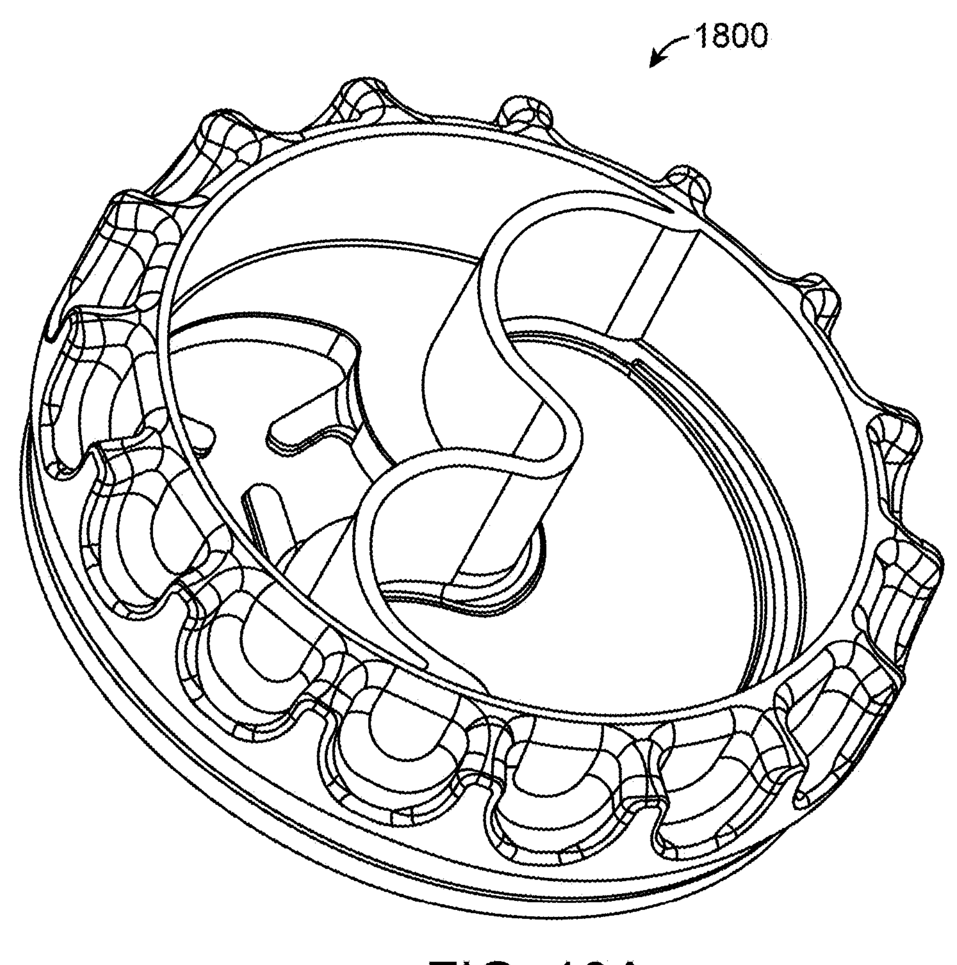
FIGS. 19A and 19B are views of a shearing drive for a skirt-less cap design.
Figure 19B:
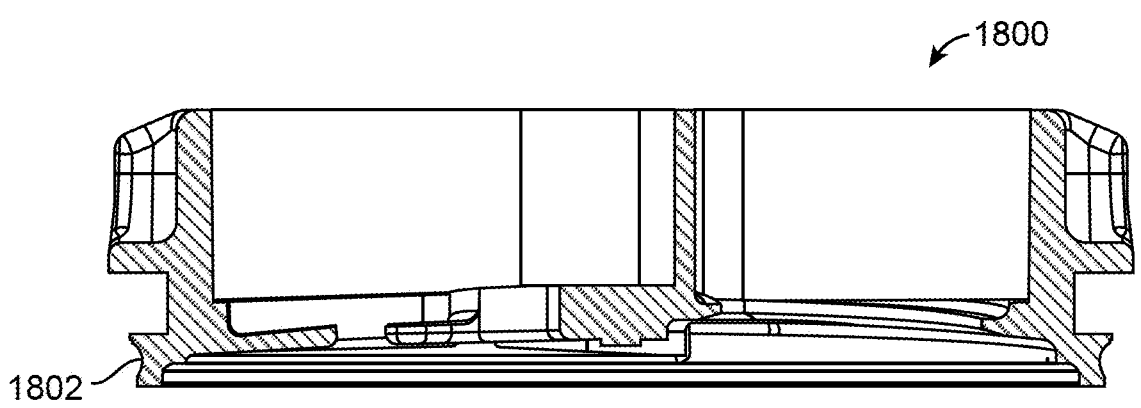

FIGS. 19A and 19B are alternative views of the integrated cap body/shearing drive design 1800. FIG. 18C shows the recess 1852 in greater detail.

FIGS. 20A-20D are views of a pod 1905 that includes a container 1906 (e.g., an aluminum container, a can, etc.), a base 1950 (e.g., a lid of the can), and a skirt-less cap 1900. In some examples, the pod 1905 is similar to pods 1605, 1805. The base 1950 is typically attached to the can 1906 (e.g., via crimping) to define an interior volume for ingredients to produce the cooled food or drink. The skirt-less cap 1900 includes a cap body 1907 and a drip tray 1901. The skirt-less cap 1900 is an integrated design of the cap body 1907 and a shearing drive 1908 for opening a protrusion 1910 of the pod 1905. The base 1950 includes a protrusion 1952 that extends completely around a circumference of the base 1950 and is sized to engage a recess 1902 of the cap body 1907 when the cap 1900 is inserted onto the base 1950 to retain the cap 1900 onto the base 1950 and allow relative rotation between the cap 1900 and the base 1952.

Figure 20A:
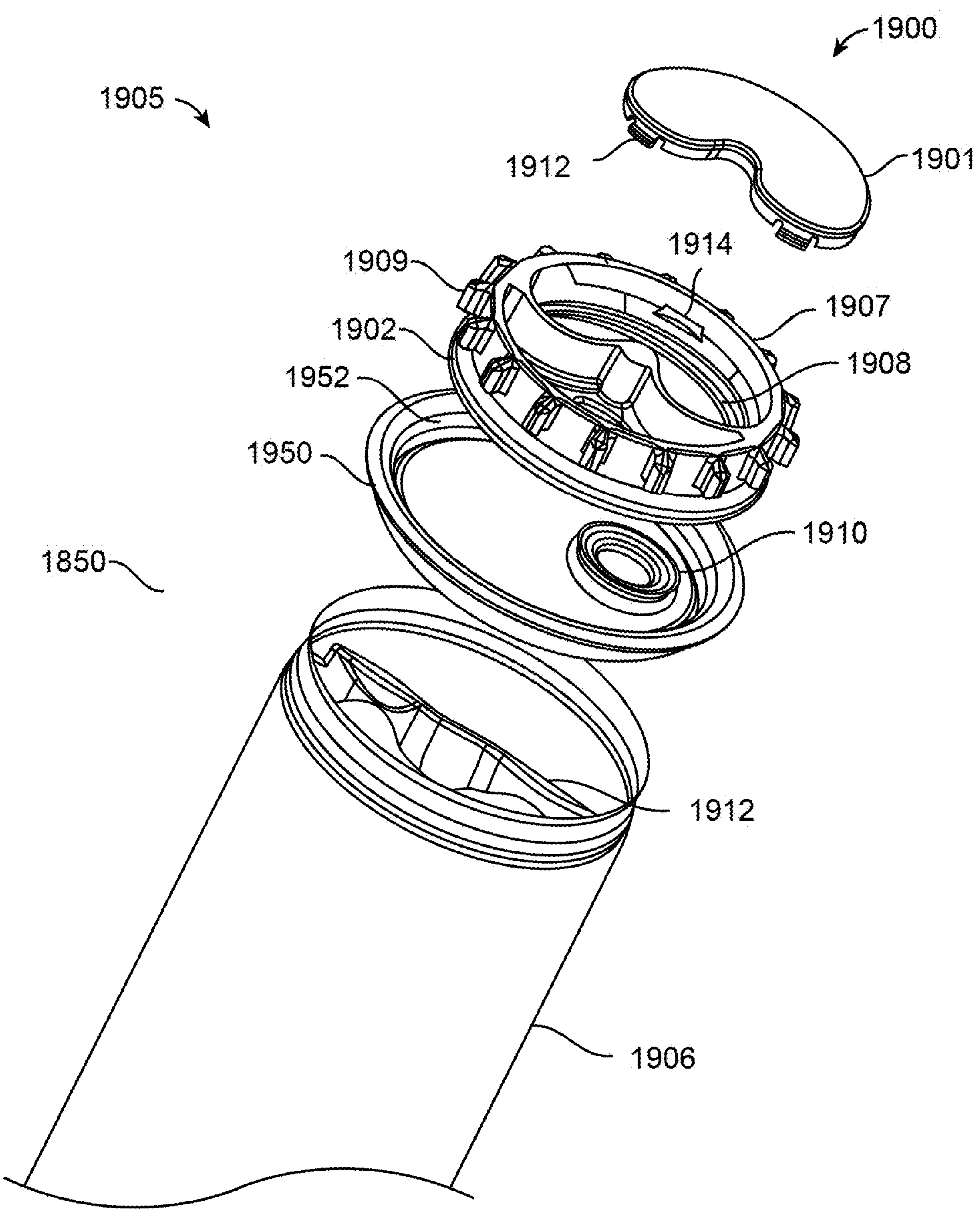
FIGS. 20A-20D are views of an alternative skirt-less cap design.

FIG. 20A is an exploded view of the pod 1905. The cap 1900 is similar to self-seating cap 950, and base 1950 is similar to base 220. However, the cap 1900 integrates the cap body 1907 (e.g., with self-seating features 1909) and shearing drive 1908 into a single unibody structure 1907. Cap 1900 also uses a drip tray 1901 as opposed to a cover 956 or a foil 1801, 1901. Cap 950 has a skirt that fits over and is attached to the base 220 using a radially extending inward lip similar to lip 358 that circumscribes an inner surface of the cap 350. In contrast, cap 1900 does not have a skirt like cap 350.

Drip tray 1901 can be similar to cover 766 in that it is intended to at least partially define a reservoir for melted food or drink after use (e.g., after the food or drink has been dispensed from the pod). The reservoir is also sized to retain a portion of the protrusion 1910 of the pod 1905 after the portion of the protrusion 1910 has been removed from the base 1950 of the pod 1905 so that the end user does not need to handle the removed protrusion. In some examples, a motor of the machine causes the cap 1900 to rotate relative to the can 1906 such that the shear drive 1908 engages and axially separates a portion of the protrusion 1910 from the base 1952.

In some examples, the drip tray 1901 is formed of a plastic material. In some examples, the drip tray 1901 is at least partially transparent to allow the protrusion 1910 to be seen through the drip tray 1901 when the drip tray 1901 is attached to the cap body 1907. In some examples, the drip tray 1901 is permanently attached to the cap body 1907 by one or more attachment features 1912 which engage one or more recesses 1914 defined by a sidewall of the cap body 1907 surrounding the shear drive 1908. For example, during assembly, the drip tray 1901 is inserted into an opening of the cap body 1907 and the one or more resilient arms 1912 snap into the one or more recesses 1914 to permanently attach the drip tray 1901 to the cap body 1907. In some examples, the drip tray 1901 can be removed from the cap body 1907 with sufficient force without destroying the drip tray 1901.

Cap 1900 includes three resilient arms 1912 and three recesses 1914. Some caps have more than three resilient arms 1912 and three recesses 1914 (e.g., between 4-10), and some caps have less than three resilient arms 1912 and three recesses 1914 (e.g., 1 or 2). Some drip trays have a ring that extends partially or completely around the periphery of the drip tray 1901 that engages a continuous recess within the sidewall of the cap body 1907. In addition, the self-seating features 1909 include substantially axially extending protrusions that do not have a bottom U-shaped design like caps 1605, 1805. In addition, FIG. 20A shows a mixing paddle 1912 inside the can 1906 of the pod 1905.

Figure 20B:
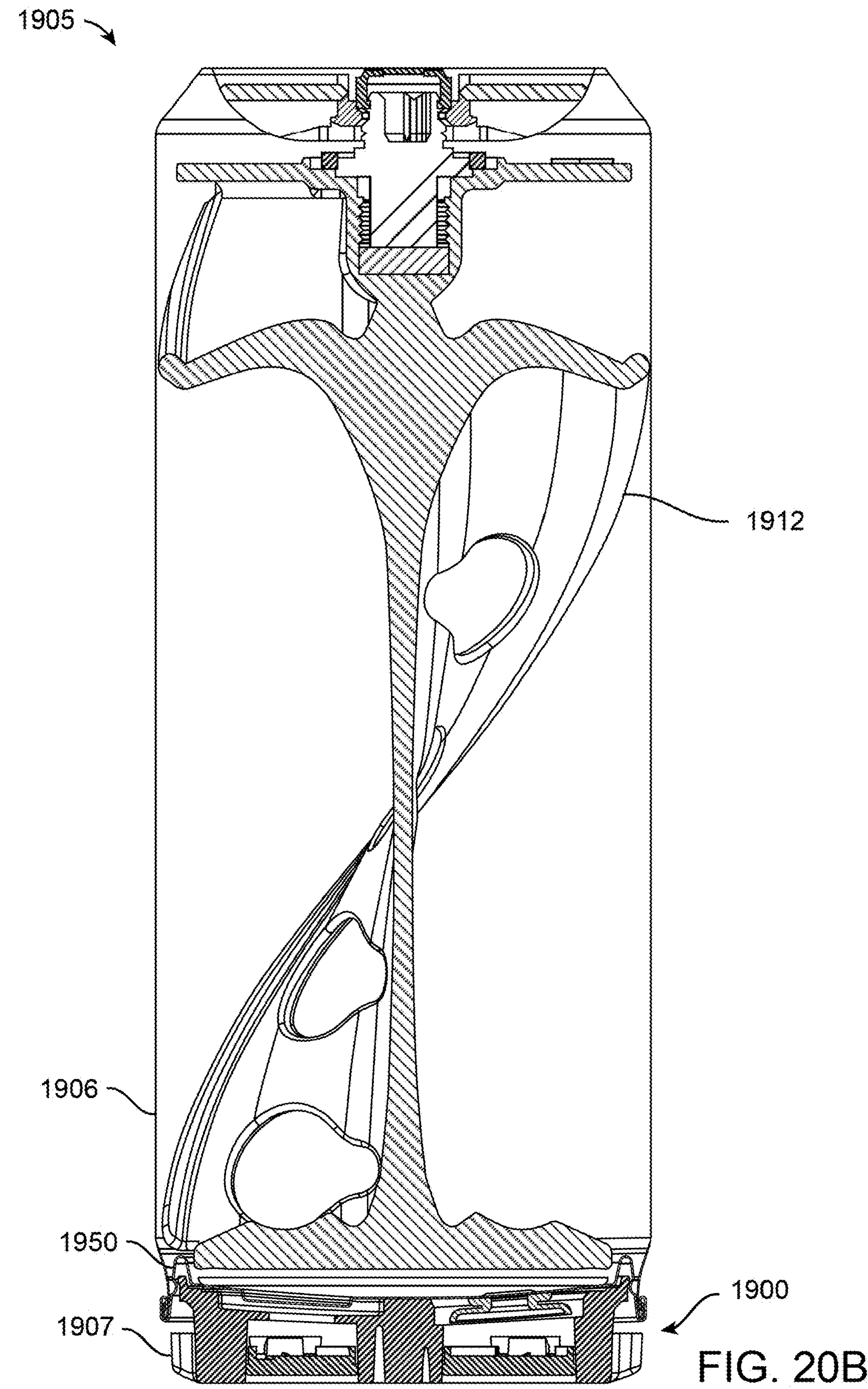
Figure 20C:
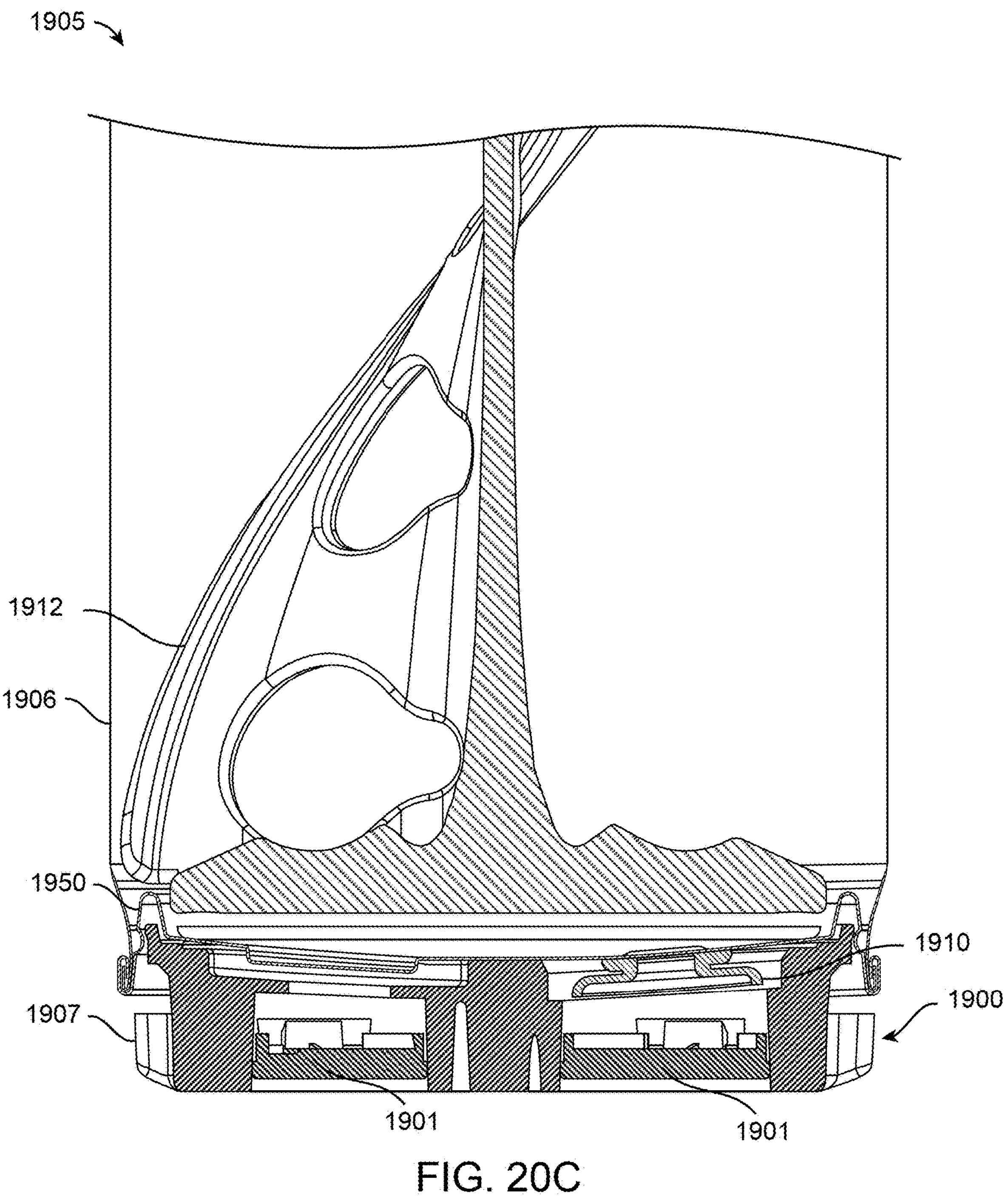
Figure 20D:
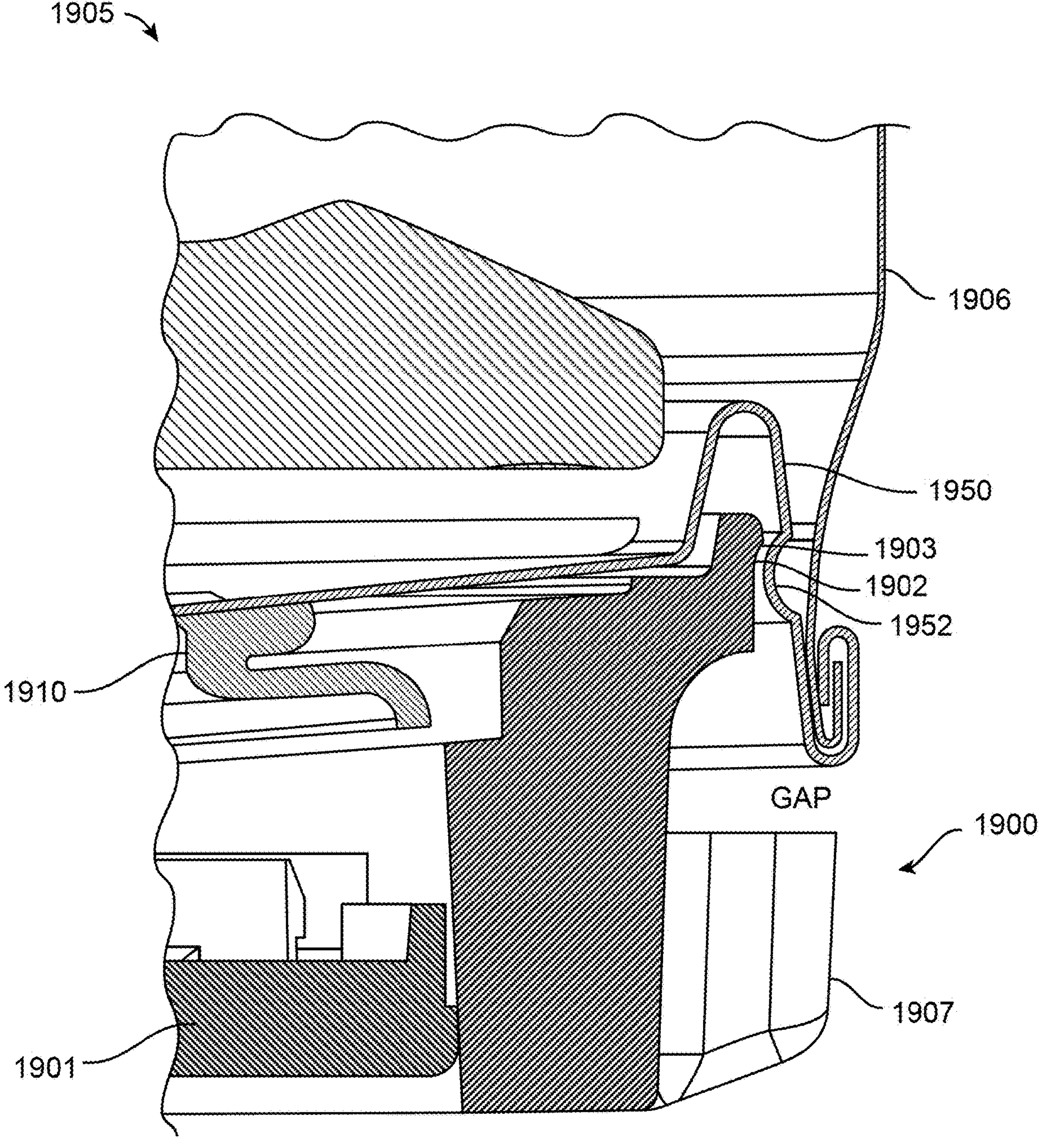

FIGS. 20B-20D are cross-sectional views of the pod 1905 with the cap 1900 inserted onto the base 1950 of the pod 1900 and the drip tray 1901 inserted into the cap body 1907. FIG. 20D shows a close-up view of the engagement between the protrusion 1952 and the recess 1902. The protrusion 1952 is a circular protrusion that protrudes radially inwards and extends completely around the circumference of the base 1950. The recess 1902 extends completely around the circumference of the cap body 1907. A sidewall 1903 defining the recess 1902 extends radially outward. When the cap 1900 is inserted onto the base 1950, the protrusion 1952 engages the sidewall 1903 and snaps into the recess 1902 to retain the cap 1900 on the base 1950. In some examples, the protrusion 1952 resiliently deforms radially outward to allow the sidewall 1953 to pass by the protrusion 1952 and then snaps radially inward into the recess 1902.

The cap 1900 is rotatable 360 degrees relative to the base 1950, in either or both the clockwise or counterclockwise direction. In some examples, a coating on the cap body 1907 allows smooth a rotation of the cap 1900 relative to the base 1950 while slidably engaging the protrusion 1952. In some examples, the coating is a Teflon or acrylic polymer coating. In some examples, the coating is a copolymer or acrylic coating. In some examples, the coating is a thin layer formed onto surfaces defining the recess 1802 during a manufacturing process.

In some examples, the cap body 1907 is made out of plastic. In some examples, the cap body 1907 is made out of metal. In some examples, the cap body 1907 is made of aluminum or an aluminum alloy such as ADC1, ADC12, or ADC12Z. In some examples, the cap body 1907 is manufactured by machining, forging, die casting, or any other suitable process. In some examples, the cap 1900 is made of both metal and plastic. For example, the drip tray 1901 can be made out of plastic while the cap body 1907 is made out of metal. In some examples, the drip tray 1901 and the cap body 1907 are made out of metal. In some examples, the drip tray 1901 and the cap body 1907 are made out of plastic.

As shown in FIGS. 20B-20D, in this embodiment, no portion of cap 1900 extends radially beyond the diameter of the outer surface of the can 1906. An axial gap (GAP) exists between (i) the crimped connection at the base 1950 and the can 1906 and (ii) an underside of the cap body 1907. Additionally, in this embodiment, no portion of cap 1900 extends radially beyond the crimped connection at the base 1950 and the can 1906.

Figure 21A:
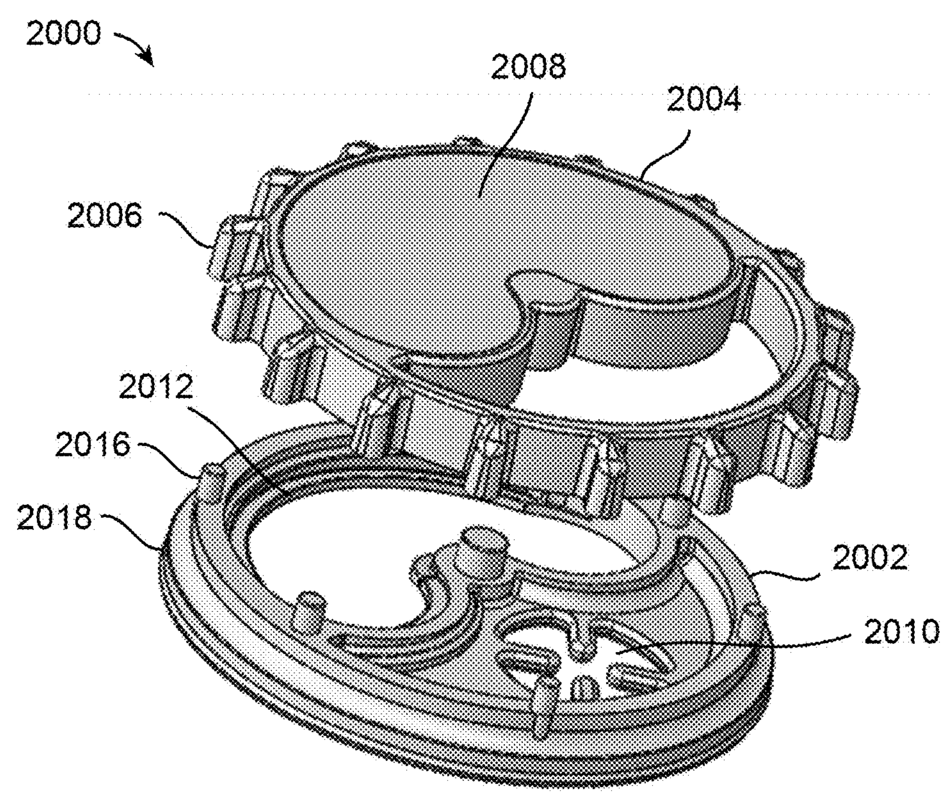
FIGS. 21A-21C are perspective views of a two-piece skirt-less cap design.
Figure 21B:
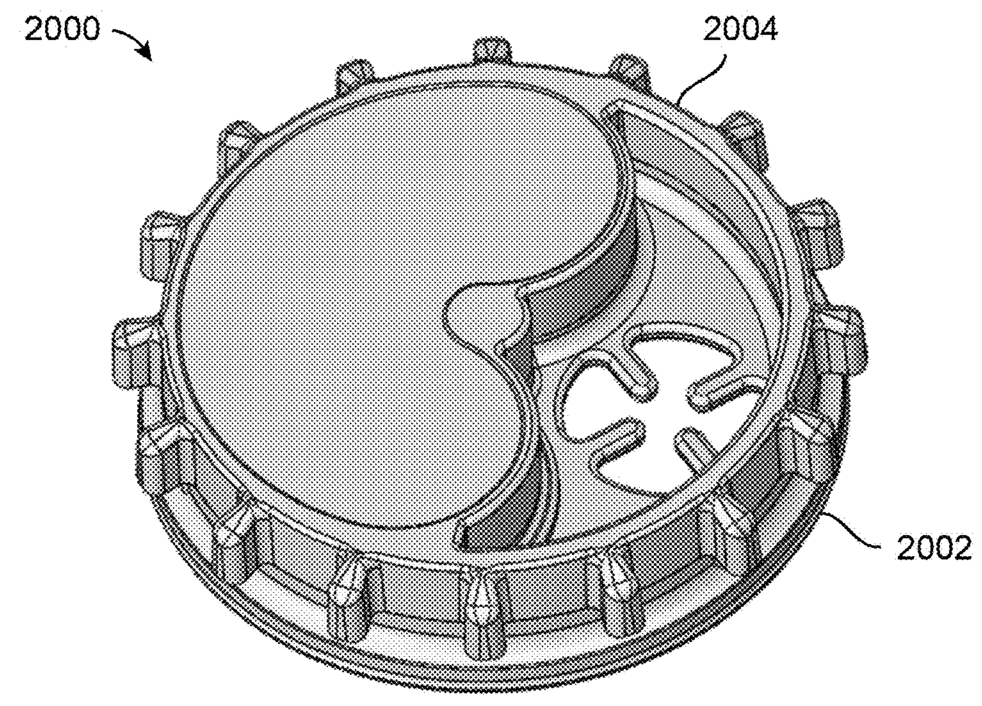
Figure 21C:
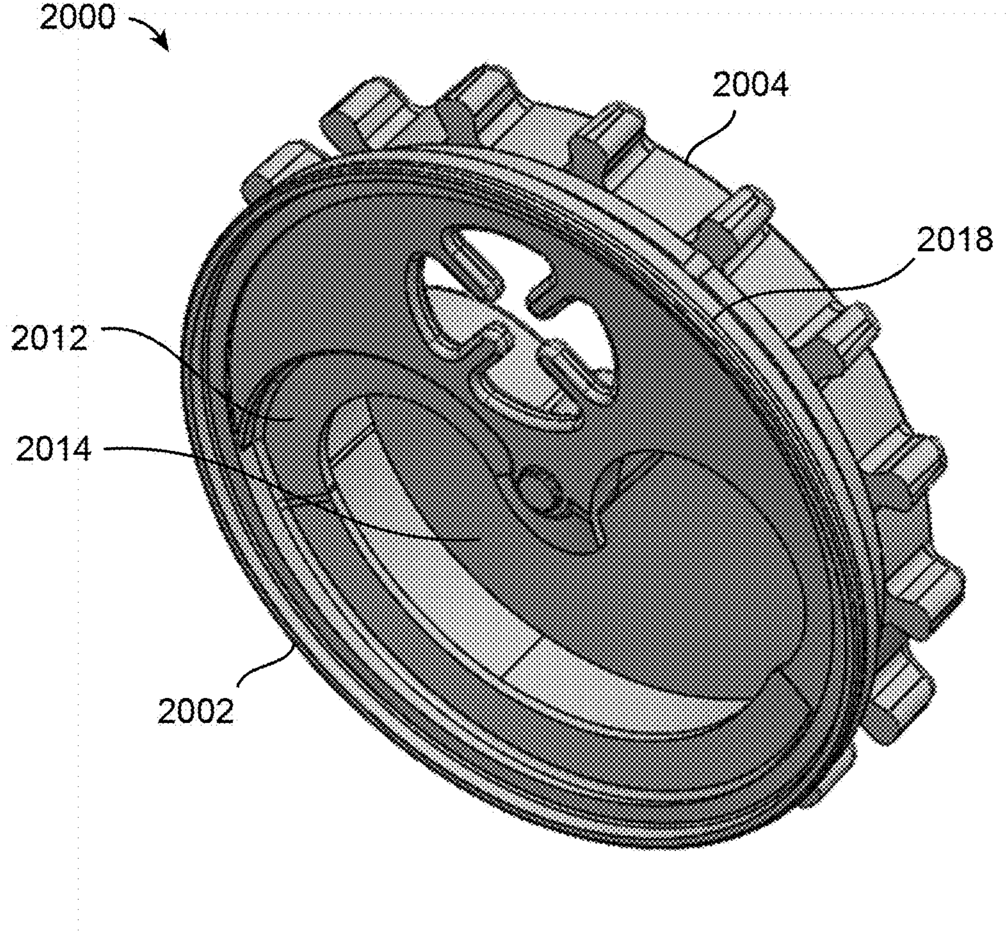

FIGS. 21A-21C are perspective views of an alternate skirt-less cap 2000. FIG. 20A is an exploded view of the cap 2000. In some examples, cap 2000 is used with pod 1905. Cap 2000 is similar to cap 1900 but has a two-piece design with an integrated drip tray instead of a single-piece design with a snap-in drip tray. Cap 2000 includes a first (e.g., lower) part 2002 and a second (e.g., upper) part 2004 that are assembled together to define the cap 2000. In the embodiment shown, the first part 2002 includes a plurality of pins 2016 that can be inserted into a plurality of recesses of the second part 2004. In some examples, the two parts 2002, 2004 are pressed together and permanently snap together. In some examples, the pins 2016 are used to align the first and second parts 2002, 2004 so that they are pressed together in the correct orientation.

In some examples, the first part 2002 is attached to the second part 2004 using a mechanical connection in addition to or instead of the pins 2016. For example, in some cases, the first part 2002 is screwed onto the second part 2004 (e.g., by having a first helical groove on one of the first part 2002 or the second part 2004 and a second helical groove on the other of the first part 2002 or the second part 2004, by using one or more screws, etc.). In some cases, the first part 2002 is adhered to the second part 2004 (e.g., using an adhesive). In some cases, the pins 2016 and/or the opening in which the pins 2016 extend include angled or ramped surfaces to allow the two parts to become permanently locked to each other once the angled or ramped surfaces engage and pass one other (e.g., an edge of one of the parts 2002, 2004 slides over and is captured by a second edge of the other part 2002, 2004 to permanently lock the two parts 2002, 2004 together).

The second part 2004 of the cap 2000 includes self-seating features 2006, an integrated drip tray portion 2008, and an opening 2010 for allowing dispended food and drink to pass through when the cooled food or drink is dispensed from the pod. In some examples, it is beneficial to integrate the drip tray design into the cap as shown in cap 2000 because it can increase the strength of the connection between the drip tray and the pod and reduce the chances of the drip tray separating from the pod during some use cases.

The first part 2002 includes the pins 2016, a recess or track 2018, a dispense port 2010, and a shear drive 2012. The recess or track 2018 is similar to recess 1902 of cap 1900 in that it is sized to receive one or more protrusions 1952 of a base 1950 of a pod 1905 and allow the cap 2000 to rotate relative to the base 1950 of the pod 1905 so that (i) rotation of the shear drive 2012 relative to the base 1950 lifts at least a portion of the protrusion 1910 off of the base 1950 to form an opening in the pod 1905 and (ii) the cap 2000 is rotated to locate the dispense port 2010 in line with (e.g., directly axial of) the opening of the base 1950 caused by the removal of at least the protrusion 1910. In some examples, the cap 2000 is rotated in the same direction to lift the protrusion 1910 from the pod and align the opening with the dispense port 2010. In some examples, the cap 2000 is rotated in a first direction to lift the protrusion 1910 from the pod and in a second opposite direction to align the opening with the dispense port 2010.

While the pins are described as being on the first part 2002 and the recesses are described as being on the second part 2004, in some cases, the second part 2004 includes the plurality of pins 2016 and the first part 2002 includes a plurality of recesses sized to receive the plurality of pins 2016 to attach the first and second parts 2002, 2004 together. In some cases, one of the first part 2002 or the second part 2004 comprises the plurality of pins 2016 and the other of the first part 2002 or the second part 2004 includes a plurality of second recesses sized to receive the plurality of pins 2016 for attaching the first and second parts 2002, 2004 to one another. In some cases, one or more of the plurality of pins 2016 have a different diameter and/or length compared to other pins 2016. In some cases, one or more of the plurality of pins 2016 have a tapered end to guide insertion of the pins 2016 into the recesses.

FIG. 21B is a perspective view of the cap 2000 with the first part 2002 assembled onto the second part 2004. FIG. 21C is a perspective view of the assembled cap 2000 from the underside showing the underside of the shear drive 2012 and the drip tray reservoir 2014 defined by walls of the second part 2004.

In some examples, cap 2000 is made out of aluminum (e.g., ADC1 cast aluminum). In some examples, both parts 2002, 2004 of cap 2000 are formed of aluminum or an aluminum alloy. In some examples, either or both parts 2002, 2004 of cap 2000 are formed of plastic. In some examples, at least portions of the cap 2000 are formed from sheet metal.

While certain features of caps 1600, 1800, 1900, 2000 have been described with respect to a particular embodiment, the disclosed features of a particular embodiment can be combined with the other embodiments. For example, features described with reference to cap 1600 can be combined with cap 1800, 1900, 2000, and so on. The features described with reference to the caps of this disclosure can be combined with caps 1600, 1800, 1900, 2000 and vice versa.

Skirt-less caps 1600, 1800, 1900, 2000 include one or more of the following advantages. Some skirt-less caps are easier to manufacture in aluminum compared to other materials such as plastic. Additionally, fabricating the cap in aluminum allows the shearing drive to be integrated with the cap body into a single structure, and aluminum is more consistently recycled than plastic. Some skirt-less caps provide a more secure attachment to base compared to cap designs with a skirt. Skirt-less caps have less of a chance of coming off during transport/storage and when a user removes the pod from the machine since it sits inside the base wall. Some skirt-less caps include foil and foil is less expensive than plastic, simplifies assembly, and reduces plastic usage.

Figure 22A:
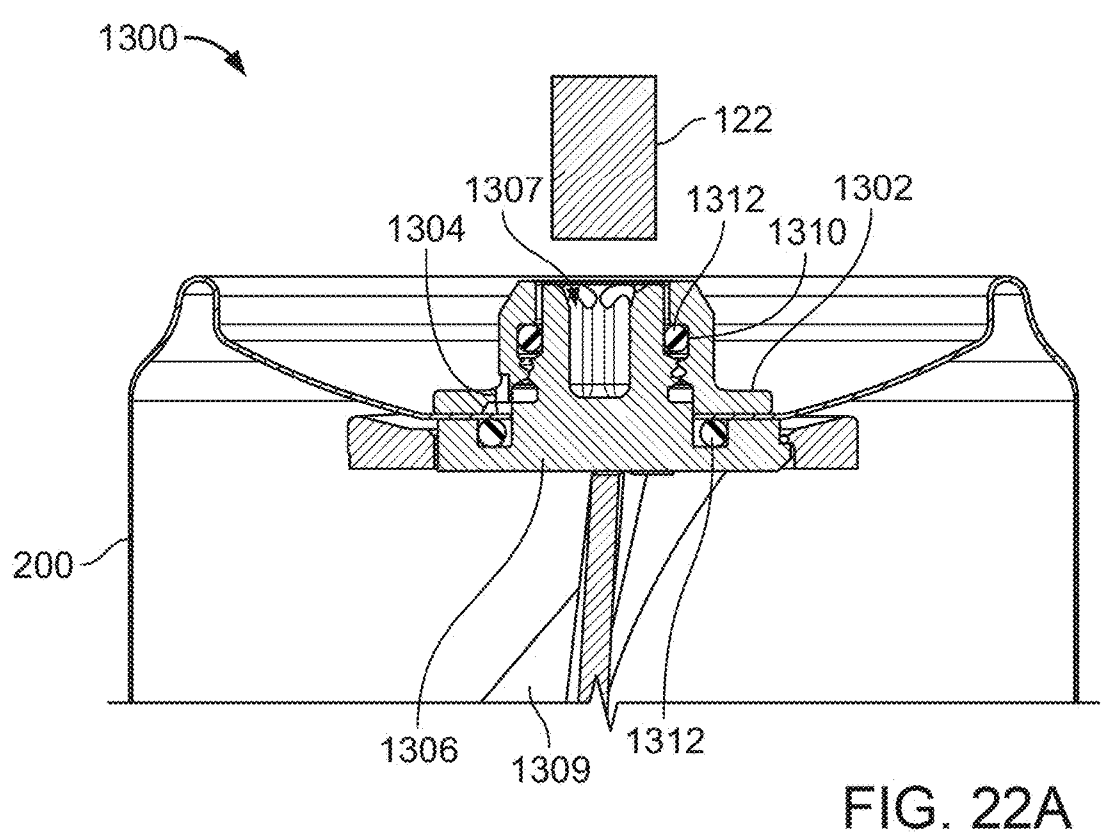
FIGS. 22A and 22B are cross-sectional views of a mating drive assembly.
Figure 22B:
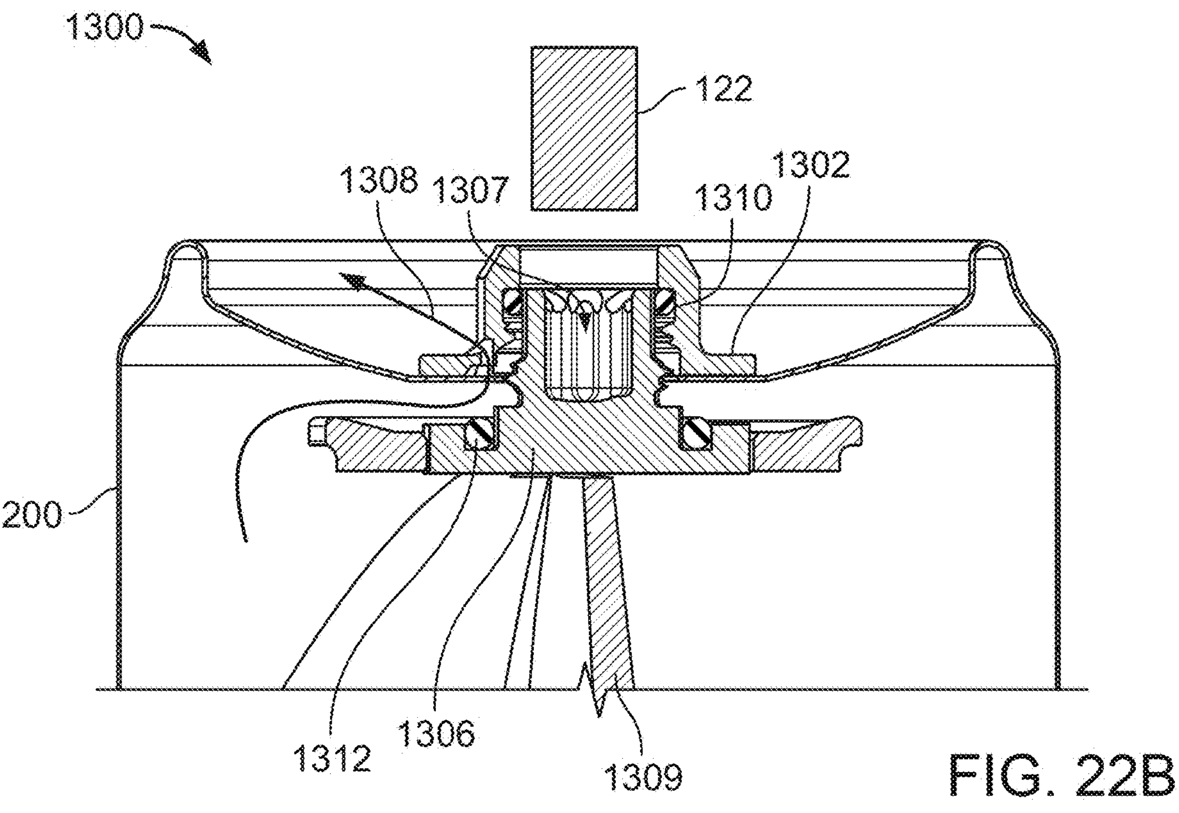
Figure 22C:
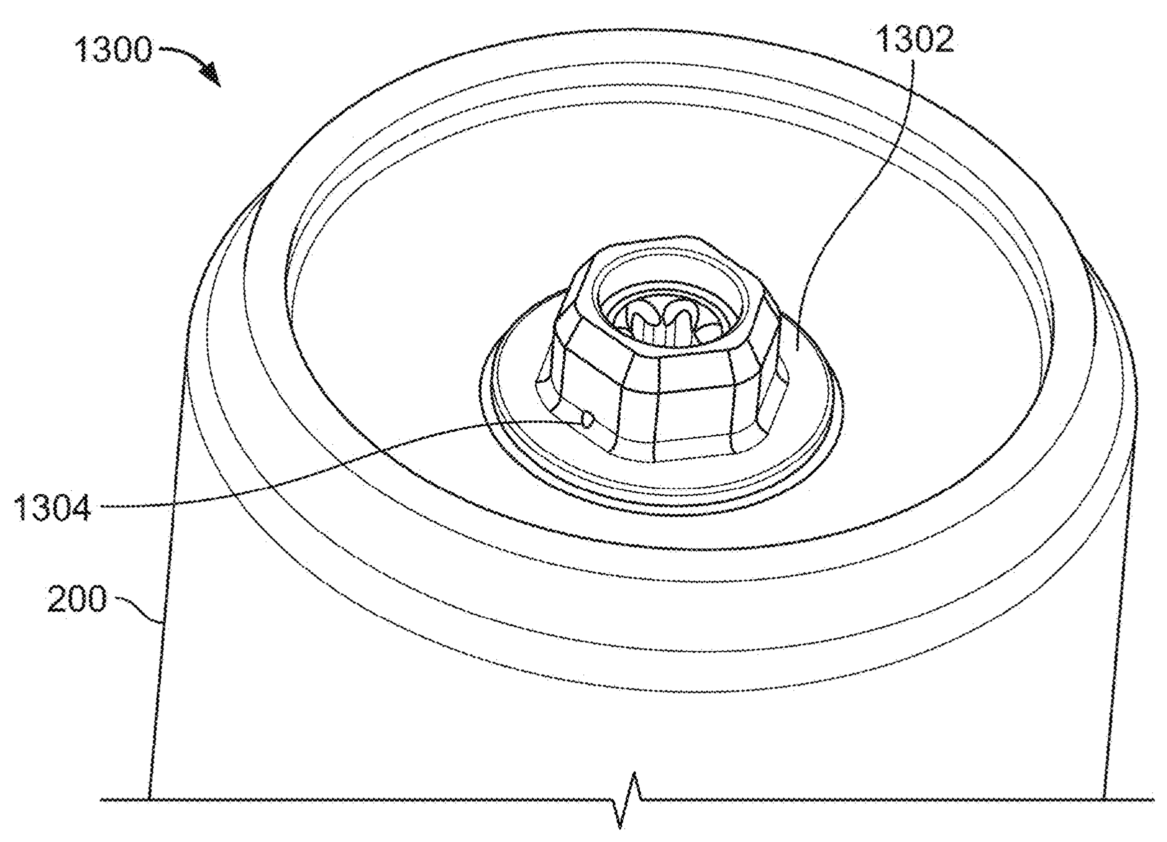
FIG. 22C is a perspective view of a mating drive assembly.
Figure 22D:
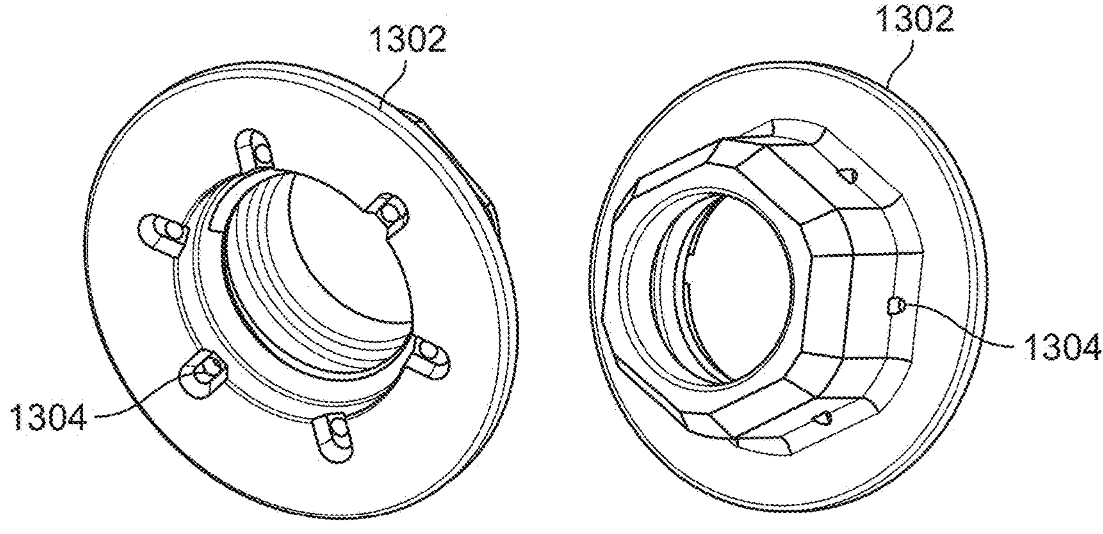
FIG. 22D is a perspective view of a locking nut of a mating drive assembly.

FIGS. 22A and 22B are cross-sectional views of a mating drive assembly 1300 in its closed position (FIG. 22A) and its open position (FIG. 22B). FIG. 22C is a perspective view of the mating drive assembly 1300. FIG. 22D is a perspective view of a locking nut 1302 of the mating drive assembly 1300.

The locking nut 1302 is adhered to the pod 200. The locking nut 1302 includes one or more vent holes 1304 to allow nitrogen to escape from the pod 200 when the mating drive head 1306 is unthreaded from the locking nut 1302. As the mating drive head 1306 is lowered into the pod 200, pressure of the sealed pod may cause the expulsion of nitrogen and ice cream mix between the threaded connection of mating drive head 1306 and locking nut 1302, and onto the machine components. The vent holes 1304 of locking nut 1302 allow controlled release of the initial pressure along the pathway 1308 indicated in FIG. 22B, away from the drive shaft 122 of the machine 100. The locking nut 1302 has a single vent hole about the circumference. Some locking nuts have multiple vent holes (see, e.g., FIG. 22D). The locking nut may be formed using a cold heading process.

An O-ring, located in a groove 1310, is pressed between mating drive head 1306 and locking nut 1302 forming a seal. This seal complements the venting holes 1304 to help prevent nitrogen and ice-cream mix from escaping pod 200 through the threaded connection of the mating drive head 1306 and locking nut 1302 to the drive shaft 122. Before the mating drive head 1306 is lowered into the position shown in FIG. 22B, an O-ring 1312 is pressed against the inside dome of the pod 200 forming a seal. This seal is complemented by the threaded connection between the exterior threads of the mating drive head 1306 and the interior threads of the locking nut 1302. These seals help to seal outside air from getting into the pod 200 so the pod 200 can remain hermetically sealed until it is ready for use in the machine 100. These seals also prevent the nitrogen from escaping (and thus maintaining pressurization) before the sealing shaft is unscrewed from the nut.

Figure 23A:
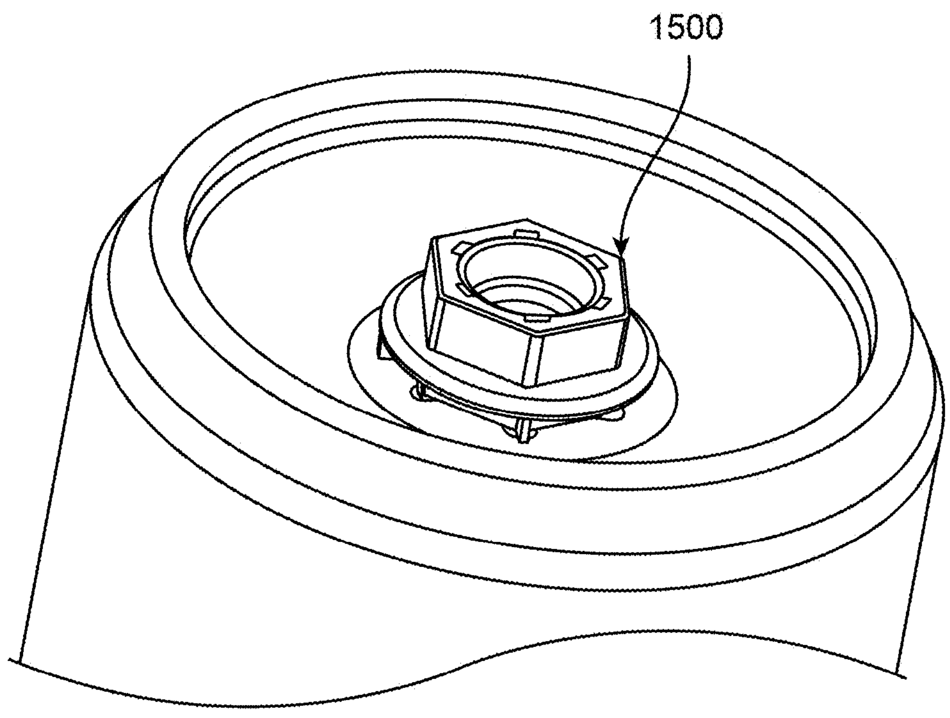
FIGS. 23A-23F are views of alternative locking nut design.
Figure 23B:
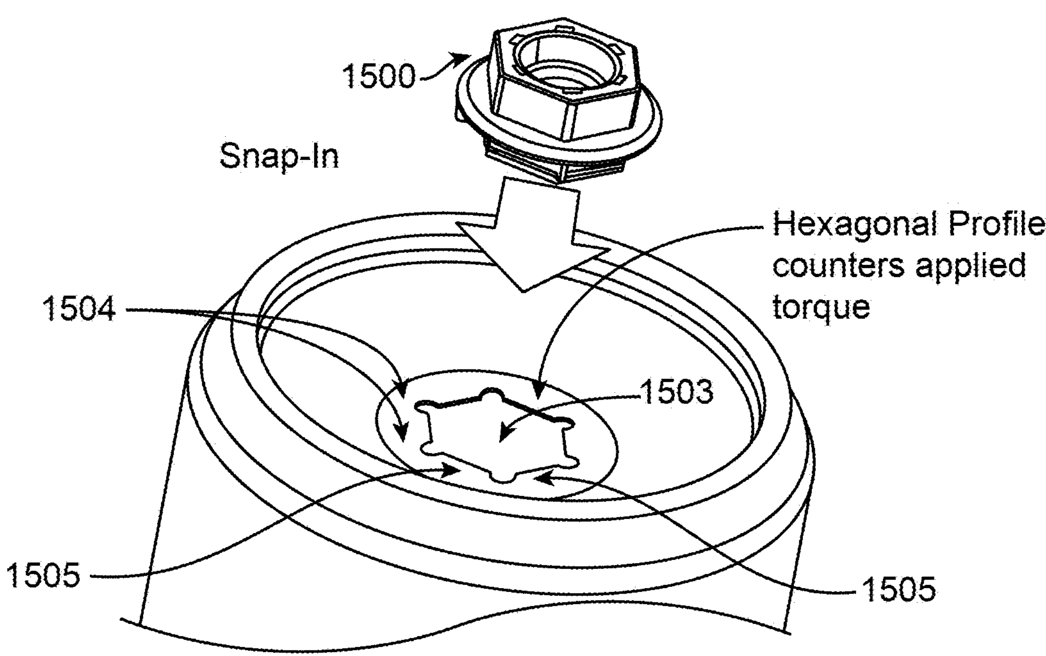
Figure 23C:
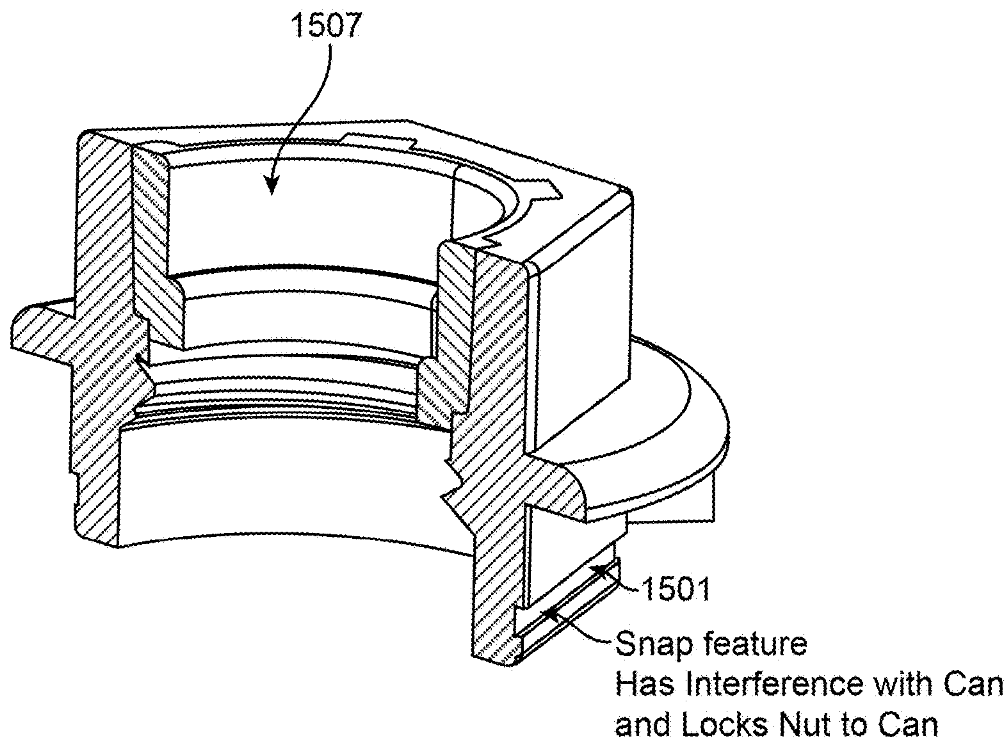
Figure 23D:
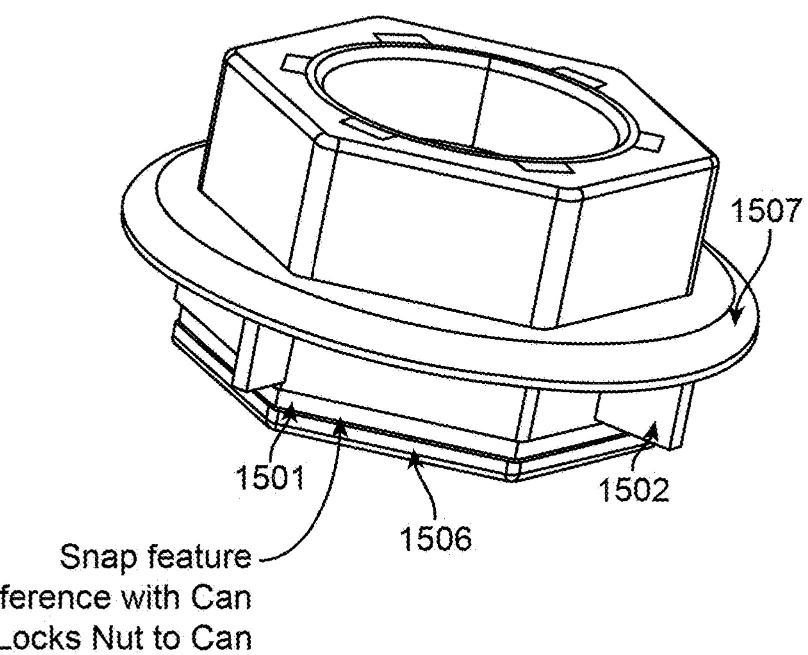
Figure 23E:
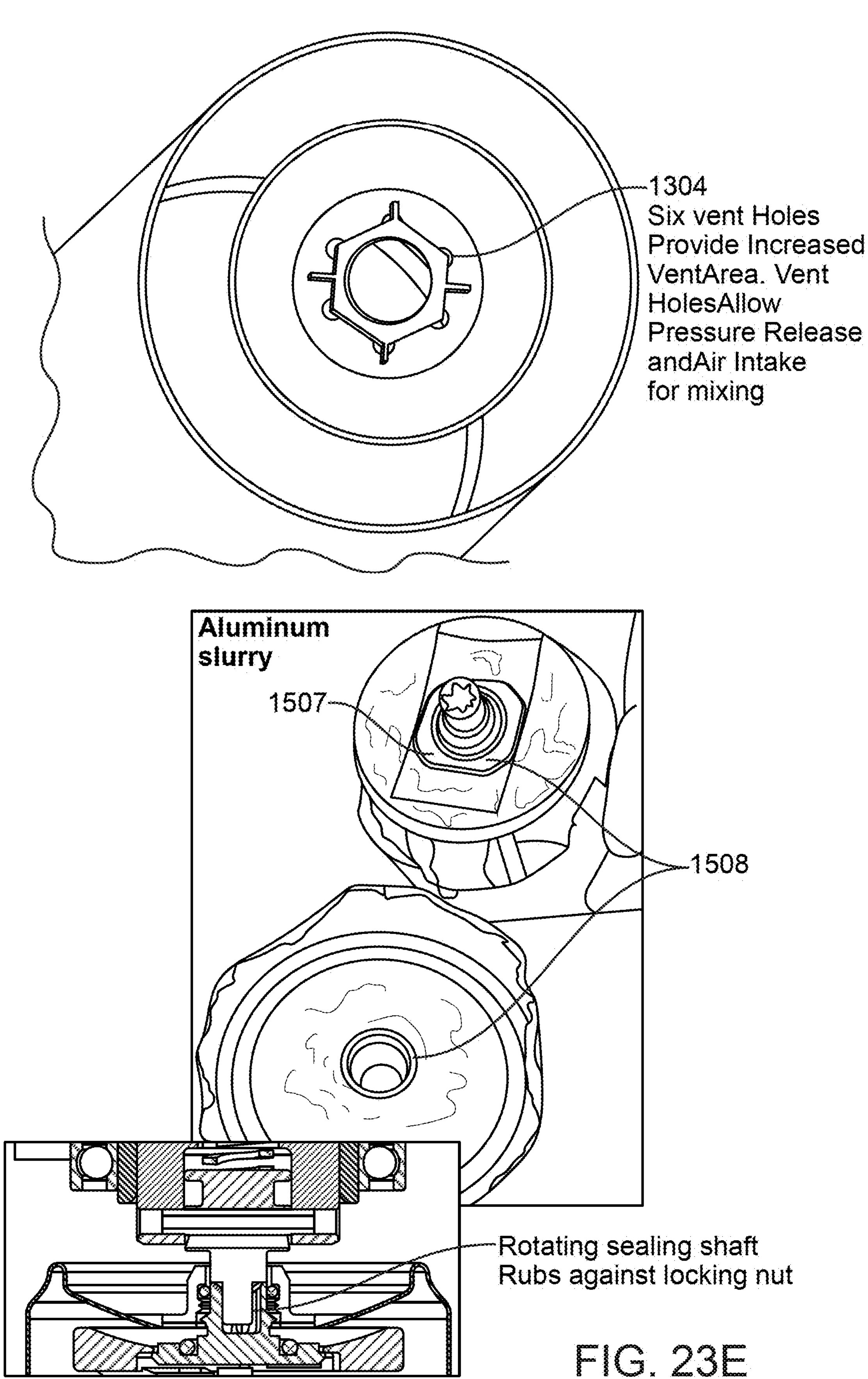
Figure 23F:
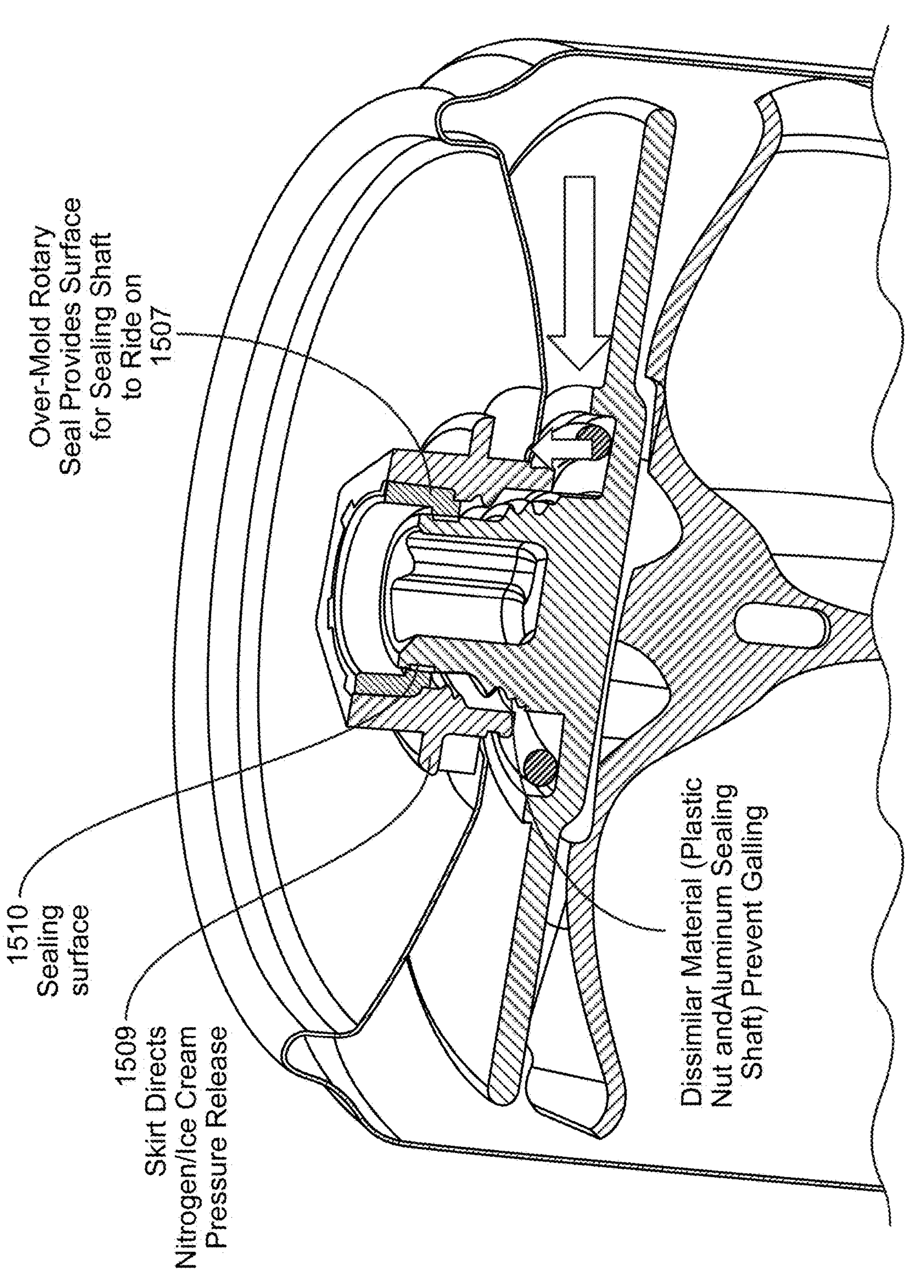

FIGS. 23A-23F are views of alternative locking nut design. Referring to FIGS. 23A and 23B, some locking nuts 1500 are made of plastic instead of aluminum. These alternative locking nuts can also have a single vent hole or multiple vent holes 1304. Multiple vent holes are easier and more economical to create in a plastic nut vs. a metal nut. In some cases, one or more vent holes 1304 extend through a sidewall of the nut as shown in FIGS. 22A-22D. Plastic locking nuts may also be designed to allow a snap-in fit to the pod 200, avoiding the use of epoxy or other adhesives. The bottom portion of the nut may have a detent or snap feature 1501 that provides interference with the can and locks the nut into place (FIGS. 23C and 23D). This snap feature may be a channel, a recess, a ridge, a bump or series of bumps, or a combination of these features. Protruding features or fins 1502 oriented parallel to the nut's central axis may be provided to stabilize the nut and hold it in place.

A cut-out or recess 1503 is provided in the pod to accept and secure the nut to the pod. The cut-out may have a circular or non-circular shape, for example hexagonal, octagonal, square, oval, triangular, or rectangular, to counter torque and keep the nut stationary while the mixing paddle is rotated and the ingredients are cooled within the pod. The cut-out may have supplemental features 1504 that permit the sides 1505 of the cut-out to flex as the nut is inserted, allowing the bottom of the nut to penetrate through the cut-out and the sides of the cut-out 1505 to snap into place within the nut's snap feature 1501. These supplemental features could be semi-circular, or alternatively they could be another shape such as semi-oval, square, rectangular, or triangular.

The bottom portion of the nut 1506 is slightly larger in width or diameter compared to the cut-out in the pod 1503. The bottom portion 1506 is large enough so that once inserted into the cut-out, the nut cannot be removed without application of force. However, it is sized appropriately so that the force required to insert the nut through the cut-out is not excessive. The recessed portion or detent 1501 is typically slightly smaller than the cut-out so that the nut stays in place without applying undue pressure to the side walls of the cut-out.

Some nuts have an inserted or overmolded plastic rotary seal 1507 in the interior of the nut on which a sealing surface 1510 of the mixing paddle 250 rides as the shaft rotates. The sealing surface 1510 is an exterior portion of the shaft of the mixing paddle 250 with a smooth surface finish to promote sealing of the pod to avoid contaminants from entering the pod and avoid residual product from escaping past the seal during the process of producing a cooled food or drink. Utilization of a plastic seal provides for metal/plastic contact rather than metal/metal contact, which can wear and create aluminum slurry 1508. The material of seal 1507 can be the same material as the nut 1500, or it can be a different material that facilitates rotation of the shaft. Preferentially, the seal material is a softer or more compliant material than the nut material.

Some nuts also have a skirt feature 1509 that directs the nitrogen (and any ice cream that escapes) parallel to the top surface of the pod, rather than upward, as pressure is released from the pod. This further helps to keep any residual ice cream constrained within the pod system and prevents it from contaminating the machine. Skirt features are also easier to produce in a plastic vs. metal nut.

The plastic locking nut design shown in FIGS. 23A-23F includes one or more of the following advantages. Some plastic locking nut designs are cheaper since plastic is less expensive than aluminum. Plastic allows much more intricate designs with more features since plastic can be molded. Plastic allows increasing the number of vent holes from 1 to 6 much more easily with plastic compared to metal. Plastic can be snapped into place, obviating the need for glue. Plastic-metal contact between the nut and shaft vs. metal-metal contact reduces wear and the production of aluminum slurry 1508.

Figure 24:
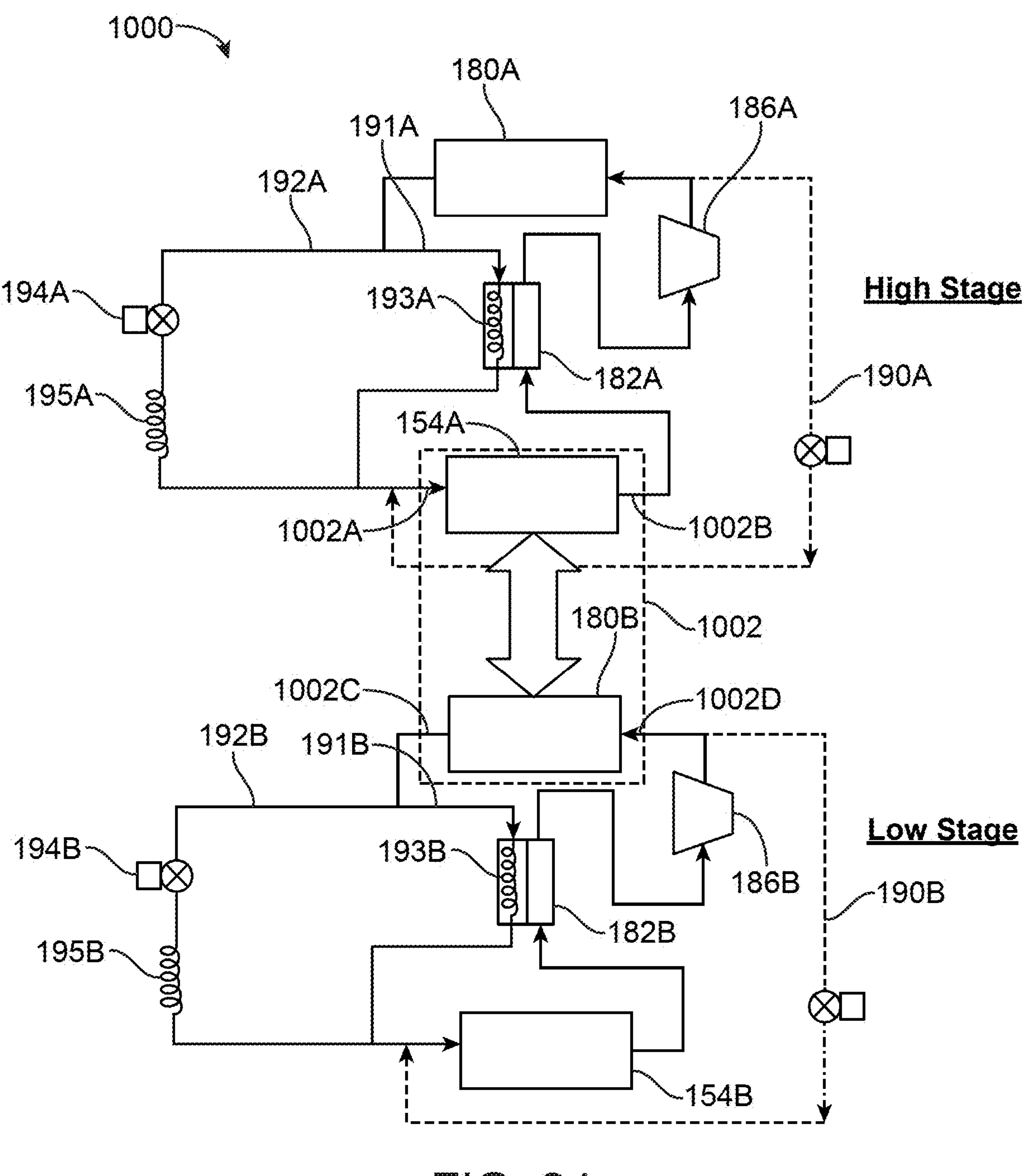
FIG. 24 is a schematic of an alternative refrigeration system with a high stage and a low stage.

FIG. 24 is a schematic of an alternative refrigeration system 1000 with a high stage and a low stage. Such a design is advantageous because refrigeration system 1000 cools a pod to lower temperatures than designs that do not have a high and low stage. Each of the high stage system and the low stage system include the same or similar components as refrigeration system 179 or 181. In practice, using the low stage and the high stage together, which are connected by an interstage cooler 1002, evaporator 154A of the high stage essentially becomes the condenser 180B of the low stage. This allows the evaporator 154B to reach temperatures between −60° F. and −100° F. for cooling a pod (e.g., to produce ice cream). In some examples, using the low stage and the high stage together results in smaller ice crystal size and quicker freezing time compared to refrigeration systems with a single stage.

The high stage of refrigeration system 1000 includes an evaporator 154A that is implemented as part of an interstage cooler 1002 (e.g., a braze plate heat exchanger). The high stage further includes a condenser 180A (e.g., similar to or the same as condenser 180), a suction line heat exchanger 182A (e.g., similar to or the same as heat exchanger 182) which includes an expansion device 193A (similar to or the same as expansion device 193), and a compressor 186A (e.g., similar to or the same as compressor 186). The high stage further includes a primary refrigerant path 191A (similar to or the same as primary path 191) which includes a control valve 194A (similar to or the same as control valve 194) and an expansion device 195A (similar to or the same as expansion device 195). In the implementation shown, the high stage of refrigeration system 1000 further includes a bypass line 190A (similar to or the same as bypass line 190).

The low stage of refrigeration system 1000 includes an evaporator 154B which is the same as evaporator 154 (e.g., the evaporator 154B defines an opening for receiving the pod and cooling the pod). The low stage further includes a condenser 180B that is implemented as part of the interstage cooler 1002 (e.g., a braze plate heat exchanger). The low stage further includes a suction line heat exchanger 182B (e.g., similar to or the same as heat exchanger 182) which includes an expansion device 193B (similar to or the same as expansion device 193), and a compressor 186B (e.g., similar to or the same as compressor 186). The low stage further includes a primary refrigerant path 191 (similar to or the same as primary path 191) which includes a control valve 194B (similar to or the same as control valve 194) and an expansion device 195B (similar to or the same as expansion device 195). In the implementation shown, the low stage of refrigeration system 1000 further includes a bypass line 190B (similar to or the same as bypass line 190).

In some examples, the refrigerant in the high stage is different from the refrigerant in the second stage. For example, propane (R-290) is the refrigerant of the high stage and propylene (R-1270) is the refrigerant of the low stage. In some examples, the refrigerant in the high stage is the same as the refrigerant in the second stage (e.g., propylene is the refrigerant for both high and low stages). In examples in which the refrigerant is propylene for both high and low stages, the refrigerant is expected to reach as low as about −70° F. in the evaporator 154B. In some examples, propylene is used on the high side and ethylene (R-1150) is used on the low side, where the refrigerant is expected to reach as low as about −100° F. in the evaporator 154B. In examples in which ethylene is used, the low stage would need to be designed to sustain high pressures (e.g., using stainless tubing, strong evaporator designs, and a reinforced compressor). For example, ethylene might have pressures of 500 psi in the low stage condenser 180B when freezing and higher when off.

The start-up and shut-down sequences of the high and low stages are important in order to achieve an efficient cooling process. In some implementations, the machine (e.g., the electronic controller of the machine) controls the refrigeration system 1000 such that both the high and low stages would be running for the entire freezing cycle (e.g., while the pod is being cooled to produce the cooled food or drink). In some implementations, the machine controls the high stage to start first (e.g., by starting the compressor 186A). Once the high stage evaporator 154A reaches the temperature of the refrigerant in the line approaching the low stage condenser 180B, the machine controls the low stage to turn on (e.g., by starting the compressor 186B). This provides an efficient start-up of the low stage by ensuring that heat is transferred from the low stage condenser 180B to the high stage evaporator 154A. Starting the low stage after the evaporator 154A reaches the predetermined temperature limits moisture condensation from the air. Another advantage is that by using the secondary expansion device circuits 192A and 192B on both high and low stages, even faster cooling is achieved compared to high and low stages that do not include secondary expansion device circuits 192A and 192B.

Figure 25:
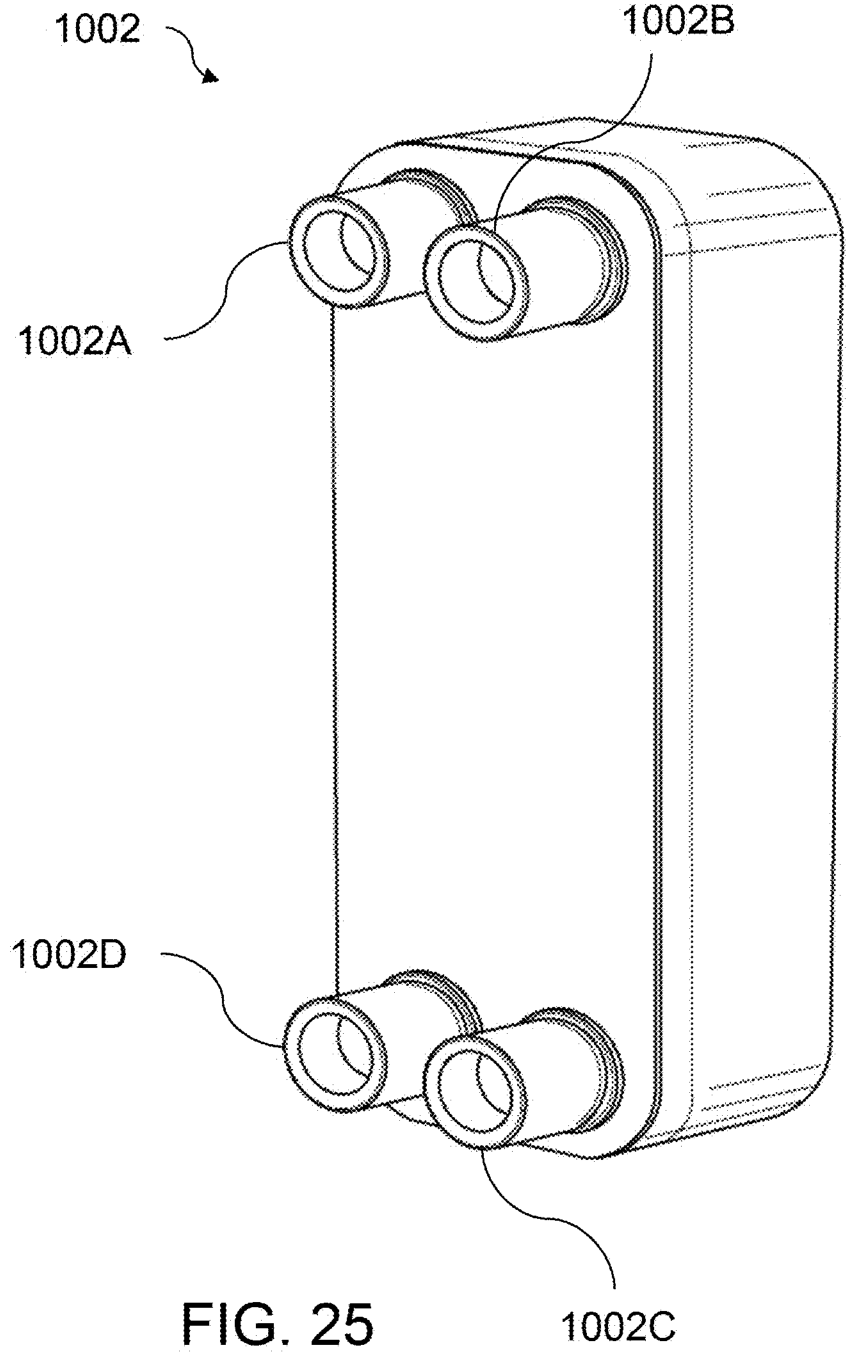
FIG. 25 is a perspective view of an interstage cooler.

FIG. 25 is a perspective view of an interstage cooler 1002 for the refrigeration system 1000. In this example, the interstage cooler 1002 is a braze plate heat exchanger that evaporates a liquid-gas mixture from the high stage of the refrigeration system 1000 by condensing higher pressure vapor from the low stage. The intercooler transfers heat from the low stage to the high stage. The interstage cooler 1002 includes a first inlet 1002A (e.g., which receives refrigerant of the high stage), a first outlet 1002B (e.g., which discharges refrigerant of the high stage), a second inlet 1002C (e.g., which receives refrigerant of the low stage), and a second outlet 1002D (e.g., which discharges refrigerant of the low stage).

Some evaporators include multiple refrigerant inlet and multiple refrigerant outlets. Compared to using only a single refrigerant inlet and outlet, multiple refrigerant inlets and outlets reduce the pressure drop across the evaporator when larger compressors are used to improve the thermal capacity of the refrigeration system. For example, some refrigerant systems include an inlet for the evaporator that branches into two inlets outside of the evaporator. The evaporator includes two ports—one for each of the two inlets. Then refrigerant flows from the first inlet through the evaporator to a first outlet, and refrigerant flows from the second inlet through the evaporator to a second outlet. The flow paths within the evaporator do not generally mix and are separate paths, although they could be implemented to mix. The two outlets then merge external to the evaporator and recombine into a single path that is received by the compressor of the refrigeration system.

Figure 26:
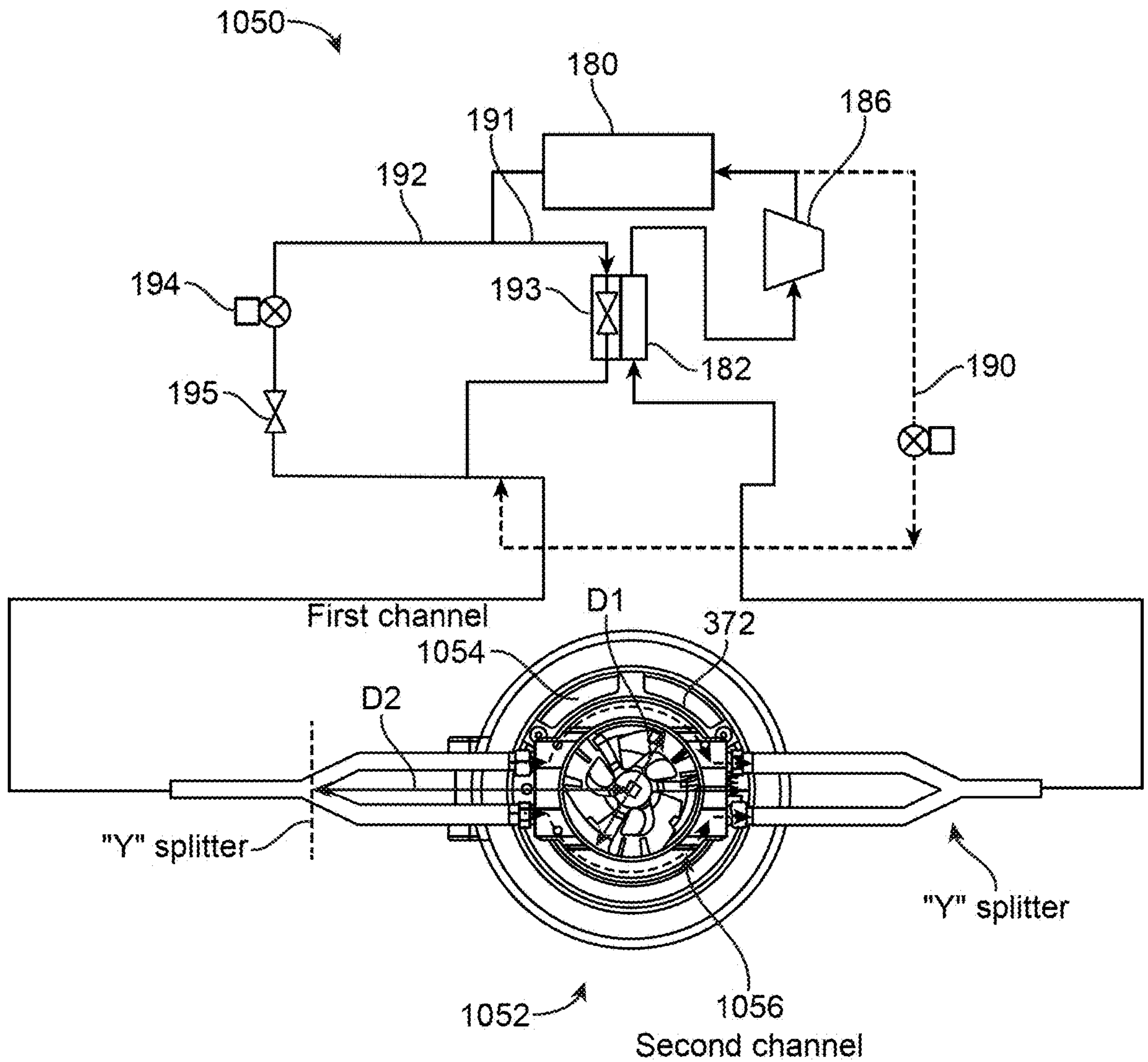
FIG. 26 is a schematic of an alternative refrigeration system with an evaporator having two parallel refrigerant channels.

FIG. 26 is a schematic of an alternative refrigeration system 1050 with an evaporator 1052 having two parallel refrigerant channels 1054 and 1056. Each channel 1054, 1056 has an inlet (to the left of the evaporator 1052) and an outlet (to the right of the evaporator 1052). Each inlet is fluidly connected to the refrigerant system 1050 by a "Y" splitter. In some implementations, each inlet is fluidly connected to the refrigerant system by a "T" splitter or a manifold. Each outlet is fluidly connected to the refrigerant system by a "Y" splitter. In some implementations, each outlet is fluidly connected to the refrigerant system by a "T" splitter or a manifold.

Importantly, the splitter or manifold is designed such that the incoming refrigerant is split roughly equally in half so that one side of the evaporator 1052 doesn't receive more refrigerant than the other. Thus, the length of the tubes after the split should be roughly equal. Additionally, the splitting point should be far enough away from the evaporator 1052 to reduce strain on the junction point (e.g., the hinge (see e.g., FIG. 27B)) when the evaporator opens and closes. In some implementations, the distance (D2) from the longitudinal axis of the evaporator 1052 and the splitting point is at least one pod diameter (D2). In some implementations, the junction point is biased toward the inlet or the outlet to reduce such strain.

In some implementations, the evaporator 1052 includes a trap. For example, a trap can be a U-shaped feature in the single line portion(s) on either side of the evaporator 1052 that additionally relieves stress from the evaporator motion or other machine motion/vibrations. The "U" could be in the same plane as represented in the schematic of FIG. 26 or could be perpendicular (or any other plane).

Figure 27A:
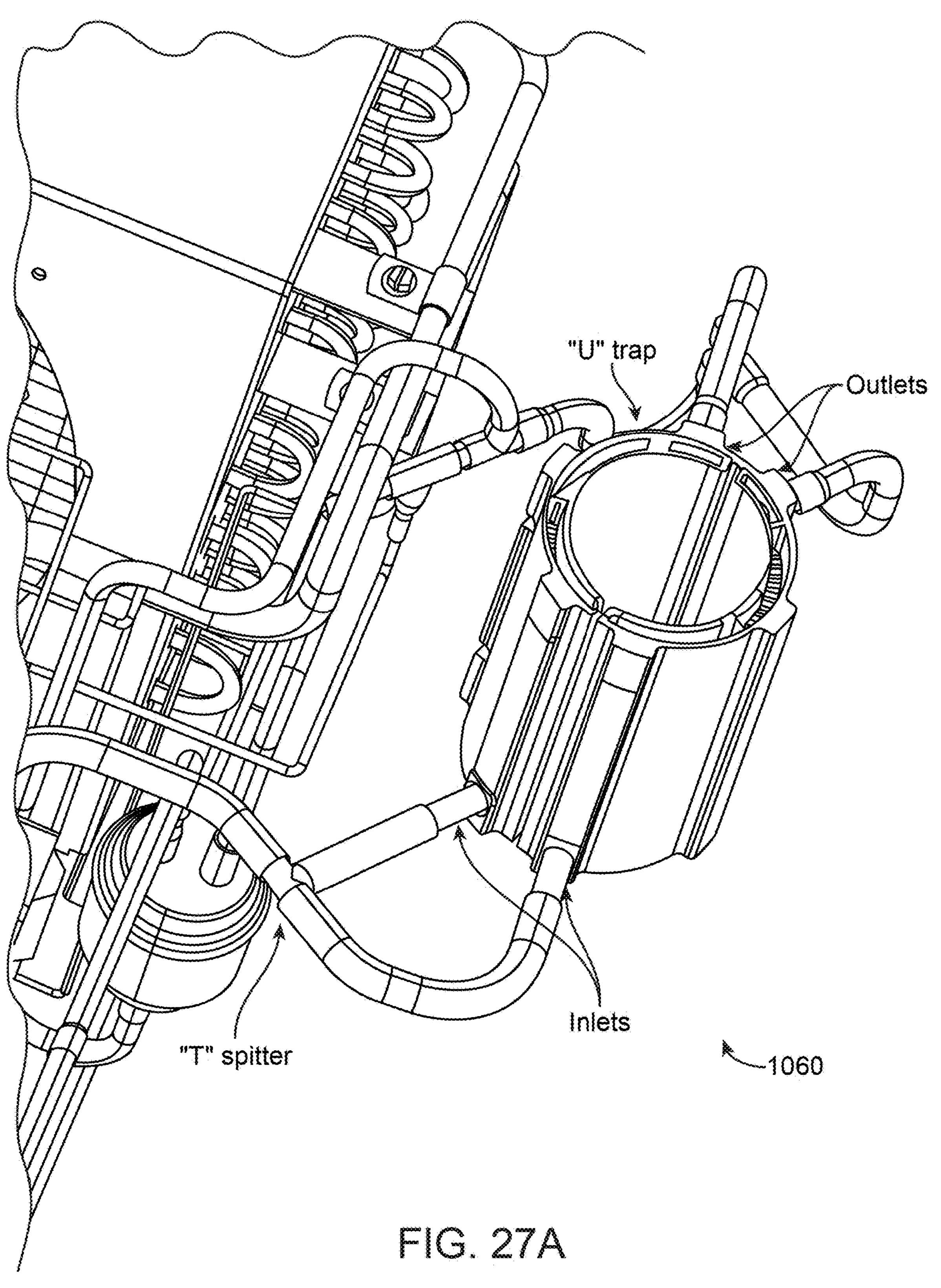
FIGS. 27A and 27B are perspective views of an evaporator having two parallel refrigerant channels.
Figure 27B:
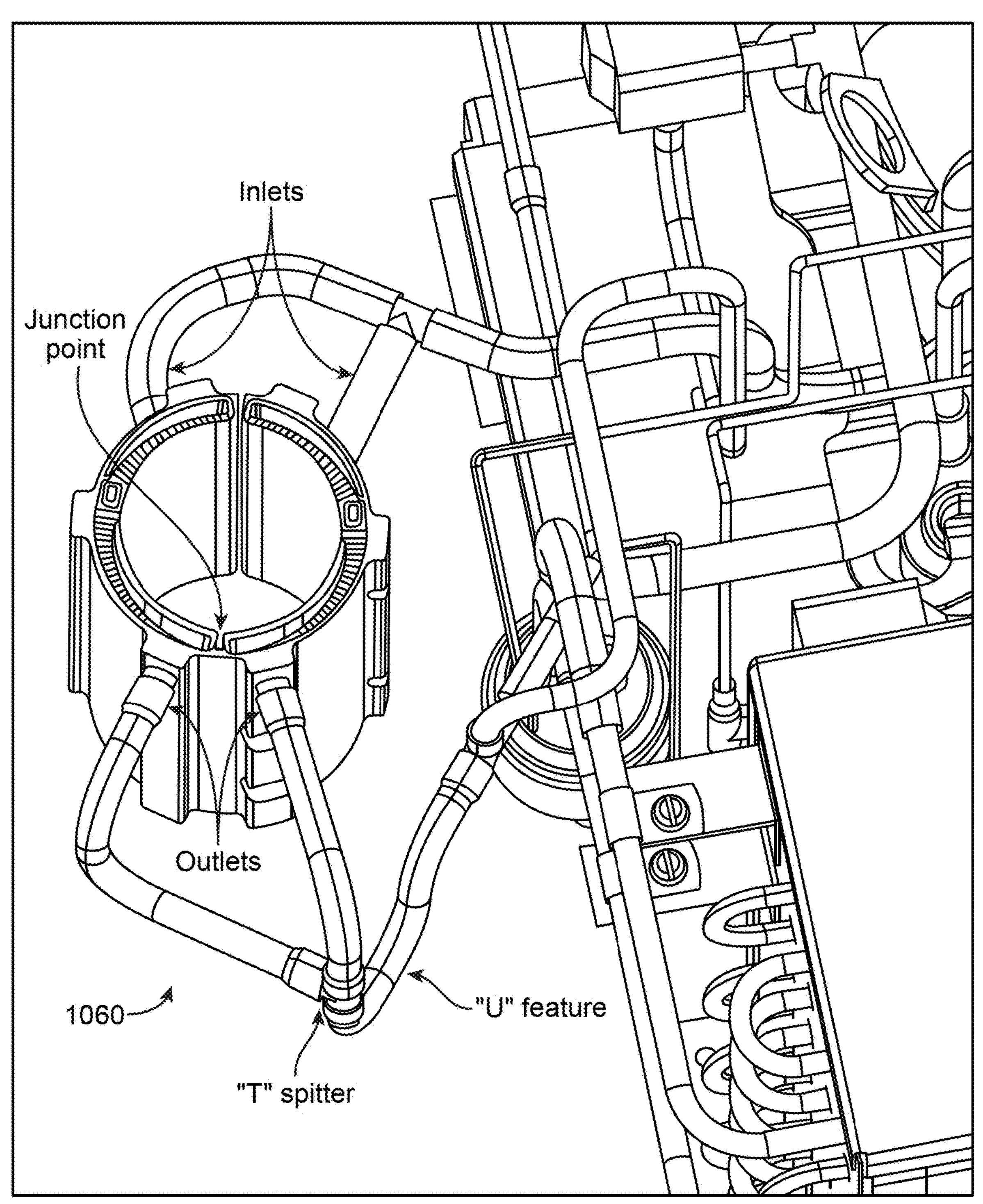

FIGS. 27A and 27B are perspective views of a prototype evaporator 1060 having two parallel refrigerant channels. Evaporator 1060 is similar to evaporator 1050 and the refrigeration system shown in FIGS. 27A and 27B is configured similar to refrigeration system 1050. However, "T" splitters and a "U" feature (e.g., a U-shaped feature in the tubing) are used in the configuration shown in FIGS. 27A and 27B.

The "U" feature is arranged on the single line portion on the outlet side of the evaporator 1060 to relieve stress from evaporator motion (e.g., during opening and closing) or other machine motion and vibrations that occur during the process of rapidly preparing a cooled food or drink (e.g., mixing paddle rotations). In the configuration shown in FIGS. 27A and 27B, the "U" feature is located such that the bottom of the "U" feature is directed downward with respect to gravity, towards the bottom of the evaporator 1060, and towards the bottom of the machine in general. In other configurations, the "U" feature can be arranged side-ways with respect to the evaporator or upside down. All of these configurations would be sufficient to increase compliance in the tubing between the evaporator and a point downstream of the "U" feature to help reduce strain in the tubing during evaporator movement and machine motion and vibrations.

While the "U" feature is arranged on the outlet side of the evaporator 1060, some evaporators have a "U" feature arranged on the inlet side, or "U" features arranged on both the inlet and outlet sides. In some evaporators, more than one "U" feature is used (e.g., 2-10 "U" features). Furthermore, in some cases, the two inlets of the evaporator 1060 are more evenly distributed than the configuration shown in FIGS. 26A and 26B so that the flow of refrigerant entering the evaporator 1052 through the inlets is approximately the same for each of the two inlets. For example, in some evaporators, the length of tubing between the "T" splitter and the respective inlet of the evaporator for each fluid path is approximately the same. Additionally, while evaporator 1060 has two inlets and two outlets, some evaporators have more than two inlets (e.g., 3-10 inlets) and more than two outlets (e.g., 3-10 outlets).

The electronic controller (or processor) of the machine 100 is in electronic communication with the drive motor 116, the plunger motor 124, the evaporator motor 166, and shearing motor (e.g., shearing motor 842 or shearing motor 866). The processor controls operation of each of these motors. Some machines include torque sensors that monitor the torques provided by the shafts of each of these motors. Some machines include a lid closure sensor to monitor whether the sliding lid 102 is in the closed configuration. The processor of the machine communicates with all of these sensors and motors. The processor is also electrically connected to the user interface 108. The processor is programmed to execute one or more operations of the machine 100 to produce a single serving of a cooled food or drink from a shelf-stable pod and dispense the produced food or drink in a user's bowl or cone within a few minutes (e.g., less than 2 or 3 minutes) for consumption.

A number of systems and methods have been described. Nevertheless, it will be understood that various modifications may be made without departing from the spirit and scope of this disclosure. For example, although the evaporators have been generally illustrated as being in vertical orientation during use, some machines have evaporators that are oriented horizontally or an angle to gravity during use. Accordingly, other embodiments are within the scope of the following claims.

What is claimed is:

1. A pod comprising:

an aluminum container having a sidewall at least partially defining an interior of the pod for ingredients to produce a cooled food or drink;

a base attached to a first end of the sidewall of the aluminum container, the base comprising (i) a first protrusion configured to be removed from the base to form an opening for dispensing the food or drink from the pod and (ii) one or more second protrusions; and a cap comprising a cap body comprising:

a drive configured to engage the first protrusion of the base for removing at least a portion of the first protrusion from the base to form the opening for dispensing the food or drink from the pod; and a recess or track formed on an outer periphery of the cap body and extending around a circumference of the cap body, wherein the recess or track is configured to engage the one or more second protrusions of the base to axially retain the cap onto the base while allowing relative rotation between the cap and the base, and the drive is configured to remove at least the portion of the first protrusion during a relative rotation between the cap and the base while the cap is axially retained on the base.

2. The pod of claim 1, wherein the cap comprises a drip tray configured to attach to an inner portion of the cap body, the inner portion surrounding the drive of the cap body.

3. The pod of claim 2, wherein the drip tray comprises one or more resilient arms for engaging one or more second recesses of the inner portion of the cap body for attaching the cap to the cap body.

4. The pod of claim 2, wherein the drip tray is formed of plastic and the cap body is formed of aluminum.

5. The pod of claim 2, wherein the drip tray at least partially defines a reservoir for storing melted food or drink and at least the portion of the first protrusion after the first protrusion has been removed from the base by the drive.

6. The pod of claim 1, comprising the ingredients disposed in the interior of the pod.

7. The pod of claim 1, comprising a paddle disposed in the interior of the pod for mixing the ingredients.

8. The pod of claim 1, wherein the one or more second protrusions are formed on a wall of the base located radially inward of a location at which the base is attached to the aluminum container, the location being radially outward of the first protrusion of the base.

9. The pod of claim 8, wherein the one or more second protrusions are a single annular protrusion extending around a circumference of the wall of the base.

10. The pod of claim 8, wherein the one or more second protrusions comprise a plurality of protrusions spaced relative to each other around a circumference of the wall of the base.

11. The pod of claim 1, wherein the one or more second protrusions have a circular shape or a spherical shape that extends in a radially inward direction.

12. The pod of claim 1, wherein the one or more second protrusions have a square shape, a triangular shape, or a rectangular shape.

13. A pod comprising:

an aluminum container having a sidewall at least partially defining an interior of the pod for ingredients to produce a cooled food or drink;

a base attached to a first end of the sidewall of the aluminum container, the base comprising (i) a first protrusion configured to be removed from the base to form an opening for dispensing the food or drink from the pod and (ii) one or more second protrusions; and a cap comprising:

a first part comprising (i) a drive configured to engage the first protrusion of the base for removing at least a portion of the first protrusion from the base to form the opening for dispensing the food or drink from the pod, (ii) a dispense port for dispensing the food or drink from the pod, and (iii) a recess or track formed on an outer periphery of the first part and extending around a circumference of the first part; and a second part configured to be attached to the first part, the second part defining (i) a reservoir for storing melted food or drink after the food or drink has been dispensed from the pod, and (ii) an opening for dispensing the food or drink from the pod, the reservoir being aligned with the drive and the opening being aligned with the dispense port when the first part and the second part are attached to one another, wherein the recess or track is configured to engage the one or more second protrusions of the base to axially retain the cap onto the base while allowing relative rotation between the cap and the base such that, while the cap is axially retained on the base, (i) the drive is configured to remove at least the portion of the first protrusion during a first relative rotation between the cap and the base and (ii) the dispense port is configured to be aligned with the opening formed in the base during a second relative rotation between the cap and the base.

14. The pod of claim 13, wherein the first and second relative rotations are in the same rotational direction.

15. The pod of claim 13, wherein the pod is configured to allow relative rotation by allowing rotating in two opposite rotational directions.

16. The pod of claim 13, wherein the first part comprises a first helical thread and the second part comprises a second helical thread for attaching the second part to the first part.

17. The pod of claim 13, wherein one of the first part or the second part comprises a plurality of pins and the other of the first part or the second part comprises a plurality of second recesses sized to receive the plurality of pins for attaching the second part to the first part.

18. The pod of claim 13, wherein the first part comprises a coating surrounding one or more surfaces of the recess or track for reducing friction between the one or more protrusions of the base and the recess or track of the first part compared to caps that do not use the coating.

19. A pod comprising:

a body having a sidewall that extends from a first end of the body to a second end of the body to define an interior of the pod;

ingredients disposed within the interior of the pod for producing a single serving of a cooled food or drink;

a base attached to the first end of the pod, the base comprising a rim with at least one radially-inward facing detent, at least a portion of the base being removable via a shearing drive for dispensing the produced cooled food or drink from the pod; and a cap comprising the shearing drive, the shearing drive comprising a track or recess sized to engage the at least one radially-inward facing detent to axially retain the shearing drive to the base of the pod while allowing relative rotation between the cap and the base of the pod.

20. The pod of claim 19, wherein the cap comprises a foil or drip tray received in a portion of the cap for capturing residual food and drink that melts and drips after the produced food and drink is dispensed from the pod.

21. The pod of claim 20, wherein the at least one radially-inward facing detent is a semi-continuous or continuous detent ring that circumferentially spans a circumference of the rim of the base.

22. The pod of claim 20, wherein the cap is made of aluminum or an aluminum alloy.

* * * * *